(12) United States Patent
Ren et al.

(10) Patent No.: US 12,264,381 B2
(45) Date of Patent: Apr. 1, 2025

(54) EXTRACTING BASE METALS USING A WETTING AGENT AND A THIOCARBONYL FUNCTIONAL GROUP REAGENT

(71) Applicant: Jetti Resources, LLC, Boulder, CO (US)

(72) Inventors: Zihe Ren, Richmond (CA); Nelson Mora Huertas, Boulder, CO (US); David Dixon, Delta (CA); Edouard Asselin, Richmond (CA)

(73) Assignee: Jetti Resources, LLC, Boulder, CO (US)

( * ) Notice: Subject to any disclaimer, the term of this patent is extended or adjusted under 35 U.S.C. 154(b) by 0 days.

(21) Appl. No.: 18/123,243

(22) Filed: Mar. 17, 2023

(65) Prior Publication Data

US 2023/0227936 A1    Jul. 20, 2023

Related U.S. Application Data

(63) Continuation-in-part of application No. PCT/CA2021/051262, filed on Sep. 10, 2021.

(60) Provisional application No. 63/212,518, filed on Jun. 18, 2021, provisional application No. 63/080,578, filed on Sep. 18, 2020.

(51) Int. Cl.
  *C22B 3/08* (2006.01)
  *C22B 3/18* (2006.01)
  *C22B 15/00* (2006.01)

(52) U.S. Cl.
  CPC ............. *C22B 3/08* (2013.01); *C22B 3/18* (2013.01); *C22B 15/0071* (2013.01)

(58) Field of Classification Search
  CPC ......... C22B 3/08; C22B 3/18; C22B 15/0071; C22B 1/14; C22B 3/44; C25C 1/12; Y02P 10/20
  See application file for complete search history.

(56) References Cited

U.S. PATENT DOCUMENTS

| | | |
|---|---|---|
| 2,716,600 A | 8/1955 | Frick et al. |
| 2,902,345 A | 9/1959 | Hyde et al. |
| 3,679,397 A | 7/1972 | Oconnor et al. |
| 3,761,566 A | 9/1973 | Michal |
| 3,884,831 A | 5/1975 | Bloom |
| 4,082,833 A | 4/1978 | Wyndham et al. |
| 4,091,070 A | 5/1978 | Riggs et al. |
| 4,343,773 A | 8/1982 | Miller et al. |
| 4,556,483 A | 12/1985 | Fu et al. |
| 4,561,947 A | 12/1985 | Schulze |
| 4,571,387 A | 2/1986 | Bruynesteyn et al. |
| 4,778,519 A | 10/1988 | Pesic |
| 4,913,730 A | 4/1990 | Deschenes et al. |
| 5,104,445 A | 4/1992 | Dubrovsky et al. |
| 5,207,996 A | 5/1993 | Sierakowski et al. |
| 5,260,040 A | 11/1993 | Kenna |
| 5,795,465 A | 8/1998 | Arbiter |
| 5,989,311 A | 11/1999 | Han et al. |
| 6,146,444 A | 11/2000 | Kohr |
| 6,569,391 B1 | 5/2003 | Arias |
| 6,746,512 B1 | 6/2004 | Shaw |
| 6,926,753 B2 | 8/2005 | Faine et al. |
| 7,722,840 B2 | 5/2010 | Hackl et al. |
| 7,862,785 B2 | 1/2011 | Seelmann-Eggebert et al. |
| 7,964,015 B2 | 6/2011 | Creasey et al. |
| 8,012,238 B2 | 9/2011 | Kohr et al. |
| 8,070,851 B2 | 12/2011 | Muller et al. |
| 8,118,907 B2 | 2/2012 | Uhrie et al. |
| 8,163,063 B2 | 4/2012 | Manabe |
| 8,257,671 B2 | 9/2012 | Kuwano et al. |
| 8,277,538 B2 | 10/2012 | Kuwazawa et al. |
| 8,287,623 B2 | 10/2012 | Manabe |
| 8,388,728 B2 | 3/2013 | Hollitt et al. |
| 8,435,793 B2 | 5/2013 | Nomura et al. |
| 8,491,701 B2 | 7/2013 | Uhrie et al. |
| 8,865,119 B2 | 10/2014 | Kuwano et al. |
| 8,911,532 B2 | 12/2014 | Manabe |
| 8,992,666 B2 | 3/2015 | Sato et al. |
| 9,068,242 B2 | 6/2015 | Ishida et al. |
| 9,290,827 B2 | 3/2016 | Hatano et al. |
| 9,624,560 B2 | 4/2017 | Gonzalez et al. |
| 9,683,277 B2 | 6/2017 | Fagerstrom et al. |

(Continued)

FOREIGN PATENT DOCUMENTS

| | | |
|---|---|---|
| AP | 5183 | 7/2020 |
| AR | 104304 A1 | 7/2017 |

(Continued)

OTHER PUBLICATIONS

"What is a trademark?" accessed online at https://www.uspto.gov/trademarks/basics/what-trademark on Nov. 17, 2023 (Year: 2023).*
Machine Translation of CN 103993171 to Northeastern University (Year: 2014).*
Rebolledo, Kinetic Study of the Dissolution of Chalcopyrite in the Presence of a Catalyst Under Acidific Sulfate Medium, Thesis, University of British Columbia, 129 pages (2013) (Year: 2013).*
Sandoval, et al., Effect of Nonionic Surfactants on Chalcopyrite Leaching Under Dump Chemical Conditions, Report of Investigations 9311 / Bureau of Mines, United States Department of the Interior 1990, pp. 1-12 (Year: 1990).*

(Continued)

*Primary Examiner* — Daniel C. McCracken
(74) *Attorney, Agent, or Firm* — Peacock Law P.C.; Deborah A. Peacock; Marco H. Santamaria

(57) ABSTRACT

The present disclosure relates to the use of a wetting agent such as a non-ionic wetting agent and a reagent comprising a thiocarbonyl functional group, for example, in a method/process or use for extracting a base metal such as copper from a material comprising the base metal. Such methods/processes can comprise contacting the material under acidic conditions with the wetting agent and the reagent comprising the thiocarbonyl functional group; and optionally recovering the base metal.

39 Claims, 14 Drawing Sheets

(56) References Cited

U.S. PATENT DOCUMENTS

| | | |
|---|---|---|
| 9,771,631 B2 | 9/2017 | Welham et al. |
| 9,816,155 B2 | 11/2017 | Patio et al. |
| 10,041,143 B2 | 8/2018 | Rautenbach |
| 10,344,353 B2 | 7/2019 | Mujicic et al. |
| 10,370,738 B2 | 8/2019 | Robertson et al. |
| 10,400,308 B2 | 9/2019 | Gutiérrez et al. |
| 10,526,685 B2 | 1/2020 | Brown et al. |
| 10,550,450 B2 | 2/2020 | Kawashiro et al. |
| 10,563,284 B2 | 2/2020 | Kittelty et al. |
| 10,563,287 B2 | 2/2020 | Hackl et al. |
| 10,731,232 B2 | 8/2020 | Sato et al. |
| 10,745,778 B2 | 8/2020 | Bender et al. |
| 10,767,242 B2 | 9/2020 | Robertson et al. |
| 10,781,502 B2 | 9/2020 | Dixon et al. |
| 10,865,460 B2 | 12/2020 | Dixon et al. |
| 10,870,903 B2 | 12/2020 | Dixon et al. |
| 10,876,186 B2 | 12/2020 | Dixon et al. |
| 10,876,187 B2 | 12/2020 | Dixon et al. |
| 10,947,606 B2 | 3/2021 | Rorke |
| 10,954,583 B2 | 3/2021 | Dixon et al. |
| 10,961,604 B2 | 3/2021 | Dixon et al. |
| 11,111,559 B2 | 9/2021 | Palmer et al. |
| 11,236,407 B1 | 2/2022 | Fennel et al. |
| 11,286,540 B2 | 3/2022 | Burley et al. |
| 11,492,681 B2 | 11/2022 | Patino Martinez |
| 11,618,934 B2 | 4/2023 | Lizama et al. |
| 11,859,263 B2 | 1/2024 | Dixon et al. |
| 12,018,349 B2 | 6/2024 | Lyons |
| 2002/0157504 A1 | 10/2002 | Beckmann |
| 2004/0091984 A1 | 5/2004 | Hunter |
| 2004/0197249 A1 | 10/2004 | Wan et al. |
| 2005/0269208 A1* | 12/2005 | Dixon ................ C22B 15/0071 75/731 |
| 2006/0193762 A1 | 8/2006 | Misra et al. |
| 2007/0272055 A1 | 11/2007 | Lavine et al. |
| 2008/0026450 A1 | 1/2008 | Ohtsuka et al. |
| 2008/0241024 A1 | 10/2008 | Riekkola-Vanhanen et al. |
| 2008/0286180 A1 | 11/2008 | Jones |
| 2010/0018349 A1 | 1/2010 | Manabe |
| 2010/0021370 A1 | 1/2010 | Nagaraj et al. |
| 2011/0290657 A1 | 12/2011 | Lapidus Lavine et al. |
| 2012/0251417 A1 | 10/2012 | Shimomura et al. |
| 2013/0140186 A1 | 6/2013 | Lapidus et al. |
| 2013/0333524 A1 | 12/2013 | Aghemio Rodriguez |
| 2014/0212346 A1 | 7/2014 | Xia |
| 2014/0335583 A1 | 11/2014 | West et al. |
| 2016/0122847 A1 | 5/2016 | Saavedra Salinas |
| 2016/0145714 A1* | 5/2016 | Liddell ................ C22B 3/10 75/421 |
| 2016/0298209 A1* | 10/2016 | Mujicic ................ C22B 11/08 |
| 2017/0159153 A1 | 6/2017 | Bender et al. |
| 2017/0335275 A1 | 11/2017 | Alvarez Rodríguez |
| 2017/0335428 A1 | 11/2017 | Gutiérrez et al. |
| 2018/0002781 A1 | 1/2018 | Kawashiro et al. |
| 2018/0135148 A1 | 5/2018 | Dixon et al. |
| 2018/0187287 A1 | 7/2018 | Sato et al. |
| 2018/0223392 A1* | 8/2018 | Wyrsta ................ C22B 26/10 |
| 2019/0055624 A1 | 2/2019 | Brown et al. |
| 2019/0127822 A1 | 5/2019 | Hackl et al. |
| 2019/0284657 A1 | 9/2019 | Robertson et al. |
| 2019/0345581 A1 | 11/2019 | Kittelty et al. |
| 2020/0048736 A1 | 2/2020 | Dixon et al. |
| 2020/0149131 A1 | 5/2020 | Dixon et al. |
| 2020/0181732 A1 | 6/2020 | Dixon et al. |
| 2020/0181733 A1 | 6/2020 | Dixon et al. |
| 2020/0181734 A1 | 6/2020 | Dixon et al. |
| 2020/0181735 A1 | 6/2020 | Dixon et al. |
| 2020/0181736 A1 | 6/2020 | Dixon et al. |
| 2020/0181737 A1 | 6/2020 | Dixon et al. |
| 2020/0224291 A1 | 7/2020 | Patino Martinez |
| 2020/0407821 A1 | 12/2020 | Lee et al. |
| 2021/0198767 A1 | 7/2021 | Dixon et al. |
| 2021/0376400 A1 | 12/2021 | Bhave et al. |
| 2022/0002838 A1 | 1/2022 | Cortés Cortés |
| 2022/0033932 A1 | 2/2022 | Burley et al. |
| 2022/0033933 A1 | 2/2022 | Fennel et al. |
| 2023/0086259 A1 | 3/2023 | Lyons |
| 2023/0090475 A1 | 3/2023 | Lyons |
| 2023/0203618 A1 | 6/2023 | Chibwana et al. |
| 2023/0227936 A1 | 7/2023 | Ren et al. |
| 2023/0257852 A1 | 8/2023 | Ren et al. |
| 2023/0302462 A1 | 9/2023 | Lizama et al. |
| 2024/0026493 A1 | 1/2024 | Lyons et al. |
| 2024/0035113 A1 | 2/2024 | Kittelty et al. |
| 2024/0141456 A1 | 5/2024 | Dixon et al. |
| 2024/0167121 A1 | 5/2024 | Dixon et al. |
| 2024/0254590 A1 | 8/2024 | Ren et al. |
| 2024/0271249 A1 | 8/2024 | Sorensen et al. |
| 2024/0279770 A1 | 8/2024 | Lagno Sánchez et al. |
| 2024/0295006 A1 | 9/2024 | Ren et al. |
| 2024/0336990 A1 | 10/2024 | Dixon et al. |
| 2024/0336991 A1 | 10/2024 | Dixon et al. |

FOREIGN PATENT DOCUMENTS

| | | |
|---|---|---|
| AR | 109843 A1 | 1/2019 |
| AR | 123458 A2 | 12/2022 |
| AR | 123459 A2 | 12/2022 |
| AR | 123460 A2 | 12/2022 |
| AR | 123462 A2 | 12/2022 |
| AR | 123547 A1 | 12/2022 |
| AR | 125904 A1 | 8/2023 |
| AT | 230037 B | 11/1963 |
| AU | 6304286 A | 3/1987 |
| AU | 588372 B2 | 9/1989 |
| AU | 4184297 A | 3/1998 |
| AU | 2004274823 A1 | 3/2005 |
| AU | 2016347691 A1 | 5/2018 |
| AU | 2016250309 B2 | 2/2019 |
| AU | 2018247307 C1 | 5/2020 |
| AU | 2020200918 B2 | 12/2021 |
| AU | 2022218559 A1 | 9/2022 |
| AU | 2022218577 A1 | 9/2022 |
| AU | 2021204246 B2 | 10/2022 |
| AU | 2017346972 B2 | 1/2023 |
| AU | 2022218579 B2 | 4/2023 |
| AU | 2021343571 A1 | 5/2023 |
| AU | 2021345381 A1 | 5/2023 |
| AU | 2022345087 A1 | 4/2024 |
| AU | 2023200579 A1 | 8/2024 |
| BR | PI0412962 A | 9/2006 |
| BR | 112017020592 A2 | 7/2018 |
| BR | 112019008080 A2 | 7/2019 |
| BR | 112017022091 B1 | 8/2021 |
| CA | 2023119 | 2/1991 |
| CA | 2534737 A1 | 3/2005 |
| CA | 2597937 C | 4/2013 |
| CA | 2924761 A1 | 4/2015 |
| CA | 2976958 | 9/2016 |
| CA | 2973612 A1 | 10/2016 |
| CA | 3032992 A1 * | 4/2018 |
| CA | 3052576 A1 | 4/2018 |
| CA | 3052572 C | 8/2020 |
| CA | 3127820 C | 3/2022 |
| CA | 3130427 A1 | 3/2022 |
| CA | 3130430 A1 | 3/2022 |
| CL | 2004000703 A1 | 3/2005 |
| CL | 2007002165 A1 | 2/2008 |
| CL | 2008001423 A1 | 8/2008 |
| CL | 2009000554 A1 | 7/2009 |
| CL | 2010001053 A1 | 12/2010 |
| CL | 2016001188 A1 | 2/2017 |
| CL | 2017002632 A1 | 3/2018 |
| CL | 2019001074 A1 | 10/2019 |
| CL | 2019002080 A1 | 10/2019 |
| CL | 2020000013 A1 | 6/2020 |
| CL | 2021002245 A1 | 3/2022 |
| CL | 2021002246 A1 | 3/2022 |
| CL | 2021002247 A1 | 3/2022 |
| CL | 202300769 | 9/2023 |
| CL | 202300770 | 9/2023 |
| CL | 2023003413 A1 | 6/2024 |
| CN | 1081471 | 2/1994 |
| CN | 1360066 A | 7/2002 |

(56) References Cited

FOREIGN PATENT DOCUMENTS

| | | | |
|---|---|---|---|
| CN | 101033508 A | 9/2007 | |
| CN | 101818258 A | 9/2010 | |
| CN | 1103789546 A | 5/2014 | |
| CN | 103993171 * | 8/2014 | ............... Y02P 10/20 |
| CN | 107532228 A | 1/2018 | |
| CN | 107532229 A | 1/2018 | |
| CN | 110860277 A | 3/2020 | |
| CN | 111850294 A | 10/2020 | |
| CN | 110352256 B | 1/2023 | |
| CN | 117467852 A | 1/2024 | |
| DE | 60001070 | 1/2003 | |
| EA | 200800687 A1 | 10/2008 | |
| EA | 013700 B1 | 6/2010 | |
| EA | 201792285 A1 | 2/2018 | |
| EC | 1768938 | 4/2018 | |
| EP | 0522978 * | 1/1993 | ............... C22B 3/18 |
| EP | 0536914 A1 | 4/1993 | |
| EP | 1190105 A1 | 3/2002 | |
| EP | 1666613 A1 | 6/2006 | |
| EP | 3283661 A1 | 2/2018 | |
| EP | 3529387 A1 | 8/2019 | |
| EP | 4045693 A2 | 8/2022 | |
| EP | 4214343 A1 | 7/2023 | |
| FI | 117941 B | 4/2007 | |
| FR | 2612200 A1 | 9/1988 | |
| GB | 1528061 | 5/1976 | |
| GB | 8622561 | 10/1986 | |
| GB | 2180829 | 4/1987 | |
| GB | 9910548 | 7/1999 | |
| GB | 2349876 | 11/2000 | |
| IN | 103993171 A | 8/2014 | |
| JP | 9-13127 | 1/1997 | |
| JP | 11-506808 | 6/1999 | |
| JP | 2010180450 A | 8/2010 | |
| JP | 2011161386 A | 8/2011 | |
| JP | 2017014555 A | 1/2017 | |
| JP | 2018513279 A | 5/2018 | |
| JP | 2019039076 A | 3/2019 | |
| JP | 2020522606 A | 7/2020 | |
| JP | 2020153018 A | 9/2020 | |
| JP | 2022001668 A | 1/2022 | |
| JP | 2023098950 A | 7/2023 | |
| KE | AP/P/2017/010264 | 7/2020 | |
| MN | 100004745 | 7/2019 | |
| MN | 10-0005216 | 2/2022 | |
| MX | 01011646 A | 11/2002 | |
| MX | PA03006955 A | 2/2005 | |
| MX | 2008003249 | 9/2009 | |
| MX | 2015002140 A | 10/2015 | |
| MX | 2014016019 A | 6/2016 | |
| MX | 2017013312 A | 9/2018 | |
| MX | 2019004592 A | 10/2019 | |
| MX | 2020006857 A | 8/2020 | |
| MX | 2023003207 A | 4/2023 | |
| PE | 20191271 A1 | 9/2019 | |
| PE | 2020-0914 | 9/2020 | |
| PE | 10509 | 2/2021 | |
| PE | 20230857 A1 | 5/2023 | |
| PE | 2024-0715 | 4/2024 | |
| PE | 20240830 | 4/2024 | |
| PE | 20240831 | 4/2024 | |
| PE | 20240832 | 4/2024 | |
| PH | 12017501886 A1 | 3/2018 | |
| RU | 2342446 C2 | 12/2008 | |
| SU | 1636463 | 3/1991 | |
| VN | 1201704560 | 3/2018 | |
| WO | 9808585 | 3/1998 | |
| WO | 9814623 A1 | 4/1998 | |
| WO | 0036168 A1 | 6/2000 | |
| WO | 2000068446 | 11/2000 | |
| WO | 03080879 A1 | 10/2003 | |
| WO | 2004029306 | 4/2004 | |
| WO | 2005028676 A2 | 3/2005 | |
| WO | 2006070052 A1 | 7/2006 | |
| WO | 2007042604 | 4/2007 | |
| WO | 2010037169 A1 | 4/2010 | |
| WO | 2012081953 A1 | 6/2012 | |
| WO | 2014150710 A1 | 9/2014 | |
| WO | 201505955 | 4/2015 | |
| WO | 2015059551 | 4/2015 | |
| WO | 2016026062 A1 | 2/2016 | |
| WO | 2016094956 A1 | 6/2016 | |
| WO | 2016141438 | 9/2016 | |
| WO | 2016165027 | 10/2016 | |
| WO | 2018072029 A1 | 4/2018 | |
| WO | 20201763 | 4/2020 | |
| WO | 2021119862 A1 | 6/2021 | |
| WO | 2022056621 A1 | 3/2022 | |
| WO | 2022056622 A1 | 3/2022 | |
| WO | 2022236437 A1 | 11/2022 | |
| WO | 2022245731 A1 | 11/2022 | |
| WO | 2023073568 A1 | 5/2023 | |
| WO | 2024057216 A1 | 3/2024 | |
| WO | 2024081705 A1 | 4/2024 | |
| WO | 2024137042 A1 | 6/2024 | |
| WO | 2024163830 A1 | 8/2024 | |
| ZA | 867144 B | 4/1988 | |
| ZA | 200601834 B | 9/2007 | |

OTHER PUBLICATIONS

"Tween 20," accessed online at https://pubchem.ncbi.nlm.nih.gov/compound/443314 on Jul. 26, 2024 (Year: 2024).*

"What is Polysorbate 40?" accessed online at https://www.huanachemical.com/what-is-polysorbitol-40.html on Jul. 26, 2024 (Year: 2024).*

Zhang, et al., Effects of Triton X-100 on Oxidative Activity of Acidithiobacillus ferrooxidans and on Chalcopyrite Bioleaching, Journal of Northeastern University (Natural Science) 2016; 37(6): 861-864 (Year: 2016).*

Triton X-100, accessed online at https://pubchem.ncbi.nlm.nih.gov/compound/Triton-X-100 on Jul. 27, 2024 (Year: 2024).*

Hughes, et al., Physical and Functional Properties of Some Higher Alkyl Polyglucosides, Journal of the American Oil Chemists' Society 1970; 47(5): 162-167 (Year: 1970).*

Zhang, et al., Catalytic effect of polyethylene glycol on sulfur oxidation in chalcopyrite bioleaching by Acidithiobacillus ferrooxidans, Minerals Engineering 2016; 95: 74-78 (Year: 2016).*

Khayati, et al., Extraction of Cu(II) ions from aqueous media using PEG/Sulphate salt aqueous two-phase system, Separation Science and Technology 2016; 51(4): 601-608 (Year: 2016).*

Sequeira, C. A.C., et al., "Chemical metathesis of chalcopyrite in acidic solutions", Hydrometallurgy, vol. 92, No. 3, 2008, 135-140.

Torma , et al., "Effects of Surface Active Agents on the Oxidation of Chalcopyrite by Thiobacillus Ferrooxidans", Hydrometallurgy, vol. 1, 1976, 301-309.

Ubaldini , et al., "An innovative thiourea gold leaching process", Hydrometallurgy, vol. 48, 1998, 113-124.

Umland , et al., "Complex Compounds in Analytical Chemistry", Moscow, 1975, 69-72.

Umland , et al., "Coordination compounds in analytical chemistry. Theory and practice", Mir, Moscow, 1975, 127-128.

Vedejx , et al., "2,2-Dimethlypropanethial: A Long-Lived Aliphatic Thioaldehyde", J. Am. Chem. Soc., 1983, 1683-1684.

Velasquez-Yevenes, L. , et al., "The dissolution of chalcopyrite in chloride solutions: Part 1. The effect of solution potential", Hydrometallurgy, vol. 103, No. 1, 2010, 108-113.

Wang , et al., "Mineralogy and Pretreatment of a Refractory Gold Deposit in Zambia", Minerals, vol. 9, No. 406, 2019, 1-16.

Watling, H. R., "Chalcopyrite hydrometallurgy at atmospheric pressure: 2. Review of acidic chloride process options", Hydrometallurgy, vol. 146, 2014, 96-110.

Whitehead, J. A., et al., "Application of 1-alkul-3-methyl-imidazolium ionic liquids in the oxidative leaching of suphidic copper, gold and silver ores", Hydrometallurgy, vol. 88, Elsevier B.V., 2007, 109-120.

Wilson, J. P., et al., "Cuprice Chloride Leaching of Chalcopyrite", JOM, vol. 33, No. 2, 1981, 52-57.

(56) References Cited

OTHER PUBLICATIONS

Winand, Rene, "Chloride Hydrometallurgy", Hydrometallurgy, vol. 26, No. 2, 12/1001, 285-316.

Xing, et al., "A Review on the Recovery of Noble Metals from Anode Slimes", Mineral Processing and Extractive Metallurgy Review, 2019, 1-14.

Yanez, et al., "Heap Leaching Improvements Using a New Leaching Aid Reagent", 11th International Seminar on Process Hydrometallurgy, Jun. 19-Jun. 21, 2019, Santiago Chile, 2019.

Yang, et al., "A Copper and Iron K-edge XANES Study on Chalcopyrite Leached by Mesophiles and Moderate Thermophiles", Minerals Engineering, vol. 48, 2013, 31-35.

Yang, Xiyun, et al., "The interaction of thiourea and formamidine disulfide in the dissoluation of gold in sulfuric acid solutsion", Minerals Engineering, vol. 23, 2010, 698-704.

Zhang, et al., "Catalytic Effect of Polyethylene Glycol on Sulfur Oxidation in Chalcopyrite Bioleaching by Acidithiobacillus Ferrooxidans", Minerals Engineering, vol. 95, 2016, 74-76.

Zhang, et al., "Effects of Triton X-100 on Oxidative Activity of Acidthiobacillus Ferrooxidans and on Chalcopyrite Bioleaching", Journal of Northeaster University (Natural Science), vol. 37, No. 6, 2016, 861-864.

Zhang, et al., "Enhancing the Leaching of cChalcopyrite Using Acidithiobacillus ferrooxidans under the Induction of Surfactant Triton X-100", Minerals, vol. 1, No. 11, 2019, 1-15.

Zhu, Tun, "The redox reaction between thiourea and ferric iron and catalysis of sulphide ores", Hydrometallurgy, vol. 28, No. 3, Apr. 1992, 381-397.

"Castromil Portugal", www.medgoldresources.com (projects.gtk.fi/export/sites/projects/susmin/about/Castromil_cas_study.pdf), Jan. 13, 2015.

"Thioaldehydes", Wikipedia, accessed online Oct. 16, 2020, https://ru/wikipedia.org/wili/thioaldehydes.

"Thioketones", Wikipedia, accessed online Oct. 16, 2020, https://ru/wikipedia.org/wiki/thioketones.

Akretche, Djamal-Eddine, et al., "Selective leaching of a polymetalic complex ore by sulphuric acid and thiourea mixed with sea water", Hydrometallurgy vol. 38, 1995, 189-204.

Ando, et al., "The First Stable Enethiolizable Thioaldehyde via a Zirconocene q2-Thioacyl Complex", J. Am. Chem. Soc, vol. 113, 1991, 7782-7784.

Armstrong, S. K., et al., "Cross-referenced combinatorial libraries for the discovery of metal-complexing ligans: library deconvolution by LC-MS", Analyst, vol. 125, No. 12, 2000, 2206-2215.

Bombicz, et al., "Synthesis, Vibrational Spectra and X-Ray Structures of Copper(I) Thiourea Complexes", Inorganica Chimica Acta, vol. 357, 2004, 513-525.

Bouffard, et al., "Use of Lignosulfonate for Elemental Sulfur Biooxidation and Copper Leaching", Minerals Engineering, vol. 22, 2009, 100-103.

Bowmaker, Graham A., "Crystal Structures and Vibrational Spectroscopy of Copper(I) Thiourea Complexes", Inorganic Chemistry, vol. 48, No. 1, Jan. 5, 2009, 350-368.

Castineiras, et al., "Thione Complexes of Group IIB Dihalides, X-Ray Crystal Structure of Cd(ETTC)212", Polyhedron, vol. 7, No. 24, 1988, 2503-2508.

Cerda, C. P., et al., "Effect of Pretreatment on Leaching Primary Copper Sulfide in Acid-Chloride Media", Minerals, vol. 8, No. 1, 2018, 1.

Chen, et al., "A Study of the Leaching of Gold and Silver by Acidothioureation", Hydrometallurgy, vol. 5, 1980, 207-212.

Deschenes, G., et al., "Leaching of gold from a chalcopyrite concentrate by thiourea", Hydrometallurgy, vol. 20, No. 2, Jan. 1, 1988, 179-202.

Dixon, et al., "Mathematical Modeling of Heap Leaching Under Drip Irrigation", The Southem Institute of Mining and Metallurgy Percolation Leaching: The Status globally and in southern Africa, 2011, 1-29.

Doona, Christopher J., et al., "Equilibrium and redox kinetics of copper(II)-thiourea complexes", Inorganic Chemistry, vol. 35, No. 11, May 22, 1996, 3210-3216.

Duncan, et al., "Leaching of Chalcopyrite with Thiobacillus Ferroxidans: Effect of Surfactants and Shaking", applied Microbiology, vol. 12, No. 2, 1964, 122-126.

Fiscor, "Pinto Valley's Optimization Program Pays Big Dividends", Arizona Mining, 2021, AZ4-AZ8.

Garcia, et al., "Elemtal Sulfur Coarsening Kinetics", Geochemical Transactions, vol. 15, No. 11, 2014.

Garcia, et al., "Growth of Thiobacillus Ferrooxidens on Solid Medium: Effects of Some Surface Active Agents on Colony Formation", J. Gen. Appl. Microbiol., vol. 38, 1992, 279-282.

Ghadiri, et al., "Effect of Surfactant on the Growth and Activity of Microorganisms in a Heap Bioleaching System", Minerals Engineering, vol. 139, 2019, 43-51.

Shahremaninezhad, et al., "Electrochemical Evaluation of the Surface of Chalcopyrite during Dissolution in Sulfuric Acid Solution", Electrochimica Acta, vol. 55, 2010, 5041-5056.

Grgorova, B., et al., "Simultaneous determination of thioreau and formamidine disulphide, using reversed-phase high-performance liquid chromatography and a UV detector", Journal of Chromatography A., vol. 368, 1986, 444-449.

Groenewald, et al., "The Dissolution of Gold in Acidic Solutions of Thiourea", Hydrometallurgy, vol. 1, 1976, 277-290.

Hackl, et al., "Passivation of Chalcopyrite During Oxidative Leaching in Sulfate Media", Hydrometallurgy, vol. 39, 1995, 25-48.

Hiroyoshi, et al., "Effects of Several Inhibitors to Thiobacillus Ferroxidans on Ferrous Promoted Chalcopyrite Leaching", Shigento-Sozal, vol. 115, 1999, 172-176.

Hiroyoshi, et al., "Enhancement in Bacterial Leaching of Chalcopyrite by Polyoxyethylene Sorbitan Monolaurate Addition", Shigento-Sozi, vol. 111, 1995.

Itakura, et al., "Branching Mechanism of Intergranular Crack Propagation in Three Dimensions", Physical Review E, vol. 71, 2005, 055102-1-4.

Jansons, "Dithiocarboxylic Acids, Their Esters, and Metal Dithiocarboxylates", Russian Chemical Reviews, vol. 45, No. 11, 1976, 1035-1051.

Kingma, et al., "Autotrophic Growth of Thiobacillus acidophilus in the Presence of a Furace-Active Agent, Tween 80", Applied and Environmental Microbiology, vol. 38, No. 5, 1979, 795-799.

Krishnamoorthy, et al., "Adsorption Modeling of Catalyzed Heap Leaching", Second Canada—China Nonferrous Metallurgy Forum, Poster Abstract, 2019.

Krishnamoorthy, et al., "Modeling Solute Distribution in a Column", Second Canada—China Nonferrous Metallurgy Forum, Poster, 2019.

Leonida, et al., "Disruptive Metallurgy for Cleaner, Greener Battery Metals", Engineering & Mining Journal, 2021, 34-39.

Li, J., et al., "Reaction kinetics for gold dissolution in acid thiourea solution using formamidine disulfide as oxidant", Hydrometallurgy, vol. 63, Elsevier Science B.V., 2002, 215-223.

Lu, Z. Y., et al., "The effect of chloride ions on the dissolution of chalcopyrite in acidic solutions", Hydrometallurgy, vol. 56, No. 2, 2000, 189-202.

Mironov, I V, et al., "Complexation of copper(I) by thiourea in acidic aqueous solution", J Solution Chem, vol. 25, No. 3, Mar. 1996, 315-325.

Montero, et al., "A Solute Transport Model for the Acid Leaching of Copper in Soil Columns", Soil Sci. Soc. Am. J., vol. 58, 1994, 678-686.

Okazaki, et al., "First Isolation of a Stable Aliphatic Thioaldehyde, Tris(trimethlsilyl)ethanethial", J. Am. Chem. Soc., vol. 109, 1987, 279-280.

Okazaki, et al., "Synthesis of 2,4,6-Tri-t-Butylthiobenzaldehyde, the First Stable Thiobenzaldehyde", J. Chem. Soc., Chem Commun., vol. 105, 1982, 1187-1188.

Olvera, et al., "Electrochemical Dissolution of Chalcopyrite in the Presence of Thiourea and Formamidine Disulfide" Hydrometallurgy, vol. 179, 2018, 110-117.

(56) References Cited

OTHER PUBLICATIONS

Oraby, Elsayed A., "Gold Leaching in Thiosulfate Solutions and Its Environmental Effects Compared with Cyanide", Thesis from Curtin University of Technology, 2009.
Orgul, S , et al., "Gold Extraction from Kaymaz Gold Ore by Thiourea Leaching", Proceedings of the XXI International Mineral Processing Congress, Hydro and Biohydrometallurgy, vol. 13, 2000, C6-22-C6-28.
Peng , et al., "Effect of Furfactant Tween-80 on Sulfur Oxidation and Expressions of Sulfur Metabolism Relevant Genes of Acidithiobacillus Ferroxidans", Transactions of Nonferrous Metals Society of China, vol. 22, 2012, 3147-3155.
Piro , et al., "Two Thiourea-Containing Gold(I) Complexes", Acta Cryst., C58, 2002, m252-m255.
Quezada, V. , et al., "Effect of pretreatment prior to leaching on a chalcopyrite mineral in acid media using NaCl and KNO3", Journal of Materials Research and Technology, vol. 9, No. 5, 2020, 10316-10324.
Reguly , "New Technologies Speed Low-Carbon Future", The Globe and Mail, 2021, B8.
Ren , "Catalytic Effect of Ethylene Thiourea on the Leaching of Calcopyrite", Hydrometallurgy, vol. 196, 2020, 105410-1-9.
Ren , et al., "Depassivation of Chalcopyrite with Jetti Catalyst", Second Canada—China Nonferrous Metallurgy Forum, Poster, 2019.
Sand , "The Influence of Four Detergents on the Substrate Oxidation by Thiobacillus Ferrooxidans", Environmental Technolog Letters, vol. 6, 1985, 439-444.
Sandoval , et al., "Effect of Nonionic Surfactants on Chalcopyrite Leaching Under Dump Chemical Conditions", Report of Investigations, Bureau of Mines, 1990.
Selim , et al., "Modeling Nonlinear Kinetic Behavior of Copper Adsorption-Desorption in Soil in Physical and Chemical Processes of Water and Solute Transport/Retention in Soil", SSA Special Publication No. 56, 555A, Madison, WI, 2001, 189-212.
Rebolledo, M. (2017), "Kinetic study of the dissolution of chalcopyrite in the presence of a catalyst under acidic sulfate medium" University of British Columbia. Retrieved from https://open.library.ubc.ca/collections/ubctheses/24/items/1.0349087.
Li, Xiaohua , et al., "Solvometallurgical process for extraction of copper from chalcopyrite and other sulfidic ore minerals", Green Chemistry, vol. 22, issue 2, 10.1039/C9GC02983D., 2020, 417-426.
Solis-Marcial, O.J. , et al., "Chalcopyrite leaching in alcoholic acid media", vols. 147-148, DOI: 10.1016/j.hydromet., Apr. 11, 2014.
Tehrani, Mohammad Ebrahim Haji Naghi, et al., "Electrochemical Study and XPS Analysis of Chalcopyrite Dissolution in Sulfuric Acid in the Presence of Ethylene Glycol", Electrochimica Acta, 2021, vol. 369, article No. 137663, 10 pp: DOI:10.1016/j.electacta.2020.137663, 2021, 1-10.
Aleksei, K , "Hydrothermal pretreatment of chalcopyrite concentrate with copper sulfate solution", Hydrometallurgy, 195., 2020, 105359.
Alkis, S. , et al., "Synthesis of ultra-small Si/Ge semiconductor nano-particles using electrochemistry.", Materials Chemistry And Physics, 134(2-3)., 2012, 616-622.
Bartlett, R.W. , et al., "Upgrading copper concentrate by hydrothermally converting chalcopyrite to digenite", Metallurgical and Materials Transactions B, 23(3)., 1992, 241-248.
Bender, Jack , et al., "Field Results From Leaching Aid Trials Using BASF'S LixTRA Reagent", Proceedings of ALTA 2019 Nickel-Cobalt-Copper Sessions including Pressure Acid Leaching Forum, ALTA 2019 Nickel-Cobalt-Copper Proceedings, Perth Australia, May 20-22, 2019, p. 415, 55 pages.
Chaiko, C.P., et al., "The FLS Rapid Oxidative Leach (ROL) Process. Part I: Mechano-Chemical Process for Treating Chalcopyrite", 2015.
Zhang, S.H. , et al., "Electrochemistry Studies of Semiconductor Properties of Structure Materials in the Nuclear Power Plants by Zinc Injection Technique", Asia-Pacific Power And Energy Engineering Conference (Appeec)., 2011.

Fajardo, Daniel , "Startup chilena Ceibo levanta US$30 millones en EE.UU. para desarrollar tecnología sustentable de extracción de cobre", Jun. 5, 2023, 3 pages.
Fleet, Michael E., et al., "Gold-bearing arsenian pyrite and marcasite and arsenopyrite from Carlin Trend gold deposits and laboratory synthesis", American Mineralogist 82., 1997, 182-193.
Kobasko, N. , et al., "Mechanism of Surface Compressive Stress Formation by Intensive Quenching", 2005.
Liu, J. , et al., "Etching Induced Stepped Nanostructure on Pb(Mg(1-x/2)Mn(x/2)W1/2)03 Ceramics", Journal of the American Ceramic Society, 99(4)., 2016, 1125-1128.
Lozano, D.E. , et al., "X-ray Determination of Compressive Residual Stresses in Spring Steel Generated by High-Speed Water Quenching", Materials (Basel, Switzerland), 12(7)., 2019, 1154.
Miyoshi, Y , et al., "Crystal Structure, Spin Polarization, Solid-State Electrochemistry, and High n-Type Carrier Mobility of a Paramagnetic Semiconductor: Vanadyl Tetrakis(thiadiazole)porphyrazine", Inorganic Chemistry, . 51(1), 2012, 456-462.
Pan, J.-S. , et al., "Growth mechanism of relaxor-PbTiO3 single crystals shown by morphology of crystalline grains in ceramics. Journal of Crystal Growth", 284(1)., 2005, 275-280.
Robertson, SW , et al., "A Bacterial Heap Leaching Approach for the Treatment of Low Grade Primary Copper Sulphide Ore", The South African Institute of Mining and Metallurgy, The Third Southern African Conference on Base Metals, 2005, 471-484.
Robertson, SW , et al., "Advances in high-temperature heap leaching of refractory copper sulphide ores", The Journal of The South African Institute of Mining and Metallurgy, vol. 112, Dec. 2012, 1045-1050.
Southwood, M.J. , "The acid leaching of nickel and copper from sulphidic ore in the presence of pyrite", Journal of the South African Institute of Mining and Metallurgy, vol. 85, No. 11., Nov. 1985, 395-401.
Todorova M, et al., ", Extending the Concept of Defect Chemistry from Semiconductor Physics to Electrochemistry", Physical Review Applied, 1(1)., 2014.
Todorova, M , et al., "Connecting semiconductor defect chemistry with electrochemistry: Impact of the electrolyte on the formation and concentration of point defects in ZnO", Surface Science, vol. 631, 2015, 190-195.
Uhrie, John L., "Pyrite As A Stockpile Leach-Aid", The Minerals, Metals and Materials Society., 1999, 481-490.
"Noble Metals", www.britannica.com/science/noble-metal, May 6, 2021, 1 page.
Benzaazoua, M. , et al., "Gold-bearing arsenopyrite and pyrite in refractory ores: analytical refinements and new understanding of gold mineralogy", Mineralogical Magazine, 71(2), oi: 10.1180/minmag.2007.071.2.123, 2007, 123-142.
Dabrowski , "The influence of pyrite pre-oxidation on gold recovery by cyanidation", Minerals Engineering, vol. 19, Issue 9, ISSN 0892-6875, https://doi.org/10.1016/j.mineng.2005.09.052., 2006, 883-895.
Deditius, Artur P., et al., "A proposed new type of arsenian pyrite: Composition, nanostructure and geological significance", Geochimica et Cosmochimica Acta, vol. 72, Issue 12, ISSN 0016-7037, https://doi.org/10.1016/j.gca.2008.03.014., 2008, 2919-2933.
Krishnamoorthy, Prashanth , et al., "Modeling the distribution of an adsorbing solute in a catalytic column", Minerals Engineering, vol. 182, 107556, ISSN 0892-6875, https://doi.org/10.1016/j.mineng.2022.107556. (https://www.sciencedirect.com/science/article/pii/S0892687522001662), Aug. 18, 2021, 15 pages.
Mao, Xuhui , et al., "Use of surfactants for the remediation of contaminated soils: A review", Journal of Hazardous Materials, ISSN 0304-3894, https://doi.org/10.1016/j.jhazmat.2014.12.009., 2015, 419-435.
Mora, Nelson , et al., "Implementation of Jetti Resources Catalytic Technology at Pinto Valley Minte to Leach Low-Grade Chalcopyrtie Ore", Hidrometallurgy, Copper 2022, Jetti Resources, USA, Pinto Valley Mining Corporation, USA, Worley, Australia, Nov. 2022, 479-496.
Ren, Zihe , et al., "New perspective on the depassivation mechanism of chalcopyrite by ethylene thiourea", Minerals Engineering, vol. 204, 08358, ISSN 0892-6875, https://doi.org/10.1016/j.mineng.2023.

(56) References Cited

OTHER PUBLICATIONS 108358. (https://www.sciencedirect.com/science/article/pii/S0892687523003722), May 17, 2023, 8 pages.

Ren, Zihe, et al., "The Nature of the Passivation Layer on Chalcopyrite Formed During Leaching", Hidrometallurgy, Jetti Services Canada., 429-442.

Ren, Zihe, et al., "The overlooked mechanism of chalcopyrite passivation", Acta Materialia, vol. 26, 118111., Sep. 2022, 236.

Simon, Grigore, et al., "Oxidation state of gold and arsenic in gold-bearing arsenian pyrite", American Mineralogist, vol. 84, doi.org/10.2138/am-1999-7-809., 1999, 1071-1079.

Winarko, Ronny, "Iodine-Assisted Heap Leaching of Chalcopyrite: Laboratory and Modelling Studies", University of British Columbia. Retrieved from https://open.library.ubc.ca/collections/ubctheses/24/items/1.0416283, Jul. 2022.

Zhang, Fuxin, et al., "Geochemical study of gold and arsenic mineralization of the carlin-type gold deposits", Qinling Region, China, Geochemistry, vol. 20, issue 4, 10.1007/bf03166858., Dec. 1, 2001, 333-342.

\* cited by examiner

EXTRACTING BASE METALS USING A WETTING AGENT AND A THIOCARBONYL FUNCTIONAL GROUP REAGENT

CROSS-REFERENCE TO RELATED APPLICATIONS

This application is a continuation-in-part of Patent Cooperation Treaty Application No. PCT/CA2021/051262 filed Sep. 10, 2021, which claims the benefit of priority from U.S. provisional application No. 63/080,578 filed on Sep. 18, 2020 and U.S. provisional application No. 63/212,518 filed on Jun. 18, 2021. The specifications and claims thereof are incorporated herein by reference.

FIELD

The present disclosure relates to the use of a wetting agent such as a non-ionic wetting agent and a reagent comprising a thiocarbonyl functional group, for example, in a process/method for extracting a base metal such as copper from a material comprising the base metal.

BACKGROUND

Chalcopyrite, a copper iron sulfide having the chemical formula $CuFeS_2$ accounts for approximately 70% of known copper reserves. Hydrometallurgical processing accounts for approximately 20% of copper produced worldwide but it is not currently used for chalcopyrite ores. Rather, pyrometallurgical methods are used for concentrates of these ores.

Aqueous processing of minerals may present several advantages over pyrometallurgical approaches, particularly when dealing with complex and/or low-grade ores. The main disadvantage of known hydrometallurgical processes/methods, when applied to chalcopyrite and some other sulfide ores, is the low extraction rates.

Certain surfactants such as Tween™ 20, Tween™ 40, Tween™ 60, Tween™ 80 and Triton™ X-100 have been used as a leaching aid for the extraction of copper from its ores such as chalcopyrite. Similar to Triton X-100 and the Tween series surfactants containing a repeating ethoxylate (EO) functional group, polyethylene glycol (PEG) has also been reported to have a catalytic effect in the bioleaching of chalcopyrite. It has also been shown that a thiocarbonyl compound can increase the extraction of metal sulfides in an acidic ferric environment. However, it remains desirable to develop new methods where high copper extractions are achieved in shorter timescales that are of industrial interest.

SUMMARY

A hydrometallurgical process/method for extracting base metals such as copper from materials such as copper sulfide ores using a reagent having/comprising a thiocarbonyl functional group and wetting agents as enhancers for the process/method is described herein. In the examples described in greater detail below, the use of the reagent having/comprising a thiocarbonyl functional group with the wetting agents creates a synergistic effect which enhanced extraction in comparison to use of either reagent alone.

Accordingly, the present disclosure includes a method for extracting a base metal from a material comprising the base metal, the method comprising contacting the material under acidic conditions with a wetting agent and a reagent comprising a thiocarbonyl functional group.

In an embodiment, the material is contacted with the reagent comprising a thiocarbonyl functional group by a method comprising: contacting the material with an acidic mixture comprising the reagent comprising a thiocarbonyl functional group.

In another embodiment, the acidic mixture further comprises the wetting agent and the material is contacted with the wetting agent and the reagent comprising a thiocarbonyl functional group by a method comprising: contacting the material with the acidic mixture comprising the wetting agent and the reagent comprising a thiocarbonyl functional group.

Alternatively described, the present disclosure includes a method of recovering at least one base metal ion from a material comprising at least one base metal, the method comprising: contacting the material under acidic conditions with a reagent comprising a thiocarbonyl functional group and a wetting agent to produce a pregnant solution comprising the at least one base metal ion; and recovering the at least one base metal ion from the pregnant solution. In embodiments where the reagent comprising a thiocarbonyl functional group is provided in the form of the corresponding dimer, i.e. FDS, the method comprises: contacting the material under acidic conditions with FDS and a wetting agent to produce a pregnant solution comprising the at least one base metal ion; and recovering the at least one base metal ion from the pregnant solution. In an embodiment, contacting the material to produce the pregnant solution comprises extracting the at least one base metal ion from the material.

In an embodiment, the material is agglomerated prior to contact.

In an embodiment, the material is contacted with the wetting agent and the reagent comprising a thiocarbonyl functional group by a method comprising agglomerating the material in the presence of the wetting agent prior to contact with the acidic mixture.

In an embodiment, the acidic mixture further comprises an oxidizing agent. In another embodiment, the oxidizing agent comprises ferric sulfate.

In an embodiment, the material further comprises iron-oxidizing bacteria.

In an embodiment, the acidic mixture further comprises iron-oxidizing bacteria.

In an embodiment, the material is a material comprising a base metal sulfide.

In an embodiment, the material comprises an ore.

In an embodiment, the base metal comprises copper.

In an embodiment, the material comprises a copper sulfide ore. In another embodiment, the copper sulfide ore comprises chalcopyrite, bornite, enargite, covellite, chalcocite, a copper sulfide of the formula $Cu_xS_y$ wherein the x:y ratio is between 1 and 2 or combinations thereof. In a further embodiment, the copper sulfide ore comprises chalcopyrite.

In an embodiment, the method comprises adding sulfuric acid to obtain the acidic conditions. In another embodiment, prior to the contact, the pH of the acidic mixture comprises range of from about 1.5 to about 2.5. In a further embodiment, the pH of the acidic mixture comprises a range of about 0 to about 2.

In an embodiment, the reagent comprising a thiocarbonyl functional group is added in monomeric form. In another embodiment, the reagent comprising a thiocarbonyl functional group is added to the method in the form of the corresponding dimer.

In an embodiment, the reagent comprising a thiocarbonyl functional group comprises thiourea, ethylene thiourea, thioacetamide, sodium dimethyldithiocarbamate, trithiocarbonate, thiosemicarbazide or combinations thereof. In another embodiment, the reagent comprising a thiocarbonyl functional group comprises thiourea.

In an embodiment, the wetting agent comprises a non-ionic wetting agent. In another embodiment, the non-ionic wetting agent comprises a non-ionic ethoxylate surfactant, a polyethylene glycol or combinations thereof. In another embodiment, the non-ionic ethoxylate surfactant is selected from a polysorbate, an alkylphenyl ether of polyethylene glycol or a reduced form thereof, an alkylether of polyethylene glycol and combinations thereof.

In an embodiment, the non-ionic wetting agent comprises a polysorbate. In another embodiment, the polysorbate comprises one or more compounds of formula (I):

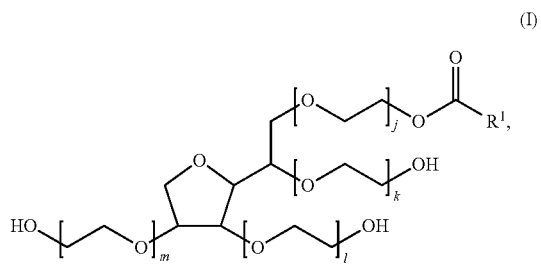

wherein $R^1$ is $C_{4-30}$alkyl, $C_{4-30}$alkenyl or $C_{4-30}$alkynyl; and j+k+l+m=20.

In an embodiment, the polysorbate comprises polysorbate 20, polysorbate 40, polysorbate 60, polysorbate 80 or combinations thereof. In another embodiment, the polysorbate comprises a Tween™ series surfactant. In a further embodiment, the polysorbate comprises Tween™ 20.

In an embodiment, the non-ionic wetting agent is an alkylphenyl ether of polyethylene glycol. In another embodiment, the alkylphenyl ether of polyethylene glycol comprises one or more compounds of the Formula (II):

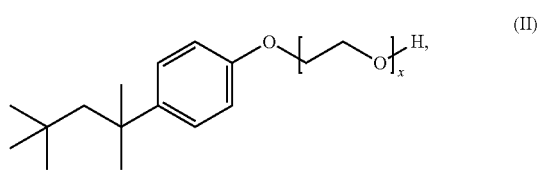

wherein x is 5-20.

In a further embodiment, the alkylphenyl ether of polyethylene glycol comprises Triton™ X-100.

In an embodiment, the non-ionic wetting agent is a polyethylene glycol, poly(ethylene oxide), poly(oxyethylene), or a combination thereof. In another embodiment, the polyethylene glycol comprises an average molecular weight of from about 100 g/mol to about 300 g/mol. In a further embodiment, the polyethylene glycol comprises polyethylene glycol 200, polyethylene glycol 300, polyethylene glycol 400, polyethylene glycol 600 or a combination thereof.

In an embodiment, the non-ionic wetting agent is tergitol. The tergitol may be tergitol 15-S-20. In another embodiment, the non-ionic wetting agent is an alkyl polyglycoside. The alkyl polyglycoside may be Triton CG 110. In another embodiment, the non-ionic wetting agent is a poly(ethylene glycol)-block-poly(propylene glycol)-block-poly(ethylene glycol) (PEG-PPG-PEG). The PEG-PPG-PEG may be Pluronic® F-108. In another embodiment, the non-ionic wetting agent is a nonyl phenol ethoxylate or alcohol ethoxylate. In another embodiment, the non-ionic wetting agent is a lignosulfonate.

In an embodiment, the material is contacted with the wetting agent and the reagent comprising a thiocarbonyl functional group in a method comprising a percolation leach, a tank leach, or a vat leach. In another embodiment, the percolation leach is a heap, a dump or a column leach. In a further embodiment, the material is contacted with the wetting agent and the reagent comprising a thiocarbonyl functional group in a method comprising a heap leach.

In an embodiment, the method further comprises recovering the base metal. In an embodiment, the contacting of the material with the wetting agent and the reagent comprising a thiocarbonyl functional group produces a pregnant leach solution comprising the base metal and the method further comprises recovering the base metal from the pregnant leach solution. In an embodiment, the recovering comprises solvent extraction and electrowinning. In another embodiment, prior to the solvent extraction, the method further comprises a solid-liquid separation. In an embodiment, the method further comprises recovering the reagent comprising a thiocarbonyl functional group. In another embodiment, the method further comprises recycling the recovered reagent comprising a thiocarbonyl functional group for use in the contacting of a further portion of the material.

In an embodiment, the material is contacted with the wetting agent and the reagent comprising a thiocarbonyl functional group at ambient temperature and pressure. Ambient pressure at sea level is at approximately 1 atm, but may be different at various altitudes.

In an embodiment, the method comprises a batch method.

In an embodiment, the method comprises a continuous method.

The present disclosure also includes a use of a wetting agent and a reagent comprising a thiocarbonyl functional group in a method for extracting a base metal from a material comprising the base metal. In an embodiment, the method is a method for extracting a base metal from a material comprising the base metal as described herein.

The present disclosure also includes a use of a wetting agent and a reagent comprising a thiocarbonyl functional group for extracting a base metal from a material comprising the base metal, wherein the material is contacted under acidic conditions with the wetting agent and the reagent comprising a thiocarbonyl functional group.

In an embodiment, the material is contacted with the reagent comprising a thiocarbonyl functional group by a method comprising: contacting the material with an acidic mixture comprising the reagent comprising a thiocarbonyl functional group.

In an embodiment, the acidic mixture further comprises the wetting agent and the material is contacted with the wetting agent and the reagent comprising a thiocarbonyl functional group by a method comprising: contacting the material with the acidic mixture comprising the wetting agent and the reagent comprising a thiocarbonyl functional group.

In an embodiment, the material is contacted with the wetting agent and the reagent comprising a thiocarbonyl functional group by a method comprising agglomerating the material in the presence of the wetting agent prior to contact with the acidic mixture.

In an embodiment, the acidic mixture further comprises an oxidizing agent. In another embodiment, the oxidizing agent comprises ferric sulfate.

In an embodiment, the material further comprises iron-oxidizing bacteria.

In an embodiment, the acidic mixture further comprises iron-oxidizing bacteria.

In an embodiment, the material is a material comprising a base metal sulfide.

In an embodiment, the material comprises an ore.

In an embodiment, the base metal comprises copper.

In an embodiment, the material comprises a copper sulfide ore. In another embodiment, the copper sulfide ore comprises chalcopyrite, bornite, enargite, covellite, chalcocite, a copper sulfide of the formula CuxSy wherein the x:y ratio is between 1 and 2 or combinations thereof. In a further embodiment, the copper sulfide ore comprises chalcopyrite.

In an embodiment, sulfuric acid is added to obtain the acidic conditions. In another embodiment, prior to the contact, the pH of the acidic mixture comprises a range of from about 1.5 to about 2.5. In a further embodiment, the pH of the acidic mixture comprises a range of about 0 to about 2.

In an embodiment, the reagent comprising a thiocarbonyl functional group is added in monomeric form. In another embodiment, the reagent comprising a thiocarbonyl functional group is added in the form of the corresponding dimer.

In an embodiment, the reagent comprising a thiocarbonyl functional group comprises thiourea, ethylene thiourea, thioacetamide, sodium dimethyldithiocarbamate, trithiocarbonate, thiosemicarbazide or combinations thereof. In another embodiment, the reagent comprising a thiocarbonyl functional group comprises thiourea.

In an embodiment, the wetting agent is a non-ionic wetting agent. In another embodiment, the non-ionic wetting agent comprises a non-ionic ethoxylate surfactant, a polyethylene glycol, or combinations thereof. In another embodiment, the non-ionic ethoxylate surfactant is selected from a polysorbate, an alkylphenyl ether of polyethylene glycol or a reduced form thereof, an alkylether of polyethylene glycol and combinations thereof.

In an embodiment, the non-ionic wetting agent comprises a polysorbate. In another embodiment, the polysorbate is one or more compounds of formula (I):

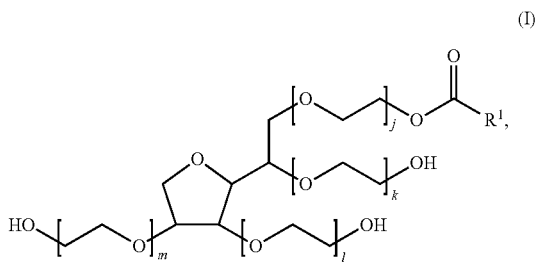

(I)

wherein $R^1$ is $C_{4\text{-}30}$alkyl, $C_{4\text{-}30}$alkenyl or $C_{4\text{-}30}$alkynyl; and $j+k+l+m=20$.

In an embodiment, the polysorbate comprises polysorbate 20, polysorbate 40, polysorbate 60, polysorbate 80 or combinations thereof. In another embodiment, the polysorbate comprises a Tween™ series surfactant. In a further embodiment, the polysorbate comprises Tween™ 20.

In an embodiment, the non-ionic wetting agent is an alkylphenyl ether of polyethylene glycol. In another embodiment, the alkylphenyl ether of polyethylene glycol comprises one or more compounds of the Formula (II):

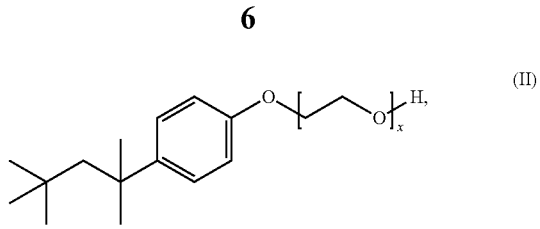

(II)

wherein x is 5-20.

In a further embodiment, the alkylphenyl ether of polyethylene glycol is Triton™ X-100.

In an embodiment, the non-ionic wetting agent is a polyethylene glycol. In another embodiment, the polyethylene glycol has an average molecular weight of from about 100 g/mol to about 300 g/mol. In a further embodiment, the polyethylene glycol comprises polyethylene glycol 200.

In an embodiment, the material is contacted with the wetting agent and the reagent comprising a thiocarbonyl functional group at ambient temperature and pressure. Ambient pressure at sea level is at approximately 1 atm, but may be different at various altitudes.

Other features and advantages of the present disclosure will become apparent from the following detailed description. It should be understood, however, that the detailed description and the specific examples, while indicating embodiments of the disclosure, are given by way of illustration only and the scope of the claims should not be limited by these embodiments, but should rather be given the broadest interpretation consistent with the description as a whole.

BRIEF DESCRIPTION OF THE DRAWINGS

The embodiments of the disclosure will now be described in greater detail with reference to the attached drawings, in which:

FIG. 6 also demonstrated the beneficial effect of adding PEG 600 to the activity of iron-oxidizing bacteria in comparison with control method (Control) and thiourea only method (Tu).

FIG. 7 also demonstrated the beneficial effect of adding Tween™ 40 to the activity of iron-oxidizing bacteria in comparison with control method and thiourea only method.

DETAILED DESCRIPTION

I. Definitions

Figure 1:
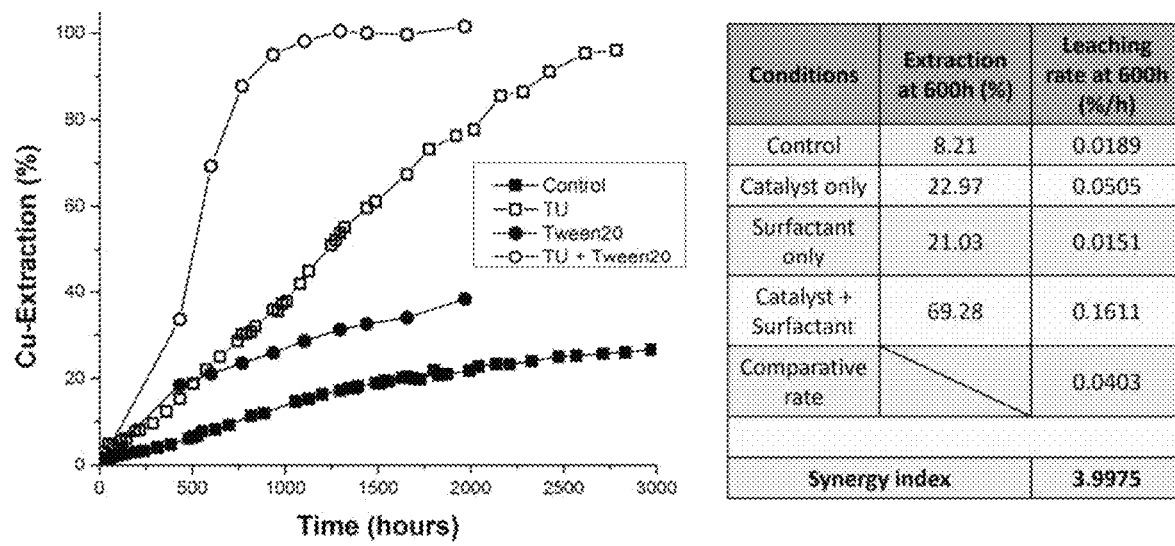
FIG. 1 is a graph showing the synergistic effect of adding thiourea (0.5 mM) and Tween™ 20 (30 ppm) in a method for copper extraction from natural chalcopyrite ore according to an embodiment of the present disclosure (TU+Tw) in comparison to a control method without either thiourea or Tween 20 (C), a control method with Tween 20 (Tw) and a control method with thiourea (TU) according to comparative examples of the present disclosure.

Unless otherwise indicated, the definitions and embodiments described in this and other sections are intended to be applicable to all embodiments and aspects of the disclosure herein described for which they would be understood to be suitable by a person skilled in the art.

As used herein, the words "comprising" (and any form thereof, such as "comprise" and "comprises"), "having" (and any form thereof, such as "have" and "has"), "including" (and any form thereof, such as "include" and "includes") or "containing" (and any form thereof, such as "contain" and "contains") are used interchangeably are inclusive or open-ended and do not exclude additional, unrecited elements or process/method steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the term it modifies.

As used in this disclosure, the singular forms "a", "an" and "the" include plural references unless the content clearly dictates otherwise.

The term "and/or" as used herein means that the listed items are present, or used, individually or in combination. In effect, this term means that "at least one of" or "one or more" of the listed items is present or used.

The term "alkyl" as used herein, whether it is used alone or as part of another group, means straight or branched chain, saturated alkyl groups. The number of carbon atoms that are possible in the referenced alkyl group are indicated by the numerical prefix "$C_n$-n2". For example, the term $C_{4-30}$alkyl is an alkyl group having 4, 5, 6, 7, 8, 9, 10, 11, 12, 13, 14, 15, 16, 17, 18, 19, 20, 21, 22, 23, 24, 25, 26, 27, 28, 29 or 30 carbon atoms.

The term "alkenyl" as used herein, whether it is used alone or as part of another group, means straight or branched chain, unsaturated alkenyl groups. The number of carbon atoms that are possible in the referenced alkenyl group are indicated by the numerical prefix "$C_{n1-n2}$". For example, the term $C_{4-30}$alkenyl is an alkenyl group having 4, 5, 6, 7, 8, 9, 10, 11, 12, 13, 14, 15, 16, 17, 18, 19, 20, 21, 22, 23, 24, 25, 26, 27, 28, 29 or 30 carbon atoms and at least one double bond, for example, 1-3, 1-2, 2 or 1 double bond(s).

The term "alkynyl" as used herein, whether it is used alone or as part of another group, means straight or branched chain, unsaturated alkynyl groups. The number of carbon atoms that are possible in the referenced alkynyl group are indicated by the numerical prefix "$C_{n1-n2}$". For example, the term $C_{4-30}$alkynyl is an alkynyl group having 4, 5, 6, 7, 8, 9, 10, 11, 12, 13, 14, 15, 16, 17, 18, 19, 20, 21, 22, 23, 24, 25, 26, 27, 28, 29 or 30 carbon atoms and at least one triple bond, for example, 1-3, 1-2, 2 or 1 triple bond(s).

II. Processes/Methods and Uses

A hydrometallurgical process/method for extracting base metals such as copper from materials such as copper sulfide ores using a reagent having/comprising a thiocarbonyl functional group and wetting agents as enhancers for the process/method is described herein. In the examples described in greater detail below, the use of the reagent having/comprising a thiocarbonyl functional group with the wetting agents created a synergistic effect which enhanced extraction in comparison to use of either reagent alone.

The terms "reagent having a thiocarbonyl functional group" and "reagent comprising a thiocarbonyl functional group" as used herein are used interchangeably and refer to an organosulfur compound comprising a C=S functional group that can also be known in the art as a thione or thioketone.

It will also be appreciated by a person skilled in the art that the terms "process" and "method" may be used interchangeably in reference to the embodiments of the present disclosure.

Accordingly, the present disclosure includes a process for extracting a base metal from a material comprising the base metal, the process comprising contacting the material under acidic conditions with a wetting agent and a reagent comprising a thiocarbonyl functional group.

In an embodiment, contacting of the material with the wetting agent and the reagent comprising a thiocarbonyl functional group produces a pregnant leach solution comprising the base metal. Accordingly, the present disclosure also includes a process for extracting (e.g. leaching) and optionally recovering a base metal from a material comprising the base metal, the process comprising: contacting the material under acidic conditions with a wetting agent and a reagent comprising a thiocarbonyl functional group to obtain a pregnant leach solution comprising the base metal; and optionally recovering the base metal from the pregnant leach solution. In an embodiment, the process comprises recovering the base metal from the pregnant leach solution. Accordingly, the present disclosure also includes a process for extracting (e.g. leaching) and recovering a base metal from a material comprising the base metal, the process comprising: contacting the material under acidic conditions with a wetting agent and a reagent comprising a thiocarbonyl functional group to obtain a pregnant leach solution comprising the base metal; and recovering the base metal from the pregnant leach solution. In another embodiment, the process does not comprise recovering the base metal from the pregnant leach solution. Accordingly, the present disclosure also includes a process for extracting (e.g. leaching) a base metal from a material comprising the base metal, the process comprising: contacting the material under acidic conditions with a wetting agent and a reagent comprising a thiocarbonyl functional group to obtain a pregnant leach solution comprising the base metal.

Alternatively described, the present disclosure includes a method of recovering at least one base metal ion from a material comprising at least one base metal, the method comprising: contacting the material under acidic conditions with a reagent comprising a thiocarbonyl functional group and a wetting agent to produce a pregnant solution comprising the at least one base metal ion; and recovering the at least one base metal ion from the pregnant solution. In embodiments where the reagent comprising a thiocarbonyl functional group is provided in the form of the corresponding dimer, i.e. FDS, the method comprises: contacting the material under acidic conditions with FDS and a wetting agent to produce a pregnant solution comprising the at least one base metal ion; and recovering the at least one base metal ion from the pregnant solution. In an embodiment, contacting the material to produce the pregnant solution comprises extracting the at least one base metal ion from the material.

The material is contacted with the wetting agent and the reagent comprising a thiocarbonyl functional group by any suitable process.

In an embodiment, the material is contacted with the reagent comprising a thiocarbonyl functional group by a process comprising: contacting the material with an acidic mixture comprising the reagent comprising a thiocarbonyl functional group.

In an embodiment, the acidic mixture further comprises the wetting agent and the material is contacted with the wetting agent and the reagent comprising a thiocarbonyl functional group by a process comprising: contacting the material with the acidic mixture comprising the wetting agent and the reagent comprising a thiocarbonyl functional group. In another embodiment, the material is agglomerated prior to contact. In an alternative embodiment, the material is contacted with the wetting agent and the reagent comprising a thiocarbonyl functional group by a process comprising agglomerating the material in the presence of the wetting agent prior to contact with the acidic mixture. Processes for agglomerating are well known in the art and a suitable process for agglomeration can be selected by the skilled person.

In some embodiments, the acidic mixture further comprises an oxidizing agent. The oxidizing agent can be any suitable oxidizing agent or combination thereof, the selection of which can be made by a person skilled in the art. In an embodiment, the oxidizing agent comprises oxygen, a source of $Fe^{3+}$ ions or combinations thereof. In another embodiment, the oxidizing agent comprises a source of $Fe^{3+}$ (ferric) ions. The term "source" as used herein in reference to $Fe^{3+}$ ions may include both direct sources of $Fe^{3+}$ ions and indirect sources of $Fe^{3+}$ ions, as appropriate. The term "direct source" as used herein in reference to a source of $Fe^{3+}$ ions refers to a substance such as a suitable iron(Ill) salt that directly releases the $Fe^{3+}$ ions upon dissolution in an aqueous environment such as the acidic mixtures of the present disclosure. The iron(Ill) salt may be water-soluble. The term "indirect source" as used herein in reference to a source of $Fe^{3+}$ ions refers to a source such as a suitable water-soluble iron(II) salt that releases a substance such as $Fe^{2+}$ ions upon dissolution in an aqueous environment such as the acidic mixtures of the present disclosure that can be converted into the $Fe^{3+}$ ions e.g. by an electrochemical process. For example, the oxidizing agent can comprise a water-soluble salt such as ferric sulfate (also known as iron (Ill) sulfate or $Fe_2(SO_4)_3$) that can act as a direct source of $Fe^{3+}$ ions and/or a water-soluble salt such as ferrous sulfate (also known as iron (II) sulfate or $FeSO_4$) that acts as a direct source of $Fe^{2+}$ ions that can, for example, be oxidized into $Fe^{3+}$ ions e.g. by iron-oxidizing bacteria. In another embodiment, the oxidizing agent comprises ferric sulfate. In another embodiment, the source of ferric ions comprises ferric ions generated at least in part by iron-oxidizing bacteria. In an embodiment, the acidic mixture comprises a ferric solution. In another embodiment, the acidic mixture comprises a ferric sulfate solution. In a further embodiment, the acidic mixture comprises a ferric media. In another embodiment, the acidic mixture comprises a ferrous sulfate solution. In another embodiment, the ferrous sulfate solution provides a source of $Fe^{2+}$ ions that are oxidized to $Fe^{3+}$ ions by iron-oxidizing bacteria. The concentration of the oxidizing agent such as ferric sulfate in the acidic mixture can be any suitable concentration. In an embodiment, prior to the material being contacted with the wetting agent and the reagent comprising a thiocarbonyl functional group, the oxidizing agent e.g., ferric sulfate is present in the acidic mixture at a concentration of less than 10 g/L of $Fe^{3+}$. In another embodiment, prior to the material being contacted with the wetting agent and the reagent comprising a thiocarbonyl functional group, the oxidizing agent e.g. ferric sulfate is present in the acidic mixture at a concentration of from about 0.5 g/L to about 40 g/L, about 1.5 g/L to about 3 g/L or about 2 g/L to about 2.5 g/L of $Fe^3$.

In some embodiments, the material comprising the base metal (e.g. a base metal sulfide ore) further comprises iron-oxidizing bacteria. In some embodiments, the acidic mixture further comprises iron-oxidizing bacteria. The iron-oxidizing bacteria can be any suitable iron-oxidizing bacteria or combination (consortium) thereof, the selection of which can be made by a person skilled in the art. In an embodiment, the iron-oxidizing bacteria comprise *Acidothiobacilos ferrooxidans*.

The material comprising the base metal is any suitable material comprising a base metal or combination thereof extractable by the processes of the present disclosure. For example, in an embodiment, the material comprising the base metal is a material comprising a base metal sulfide, electronic waste (e.g. waste printed circuit boards) comprising a base metal, or any other suitable material comprising a base metal or combinations thereof. In an embodiment, the material comprising the base metal is a material comprising a base metal sulfide.

The term "base metal" as used herein refers to any suitable metal or combination thereof that does not comprise a precious metal (e.g. gold or platinum). For example, suitable base metals may include but are not limited to copper, nickel, iron, aluminium, lead, zinc, tin, tungsten (also sometimes referred to as wolfram), molybdenum, tantalum, magnesium, cobalt, bismuth, cadmium, titanium, zirconium, antimony, manganese, beryllium, chromium, germanium, vanadium, gallium, hafnium, indium, niobium (also sometimes referred to as columbium), rhenium, thallium and combinations thereof. In an embodiment, the base metal comprises copper, nickel, zinc or combinations thereof. In another embodiment, the base metal comprises of copper. In another embodiment, the base metal is copper. In an embodiment, the material comprises an ore. In an embodiment, the material comprises a copper sulfide ore. In another embodiment, the copper sulfide ore is a primary copper sulfide (e.g. chalcopyrite, bornite, enargite or combinations thereof), a secondary copper sulfide (e.g. covellite, chalcocite or combinations thereof) or combinations thereof. In an embodiment, the copper sulfide ore comprises a primary copper sulfide. In another embodiment, the copper sulfide ore comprises a secondary copper sulfide. In a further embodiment, the copper sulfide ore comprises a combination of a primary copper sulfide and a secondary copper sulfide. In another embodiment, the copper sulfide ore comprises chalcopyrite, bornite, enargite, covellite, chalcocite, a copper sulfide of the formula $Cu_xS_y$ wherein the x:y ratio is between 1 and 2 or combinations thereof. In an embodiment, the copper sulfide of the formula $Cu_xS_y$ wherein the x:y ratio is between 1 and 2 is chalcocite, djurleite, digenite or combinations thereof. In another embodiment, the copper sulfide ore comprises chalcopyrite. Base metal sulfide ores other than copper sulfide ores are well known to the person skilled in the art. In an embodiment, the material comprises a nickel sulfide ore. In another embodiment, the nickel sulfide ore comprises pentlandite, violarite or combinations thereof.

The acidic conditions are any suitable acidic conditions, the selection of which can be made by a person skilled in the art. In some embodiments, the process comprises adding sulfuric acid to obtain the acidic conditions. In an embodiment, prior to the contact, the pH of the acidic mixture is in a range of from about 0.5 to about 4, about 1 to about 3, or about 1.5 to about 2.5. In another embodiment, the pH of the acidic mixture is about 2.

The term "reagent comprising a thiocarbonyl functional group" as used herein refers to an organosulfur compound comprising a C=S functional group that can also be known in the art as a thione or thioketone. The reagent comprising a thiocarbonyl functional group can be any suitable reagent comprising a thiocarbonyl functional group. For example, suitable reagents comprising a thiocarbonyl functional group may feature a C=S functional group comprising a sulfur bearing a partial negative charge, bearing a negative electrostatic potential surface and comprising an empty 7*-antibonding orbital as its lowest unoccupied molecular orbital (LUMO), provided that the reagent comprising a thiocarbonyl functional group is at least partially soluble in water and preferably does not significantly complex with the base metal and/or (if present) the oxidizing agent to form insoluble precipitates. Certain reagents comprising a thiocarbonyl functional group are capable of oxidizing to form the corresponding dimer. For example, thiourea, in the presence of a suitable oxidant such as ferric sulfate is capable of oxidizing to form the dimer formamidine disulfide (FDS). An equilibrium exists between FDS and thiourea in a ferric sulfate solution such that, for example, an acidic mixture prepared with a dimer of a reagent comprising a thiocarbonyl functional group (e.g. FDS) will provide the reagent comprising a thiocarbonyl functional group (e.g. thiourea) for contacting the material. Accordingly, in an embodiment, the reagent comprising a thiocarbonyl functional group is added to the process in the form of the corresponding dimer. In an alternative embodiment of the present disclosure, the reagent comprising a thiocarbonyl functional group is added to the process in monomeric form (i.e., in the form of the reagent comprising a thiocarbonyl functional group).

The term "biosurfactant" as used herein refers to surface-active molecules produced by microorganisms, either on the cell surface or secreted extracellularly.

The abbreviation "sp." after a taxonomical genus as used herein refers to an unnamed species. For example, *Salmonella* sp. refers to an unnamed species of *Salmonella*.

In an embodiment, the reagent comprising the thiocarbonyl functional group is N—N' substituted thioureas; 2,5-dithiobiurea; dithiobiuret; thiosemicarbazide purum; thiosemicarbazide; thioacetamide; 2-methyl-3-thiosemicarbazide; 4-methyl-3-thiosemicarbazide; vinylene trithiocarbonate purum; vinylene trithiocarbonate; 2-cyanothioacetamide; ethylene trithiocarbonate; potassium ethyl xanthogenate; dimethylthiocarbamoyl chloride; dimethyldithiocarbamate; dimethyl trithiocarbonate; N,N-dimethylthioformamide; 4,4-dimethyl-3-thiosemicarbazide; 4-ethyl-3-thiosemicarbazide; O-isopropylxanthic acid; ethyl thiooxamate; ethyl dithioacetate; pyrazine-2-thiocarboxamide; diethylthiocarbamoyl chloride; diethyldithiocarbamate; tetramethylthiuram monosulfide; tetramethylthiuram disulfide; pentafluorophenyl chlorothionoformate; 4-fluorophenyl chlorothionoformate; O-phenyl chlorothionoformate; phenyl chlorodithioformate; 3,4-difluorothiobenzamide; 2-bromothiobenzamide; 3-bromothiobenzamide; 4-bromothiobenzamide; 4-chlorothiobenzamide; 4-fluorothiobenzamide; thiobenzoic acid; thiobenzamide; 4-phenylthiosemicarbazide; O-(p-tolyl) chlorothionoformate; 4-bromo-2-methylthiobenzamide; 3-methoxythiobenzamide; 4-methoxythiobenzamide; 4-methylbenzenethioamide; thioacetanilide; salicylaldehyde thiosemicarbazone; indole-3-thiocarboxamide; S-(thiobenzoyl)thioglycolic acid; 3-(acetoxy)thiobenzamide; 4-(acetoxy)thiobenzamide; methyl N'-[(e)-(4-chlorophenyl)methylidene]hydrazonothiocarbamate; 3-ethoxythiobenzamide; 4-ethylbenzene-1-thiocarboxamide; tert-butyl 3-[(methylsulfonyl)oxy]-1-azetanecarboxylate; diethyldithiocarbamic acid; 2-(phenylcarbonothioylthio)-propanoic acid; 2-hydroxybenzaldehyde N-ethylthiosemicarbazone; (1R,4R)-1,7,7-trimethylbicyclo[2.2.1]heptane-2-thione; tetraethylthiuram disulfide; 4'-hydroxybiphenyl-4-thiocarboxamide; 4-biphenylthioamide; dithizone; 4'-methylbiphenyl-4-thiocarboxamide; tetraisopropylthiuram disulfide; anthracene-9-thiocarboxamide; phenanthrene-9-thiocarboxamide; sodium dibenzyldithiocarbamate; 4,4'-bis(dimethylamino)thiobenzophenone; or combinations thereof. In an embodiment, the reagent comprising a thiocarbonyl functional group comprises thiourea, ethylene thiourea, thioacetamide, sodium dimethyldithiocarbamate, trithiocarbonate, thiosemicarbazide or combinations thereof. In another embodiment, the reagent comprising a thiocarbonyl functional group comprises thiourea. In another embodiment, the reagent comprising a thiocarbonyl functional group comprises thiourea. In another embodiment, the reagent comprising a thiocarbonyl functional group does not comprise thiourea.

The concentration of the reagent comprising a thiocarbonyl functional group in the acidic mixture can be any suitable concentration. In embodiments wherein the reagent comprising a thiocarbonyl functional group is added to the process/method in the form of the corresponding dimer, the concentrations specified herein for the reagent comprising a thiocarbonyl functional group refers to a concentration calculated as if all of the dimer was dissociated into the reagent comprising a thiocarbonyl functional group. In an embodiment, prior to the material being contacted with the wetting agent and the reagent comprising a thiocarbonyl functional group, the reagent comprising a thiocarbonyl functional group is present in the acidic mixture at a concentration of about 0.002 mM or greater, about 0.02 mM or greater, about 0.1 mM or greater, about 0.2 mM or greater, about 0.25 mM or greater, about 0.3 mM or greater, about 0.4 mM or greater, about 0.5 mM or greater, about 0.6 mM or greater, about 0.7 mM or greater, about 0.8 mM or greater, about 0.9 mM or greater, about 1.0 mM or greater, about 1.5 mM or greater, about 2 mM or greater, about 2.5 mM or greater, about 3 mM or greater, about 4 mM or greater, about 5 mM or greater, about 10 mM or greater, about 20 mM or greater, about 30 mM or greater, or about 60 mM or greater. In an embodiment, prior to the material being contacted with the wetting agent and the reagent comprising a thiocarbonyl functional group, the reagent comprising a thiocarbonyl functional group is comprised in the acidic mixture at a concentration of about 100 mM or lower, about 60 mM or lower or about 30 mM or lower. In another embodiment, prior to the material being contacted with the wetting agent and the reagent comprising a thiocarbonyl functional group, the reagent comprising a thiocarbonyl functional group is comprised in the acidic mixture at a concentration of about 20 mM or lower. In some embodiments, a lower concentration of the reagent comprising a thiocarbonyl functional group is used. Accordingly, in another embodiment of the present disclosure, prior to the material being contacted with the wetting agent and the reagent comprising a thiocarbonyl functional group, the reagent comprising a thiocarbonyl functional group is comprised in the acidic mixture at a concentration of about 10 mM or lower, about 5 mM or lower, about 4 mM or lower, about 3 mM or lower, about 2.5 mM or lower, about 2 mM or lower, about 1.5 mM or lower, about 1.0 mM or lower, about 0.9 mM or lower, about 0.8 mM or lower, about 0.75 mM or lower, about 0.7 mM or lower, about 0.6 mM or lower, about 0.5 mM or lower, about 0.4 mM or lower, about 0.3 mM or lower, about 0.2 mM or lower, about 0.02 mM or lower, or about 0.002 mM or lower. It will be appreciated by a person skilled in the art that such embodiments can be interchanged in any suitable manner. For example, in another embodiment, prior to the material being contacted with the wetting agent and the reagent comprising a thiocarbonyl functional group, the reagent comprising a thiocarbonyl functional group is comprised in the acidic mixture at a concentration in the range of about 0.002 mM to about 100 mM, about 0.002 mM to about 60 mM, about 0.002 mM to about 50 mM, about 0.002 mM to about 30 mM, about 0.002 mM to about 20 mM, about 0.002 mM to about 10 mM, about 0.002 mM to about 5 mM, about 0.002 mM to about 2 mM, about 0.002 mM to about 1 mM, about 0.002 mM to about 0.5 mM, about 0.002 mM to about 0.2 mM, about 0.002 mM to about 0.02 mM, about 0.02 mM to about 100 mM, about 0.02 mM to about 60 mM, about 0.02 mM to about 50 mM, about 0.02 mM to about 30 mM, about 0.02 mM to about 20 mM, about 0.02 mM to about 10 mM, about 0.02 mM to about 5 mM, about 0.02 mM to about 2 mM, about 0.02 mM to about 1 mM, about 0.02 mM to about 0.5 mM, about 0.02 mM to about 0.2 mM, about 0.2 mM to about 100 mM, about 0.2 mM to about 60 mM, about 0.2 mM to about 50 mM, about 0.2 mM to about 30 mM, about 0.2 mM to about 20 mM, about 0.2 mM to about 10 mM, about 0.2 mM to about 5 mM, about 0.2 mM to about 2 mM, about 0.2 mM to about 1 mM, about 0.2 mM to about 0.5 mM, about 2 mM to about 100 mM, about 2 mM to about 60 mM, about 2 mM to about 50 mM, about 2 mM to about 30 mM, about 2 mM to about 20 mM, about 2 mM to about 10 mM, about 2 mM to about 5 mM, about 10 mM to about 100 mM, about 10 mM to about 60 mM, about 10 mM to about 50 mM, about 10 mM to about 30 mM, about 10 mM to about 20 mM, about 30 mM to about 100 mM, about 30 mM to about 60 mM, about 30 mM to about 50 mM, about 50 mM to about 100 mM, about 60 mM to about 100 mM, about 0.2 mM to about 4 mM, about 0.2 mM to about 3 mM, about 0.25 mM to about 2.5 mM, about 0.2 mM to about 1.5 mM, about 0.25 mM to about 0.75 mM, about 1.5 mM to about 2.5 mM, or about 0.5 mM to about 2 mM.

Alternatively, in embodiments where the reagent comprising a thiocarbonyl functional group is added to the process/method in the form of the corresponding dimer (e.g. FDS), prior to the material being contacted with the wetting agent and the reagent, the reagent may be added at any suitable concentration of the reagent. The concentrations specified hereinbelow for FDS refer to a concentration calculated as if no FDS was dissociated into thiourea. In an embodiment, the FDS is comprised in the acidic conditions at a concentration of about 0.001 mM or greater, about 0.01 mM or greater, about 0.05 mM or greater, about 0.1 mM or greater, about 0.125 mM or greater, about 0.15 mM or greater, about 0.2 mM or greater, about 0.25 mM or greater, about 0.3 mM or greater, about 0.35 mM or greater, about 0.4 mM or greater, about 0.45 mM or greater, about 0.5 mM or greater, about 0.75 mM or greater, about 1 mM or greater, about 1.25 mM or greater, about 1.5 mM or greater, about 2 mM or greater, about 2.5 mM or greater, about 5 mM or greater, about 10 mM or greater, about 15 mM or greater, or about 30 mM or greater. In an embodiment, the FDS is comprised in the acidic conditions at a concentration of about 50 mM or lower, about 30 mM or lower, or about 15 mM or lower. In another embodiment, the FDS is comprised in the acidic conditions at a concentration of about 10 mM or lower. In some embodiments, a lower concentration of the FDS is used. Accordingly, in another embodiment of the present disclosure, the FDS is comprised in the acidic conditions at a concentration of about 5 mM or lower, about 2.5 mM or lower, about 2 mM or lower, about 1.5 mM or lower, about 1.25 mM or lower, about 1 mM or lower, about 0.75 mM or lower, about 0.5 mM or lower, about 0.45 mM or lower, about 0.4 mM or lower, about 0.375 mM or lower, about 0.35 mM or lower, about 0.3 mM or lower, about 0.25 mM or lower, about 0.2 mM or lower, about 0.15 mM or lower, about 0.1 mM or lower, about 0.01 mM or lower, or about 0.001 mM or lower. It will be appreciated by a person skilled in the art that such embodiments can be interchanged in any suitable manner. For example, in another embodiment, the FDS is comprised in the acidic conditions at a concentration in a range of about 0.001 mM to about 50 mM, about 0.001 mM to about 30 mM, about 0.001 mM to about 25 mM, about 0.001 mM to about 15 mM, about 0.001 mM to about 10 mM, about 0.001 mM to about 5 mM, about 0.001 mM to about 2.5 mM, about 0.001 mM to about 1 mM, about 0.001 mM to about 0.5 mM, about 0.001 mM to about 0.25 mM, about 0.001 mM to about 0.1 mM, about 0.001 mM to about 0.01 mM, about 0.01 mM to about 50 mM, about 0.01 mM to about 30 mM, about 0.01 mM to about 25 mM, about 0.01 mM to about 15 mM, about 0.01 mM to about 10 mM, about 0.01 mM to about 5 mM, about 0.01 mM to about 2.5 mM, about 0.01 mM to about 1 mM, about 0.01 mM to about 0.5 mM, about 0.01 mM to about 0.25 mM, about 0.01 mM to about 0.1 mM, about 0.1 mM to about 50 mM, about 0.1 mM to about 30 mM, about 0.1 mM to about 25 mM, about 0.1 mM to about 15 mM, about 0.1 mM to about 10 mM, about 0.1 mM to about 5 mM, about 0.1 mM to about 2.5 mM, about 0.1 mM to about 1 mM, about 0.1 mM to about 0.5 mM, about 0.1 mM to about 0.25 mM, about 1 mM to about 50 mM, about 1 mM to about 30 mM, about 1 mM to about 25 mM, about 1 mM to about 15 mM, about 1 mM to about 10 mM, about 1 mM to about 5 mM, about 5 mM to about 50 mM, about 5 mM to about 30 mM, about 5 mM to about 25 mM, about 5 mM to about 15 mM, about 5 mM to about 10 mM, about 15 mM to about 50 mM, about 15 mM to about 30 mM, about 15 mM to about 25 mM, about 25 mM to about 50 mM, or about 30 mM to about 50 mM.

The wetting agent can be any suitable wetting agent or combination thereof. The term "wetting agent" as used herein refers to a substance or combination thereof that reduces the surface tension of water and may include suitable surfactants that emulsify and/or disperse in addition to or alternatively to wetting. In an embodiment, the wetting agent is a non-ionic wetting agent. The non-ionic wetting agent can be any suitable non-ionic wetting agent or combination thereof. The term "non-ionic" as used herein means that the substance does not dissociate into ions in an aqueous environment such as the acidic mixtures of the present disclosure. The amount of the wetting agent used in the processes of the present disclosure is any suitable amount. For example, it will be appreciated by a person skilled in the art that in embodiments wherein iron-oxidizing bacteria are present, the amount is compatible with the presence of such bacteria and is desirably selected such that no significant difference is observed in the growth and/or iron oxidation ability of the bacteria. In an embodiment, the acidic mixture comprises the wetting agent and prior to the material being contacted with the wetting agent and the reagent comprising a thiocarbonyl functional group, the wetting agent is present in the acidic mixture at a concentration of from about 0.001 g/L to about 1 g/L, about 0.005 g/L to about 0.5 g/L or about 0.01 g/L to about 0.1 g/L. The wetting agent may also be present in the acidic mixture at a concentration of at least about 1 ppm to about 10 ppm, about 10 ppm to about 30 ppm, about 30 ppm to about 50 ppm, about 50 ppm to about 75 ppm, about 75 ppm to about 100 ppm, about 100 ppm to about 200 ppm, or about 200 ppm. It will also be appreciated by a person skilled in the art that in embodiments wherein the material is agglomerated in the presence of the wetting agent, such agglomeration may lead to surfactant loss such that additional wetting agent may need to be added prior to and/or during the process to account for such loss.

In an embodiment, the non-ionic wetting agent is a non-ionic ethoxylate surfactant, a polyethylene glycol or combinations thereof. In an embodiment, the non-ionic wetting agent is a non-ionic ethoxylate surfactant. The non-ionic ethoxylate surfactant can be any suitable non-ionic ethoxylate surfactant or combination thereof. The term "surfactant" as used herein refers to an amphiphilic wetting agent; i.e., a substance that contains one or more hydrophobic groups and one or more hydrophilic groups arranged such that the substance is capable of acting as a wetting agent as defined herein. The term "ethoxylate surfactant" as used herein refers to a surfactant that contains at least one suitable ethylene glycol moiety, wherein each ethylene glycol moiety is of the formula —$(OC_2H_4)_n$OH wherein n is typically in the range of from 1 to 20, e.g., 1 to 10. In another embodiment, the non-ionic wetting agent is a polyethylene glycol. The polyethylene glycol can be any suitable polyethylene glycol or combination thereof. For example, the skilled person will appreciate that polyethylene glycols of low molecular weight (e.g., less than about 2,000 g/mol)

may be suitable wetting agents. In an embodiment, the polyethylene glycol has an average molecular weight of from about 100 g/mol to about 600 g/mol or from about 100 g/mol to about 300 g/mol. In another embodiment, the polyethylene glycol is polyethylene glycol 200. In a further embodiment, the non-ionic wetting agent is a combination of a non-ionic ethoxylate surfactant and a polyethylene glycol.

In an embodiment, the non-ionic ethoxylate surfactant is selected from a polysorbate, an alkylphenyl ether of polyethylene glycol or a reduced form thereof, an alkylether of polyethylene glycol and combinations thereof. In another embodiment, the non-ionic ethoxylate surfactant is a combination of a polysorbate, an alkylphenyl ether of polyethylene glycol or a reduced form thereof and/or an alkylether of polyethylene glycol.

In an embodiment, the non-ionic wetting agent is a polysorbate. The polysorbate can be any suitable polysorbate or combination thereof. The term "polysorbate" as used herein refers to a non-ionic surfactant derived from ethoxylated sorbitan esterified with a fatty acid and includes combinations of such surfactants comprising a mixture of fatty acids.

In an embodiment, the polysorbate is one or more compounds of formula (I):

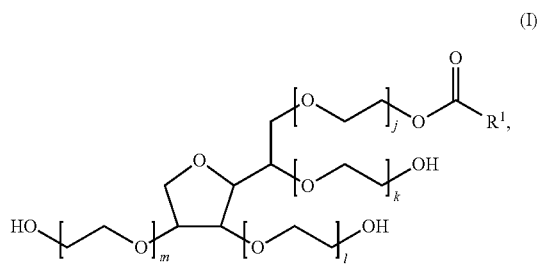

wherein $R^1$ is $C_{4-30}$alkyl, $C_{4-30}$alkenyl or $C_{4-30}$alkynyl; and j+k+l+m=20. In an embodiment, $R^1$ is $C_{4-30}$alkyl or $C_{4-30}$alkenyl. In another embodiment, $R^1$ is $C_{10-20}$alkyl or $C_{10-20}$alkenyl.

In an embodiment, the polysorbate is polysorbate 20, polysorbate 40, polysorbate 60, polysorbate 80 or combinations thereof. It will be appreciated by a person skilled in the art that commercial sources of such polysorbates may be in the form of combinations of compounds of Formula (I) comprising different $R^1$ groups. For example, a commercial source of polysorbate 20 is Tween™ 20 (polyethylene glycol sorbitan monolaurate) which may comprise a compound of Formula (I) wherein $R^1$ is —$(CH_2)_{10}CH_3$ (i.e. a lauric acid ester of ethoxylated sorbitan) in an amount greater than or equal to about 40%, with the balance primarily comprising compounds of Formula (I) wherein $R^1$ is —$(CH_2)_{12}CH_3$, —$(CH_2)_{14}CH_3$, and —$(CH_2)_{16}CH_3$ (i.e. a myristic acid ester, a palmitic acid ester and a stearic acid ester of ethoxylated sorbitan, respectively). A commercial source of polysorbate 40 is Tween™ 40 (polyethylene glycol sorbitan monopalmitate) which may comprise a compound of Formula (I) wherein $R^1$ is —$(CH_2)_{14}CH_3$ (i.e., a palmitic acid ester of ethoxylated sorbitan) in an amount of about 90%, with the balance primarily a compound of Formula (I) wherein $R^1$ is —$(CH_2)_{16}CH_3$ (i.e. a stearic acid ester of ethoxylated sorbitan). A commercial source of polysorbate 60 is Tween™ 60 (polyethylene glycol sorbitan monostearate) which may comprise a compound of Formula (I) wherein $R^1$ is —$(CH_2)_{16}CH_3$ (i.e., a stearic acid ester of ethoxylated sorbitan) in an amount of about 40% to about 60%, with a total amount of compounds of Formula (I) wherein $R^1$ is —$(CH_2)_{14}CH_3$ and —$(CH_2)_{16}CH_3$ (i.e., a palmitic acid ester and a stearic acid ester of ethoxylated sorbitan, respectively) in an amount of greater than or equal to about 90%. A commercial source of polysorbate 80 is Tween™ 80 (polyethylene glycol sorbitan monooleate) which may comprise a compound of Formula (I) wherein $R^1$ is —$(CH_2)_7CH=CH-(CH_2)_7CH_3$ (wherein the double bond is in the cis configuration; i.e. an oleic acid ester of ethoxylated sorbitan) in an amount of greater than or equal to about 58%, with the balance primarily comprising compounds of Formula (I) wherein $R^1$ is —$(CH_2)_7CH=CH-CH_2-CH=CH-(CH_2)_4CH_3$ (wherein each double bond is in the cis configuration), —$(CH_2)_{14}CH_3$ and —$(CH_2)_{16}CH_3$ (i.e. a linoleic acid ester, a palmitic acid ester and a stearic acid ester of ethoxylated sorbitan, respectively). In an embodiment, the polysorbate is a Tween™ series surfactant. In an embodiment, the polysorbate is polysorbate 20 (e.g., Tween™ 20). In another embodiment, the polysorbate is polysorbate 40 (e.g., Tween™ 40). In another embodiment, the polysorbate is polysorbate 60 (e.g., Tween™ 60). In another embodiment, the polysorbate is polysorbate 80 (e.g., Tween™ 80). In another embodiment, the polysorbate is a combination of polysorbate 20, polysorbate 40, polysorbate 60 and/or polysorbate 80 (e.g., a combination of Tween™ 20, Tween™ 40, Tween™ 60 and/or Tween™ 80).

In an embodiment, the non-ionic wetting agent is an alkylphenyl ether of polyethylene glycol. The alkylphenyl ether of polyethylene glycol can be any suitable alkylphenyl ether of polyethylene glycol or combination thereof. The term "alkylphenyl ether of polyethylene glycol" as used herein refers to a non-ionic surfactant made up of an oligo(ethylene glycol) group bound to an alkylated phenyl group via an ether linkage.

In an embodiment, the alkylphenyl ether of polyethylene glycol is one or more compounds of the Formula (II):

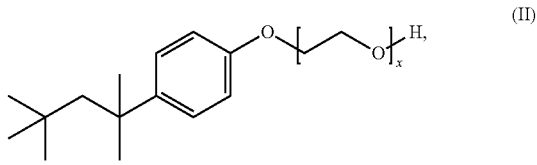

wherein x is 5-20.

In an embodiment, x is 5-15. In another embodiment, x is 7-10. In a further embodiment, x is 9-10. It will be appreciated by a person skilled in the art that commercial sources of such alkylphenyl ethers of polyethylene glycols may be in the form of combinations of compounds of Formula (II) comprising different values for x. For example, Triton™ X-100 is a combination of compounds of Formula (II) wherein x is 9-10. Accordingly, in an embodiment, the alkylphenyl ether of polyethylene glycol is a combination of compounds of the Formula (II):

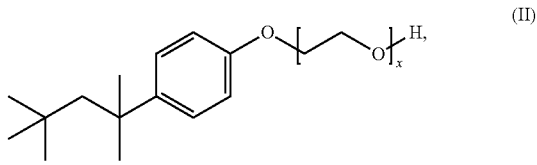

wherein x is 9-10.

In an embodiment, the non-ionic wetting agent is an alkylphenyl ether of polyethylene glycol in reduced form. The alkylphenyl ether of polyethylene glycol in reduced form can be any suitable alkylphenyl ether of polyethylene glycol in reduced form or combination thereof. The term "reduced form" as used herein in respect to an alkylphenyl ether of polyethylene glycol refers to the corresponding non-ionic surfactant comprising a cyclohexyl moiety in place of the phenyl moiety. For example, in an embodiment, the alkylphenyl ether of polyethylene glycol in reduced form is one or more compounds of the Formula (III):

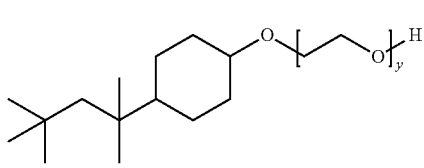

(III)

wherein y is 5-20.

In an embodiment, y is 5-15. In another embodiment, y is 7-10. In a further embodiment, y is 9-10. In another embodiment, the alkylphenyl ether of polyethylene glycol in reduced form is a combination of compounds of the Formula (III):

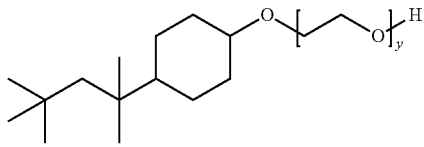

(III)

wherein y is 9-10.

In an embodiment, the non-ionic wetting agent is an alkylether of polyethylene glycol. The alkylether of polyethylene glycol can be any suitable alkylether of polyethylene glycol or combination thereof. The term "alkylether of polyethylene glycol" as used herein refers to a non-ionic surfactant made up of an oligo(ethylene glycol) group bound to an alkyl group via an ether linkage. In another embodiment of the present disclosure, the alkylether of polyethylene glycol is one or more compounds of the Formula (IV):

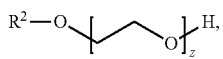

(IV)

wherein $R^2$ is $C_{6-30}$alkyl and z is 3-20.

In an embodiment, $R^2$ is $C_{10-14}$alkyl. In another embodiment, $R^2$ is —$(CH_2)_{11}CH_3$. In an embodiment, z is 4-9. In another embodiment, z is 5. In a further embodiment, z is 8.

In an embodiment, the non-ionic wetting agent is a polyethylene glycol, poly(ethylene oxide), poly(oxyethylene), or a combination thereof. In another embodiment, the polyethylene glycol has an average molecular weight of from about 100 g/mol to about 300 g/mol. In a further embodiment, the polyethylene glycol is polyethylene glycol 200, polyethylene glycol 300, polyethylene glycol 400, polyethylene glycol 600 or a combination thereof. The polyethylene glycol may comprise one or more compounds of the Formula (V):

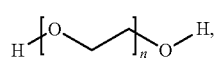

(V)

wherein n is the number of repeated chemical units.

In an embodiment, the non-ionic wetting agent is tergitol. The tergitol may be tergitol 15-S-20. The tergitol may comprise one or more compounds of the Formula (VI):

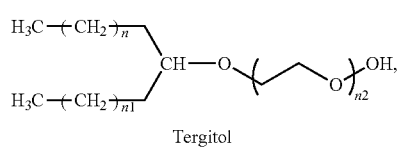

Tergitol (VI)

wherein n+n1=12 and n2=19.

In another embodiment, the non-ionic wetting agent is an alkyl polyglycoside. The alkyl polyglycoside may be Triton CG 110. The alkyl polyglycoside may comprise one or more compounds of the Formula (VII):

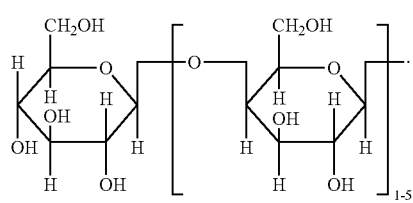

(VII)

In another embodiment, the non-ionic wetting agent is a nonyl phenol ethoxylate or alcohol ethoxylate. In another embodiment, the non-ionic wetting agent is a lignosulfonate.

In an embodiment, the non-ionic wetting agent is Pluronic®. The Pluronic® may be Pluronic® F-108. The Pluronic® may comprise one or more compounds of the Formula (VII):

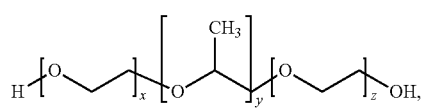

(VII)

wherein 1<x<140 and 1<y<100.

The wetting agent may comprise a biosurfactant. The biosurfactant may include, but is not limited to, a glycolipid, lipopeptide, lipoprotein, cyclic lipopeptide, polymeric surfactant, fatty acid, phospholipid, and/or neutral lipid; particulate surfactant; bile salt; lecithin; or a combination thereof. The glycolipid may include, but is not limited to, rhamnolipid; sphorolipid; trehalolipid; mannosylerythritol lipid; or a combination thereof. The lipopeptide may include, but is not limited to, surfactin; iturin; lichenysin; viscosin; serrawettin; arthrofactin; polymyxin; or a combination thereof. The polymeric surfactant may include, but is not limited to, emulsan; liposan; biodispersan; lipomannan; mannoprotein; alasan; or a combination thereof. The fatty acid, phospholipid, and/or neutral lipid may include, but is not limited to, corynomycolic acid; spiculisporic acid, phosphatidyleth-anolamine. The particulate biosurfactant may include, but is not limited to, a vesicle.

The biosurfactant may be derived from a source of biosurfactant. The source of biosurfactant may comprise a bacteria, fungi, yeast, or a combination thereof. The source of biosurfactant may include, but it not limited to, a gammaproteobacteria; betaproteobacteria; deinococci; ascomycetes; actinobacteria; saccharomycetes; ustilaginomycetes; bacilli; eurotiomycetes; or a combination thereof. The source of biosurfactant may include, but is not limited to *Pseudomonas aeruginosa; Pseudomonas* sp.; *Burkholderia* sp.; *Thermus aquaticus; Meiothermus rubber; Torulopsis bombicola; Torulopsis apicola; Candida kuoi, Rhodotorula bogoriensis, Wickerhamiella domericqiae; Nocardia* sp.; *Rhodococcus erythropolis; Mycobacterium* sp.; *Corynebacterium* sp.; *Gordonia* sp.; *Arthrobactersp.; Candida antartica; Pseudozyma* sp.; *Ustilago scitaminea; Bacillus subtilis; Bacillus licheniformis; Bacillus mojavensis; Bacillus amyloliquefaciens; Bacillus licheniformis; Pseudomonas fluorescens; Serratia marcescens; Bacillus polymyxa; Acinetobacter calcoaceticus* RAG-1; *Candida tropicalis; Saccharomyces cerevisiae; Acinetobacter radioresistens* KA53; *Corynebacterium lepus; Corynebacterium diphtheriae; Penicillium spiculisporum; Talaromyces trachyspermus; Pseudomonas marginilis*; or a combination thereof.

The acidic mixture may comprise a substrate, a source of biosurfactant, or a combination thereof. The source of biosurfactant may consume the substrate to product a biosurfactant. The substate may include, but is not limited to, biochar, plant oil, carbohydrates, plant and/or animal waste.

The material can be contacted with the wetting agent and the reagent comprising a thiocarbonyl functional group using any suitable process and/or means, the selection of which can be made by a person skilled in the art. In an embodiment, the material is contacted with the wetting agent and the reagent comprising a thiocarbonyl functional group in a process comprising a percolation leach (e.g., a heap leach, a dump leach or a column leach), a tank leach, a vat leach or a bioreactor. In an embodiment, the material is contacted with the wetting agent and the reagent comprising a thiocarbonyl functional group in a process comprising a percolation leach (e.g., a heap leach, a dump leach or a column leach), a tank leach or a vat leach. In another embodiment, the percolation leach is a heap leach, a dump leach or a column leach. In an embodiment, the material is contacted with the wetting agent and the reagent comprising a thiocarbonyl functional group in a process comprising a percolation leach. In another embodiment, the material is contacted with the wetting agent and the reagent comprising a thiocarbonyl functional group in a process comprising a heap leach. In another embodiment, the material is contacted with the wetting agent and the reagent comprising a thiocarbonyl functional group in a process comprising a dump leach. In another embodiment, the material is contacted with the wetting agent and the reagent comprising a thiocarbonyl functional group in a process comprising a column leach. In another embodiment, the material is contacted with the wetting agent and the reagent comprising a thiocarbonyl functional group in a process comprising a tank leach. In another embodiment, the material is contacted with the wetting agent and the reagent comprising a thiocarbonyl functional group in a process comprising a vat leach. In another embodiment, the material is contacted with the wetting agent and the reagent comprising a thiocarbonyl functional group in a process comprising a bioreactor. Suitable processes, means and/or conditions for carrying out a percolation leach (e.g. a heap leach, a dump leach or a column leach), a tank leach, a vat leach or a leach in a bioreactor in the processes of the present disclosure can be selected by the person skilled in the art.

For example, the term "percolation leach" as used herein refers to a process in which the base metal is leached from the material by causing the acidic mixture to seep into and flow through a mass of the material. In some embodiments of the present disclosure, the base metal is leached from the material by causing the acidic mixture to seep into and flow through a mass of the material that is agglomerated, or, in some embodiments, a mass of the material that is agglomerated with the wetting agent.

The term "heap leach" as used herein refers to an example of a percolation leach which comprises heaping the material (such as the copper sulfide ore) onto a heap leach pad (e.g. an impermeable plastic or clay-lined leach pad), and contacting (e.g. irrigating via a means such as a sprinkler or drip irrigation) the heaped material with the acidic mixture in a way such that the acidic mixture percolates through the heap and leaches the base metal, for example, so as to obtain a pregnant leach solution comprising the base metal which can be collected. In heap leach processes, the material (such as the copper sulfide ore) is typically crushed subsequent to being removed from the ground and prior to being heaped. In an embodiment, the crushing is primary crushing. In another embodiment, the crushing is secondary crushing. In a further embodiment, the crushing is tertiary crushing. It will be appreciated by the person skilled in the art that in embodiments wherein the material is agglomerated, such agglomeration is carried out prior to the material (such as the copper sulfide ore) being heaped, and, in embodiments comprising crushing the material (such as the copper sulfide ore), subsequent to the crushing of the material.

The term "dump leach" as used herein refers to an example of a percolation leach comprising a process that is similar to a heap leach, but wherein the material (such as the copper sulfide ore) is not crushed prior to being stacked on the leach pad.

The term "column leach" as used herein refers to an example of a percolation leach which comprises loading the material (such as the copper sulfide ore) into a column then contacting (e.g. irrigating via a means such as drip irrigation from the top of the column) the material with the acidic mixture in a way such that the acidic mixture percolates through the material in the column and leaches the base metal, for example, so as to obtain a pregnant leach solution comprising the base metal which can be collected. In some embodiments, the material (such as the copper sulfide ore) is crushed prior to being loaded in the column. It will be appreciated by the person skilled in the art that in embodiments wherein the material is agglomerated, such agglomeration is carried out prior to the material (such as the copper sulfide ore) being loaded, and, in embodiments comprising crushing the material (such as the copper sulfide ore), subsequent to the crushing of the material. Column leaches can be useful, for example, for measuring the effects of typical variables encountered in industrial heap and/or dump leaching processes.

The terms "tank leach" and "vat leach" as used herein refer to processes in which the material (such as the copper sulfide ore) is placed into a tank or vat, respectively, containing the acidic mixture under conditions suitable to leach the base metal, for example, to obtain a pregnant leach solution comprising the base metal which can be collected. In exemplary tank leaching processes, the material (such as the copper sulfide ore) is typically ground to a fineness suitable to form a slurry or pulp, combined with water to form the slurry or pulp then pumped into the tank where subsequently the acidic mixture is added. In exemplary vat leaching processes, a coarser particle size of the material (such as the copper sulfide ore) is used which is loaded into the vat as a solid, then the acidic mixture is flooded into the vat.

The person skilled in the art will appreciate that the term "acidic mixture" as used herein includes an acidic aqueous solution as well as other forms of acidic aqueous mixtures, the identity of which may depend, for example, on the nature and/or concentration of the components comprised therein. The acidic mixture used in the various embodiments of the present disclosure can readily be prepared by the person skilled in the art having regard to the present disclosure by combining the various components therein by a suitable process and/or means. For example, in some embodiments comprising the oxidizing agent (such as ferric sulfate), the acidic mixture can be prepared by a process comprising adjusting the pH of an aqueous solution comprising the desired amount of the oxidizing agent (such as ferric sulphate) with a suitable acid (such as sulfuric acid) to a suitable value (such as a pH of about 2) to obtain an acidic aqueous solution comprising the oxidizing agent, then adding the desired amount of the reagent comprising the thiocarbonyl functional group (or dimer thereof) to obtain the acidic mixture. In some embodiments, for example, wherein the wetting agent is not agglomerated with the material (such as the copper sulfide ore), the preparation of the acidic mixture can further comprise dispersing or dissolving the desired amount of the wetting agent in the acidic aqueous mixture comprising the oxidizing agent to obtain the acidic mixture. In some embodiments, the dispersing is prior to the addition of the reagent comprising a thiocarbonyl functional group (or dimer thereof). In some embodiments, the dispersing is subsequent to the addition of the reagent comprising a thiocarbonyl functional group (or dimer thereof).

In an embodiment, the process further comprises recovering the base metal. For example, the base metal can be recovered from the pregnant leach solution in embodiments wherein the contacting of the material with the wetting agent and the reagent comprising a thiocarbonyl functional group produces a pregnant leach solution comprising the base metal. In embodiments wherein the process comprises recovering the base metal (e.g. from the pregnant leach solution), the process for recovering the base metal can be any suitable process, the selection of which can be made by the person skilled in the art. For example, where the material comprises chalcopyrite, in the presence of the wetting agent and the reagent comprising a thiocarbonyl functional group as catalysts, the following reaction is facilitated:

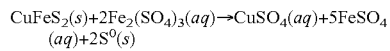

After the chalcopyrite is oxidized, the dissolved copper can be recovered (e.g. from the pregnant leach solution). In an embodiment of the present disclosure, the recovering of the base metal (such as copper) comprises solvent extraction and electrowinning. In an embodiment, prior to the solvent extraction, the process further comprises a solid-liquid separation.

In another embodiment, the process further comprises recovering the reagent comprising a thiocarbonyl functional group. For example, the reagent comprising a thiocarbonyl functional group can be recovered from the pregnant leach solution in embodiments wherein the contacting of the material with the wetting agent and the reagent comprising a thiocarbonyl functional group produces a pregnant leach solution comprising the base metal. For example, in some embodiments, iron and copper ions are present (e.g. in the pregnant leach solution). A person skilled in the art will appreciate that a reagent comprising a thiocarbonyl functional group can form various stable complexes with copper ions. Extractants commonly used for solvent extraction of copper ions such as hydroxyoximes and aldoximes, are strong complexing agents for the copper ions. The extractants can change the equilibrium between copper ions and a reagent comprising a thiocarbonyl carbonyl group acting as a ligand, releasing the reagent comprising a thiocarbonyl functional group from the copper complex. As the free reagent comprising a thiocarbonyl functional group enters the raffinate solution, the reagent can be recirculated for further contacting with the material. Accordingly, in an embodiment, the solvent extraction comprises contacting the base metal cations (e.g., in the pregnant leach solution) with an extractant for base metal cations in the presence of an organic solvent. The skilled person will be able to select a suitable organic solvent or combination thereof depending on the base metal cation to be extracted. In an embodiment, the organic solvent is an aliphatic solvent, an aromatic solvent or combination thereof. In another embodiment, the organic solvent comprises kerosene, alkyl aromatics, cycloparaffins or combinations thereof. The skilled person will also be able to select an appropriate extractant for the base metal cation. In an embodiment, the extractant for the base metal cation is an aldoxime, a ketoxime or combinations thereof. In another embodiment, the contacting is further carried out in the presence of an ester modifier, an alkylphenol modifier or combinations thereof. During the solvent extraction, base metal cations are de-complexed from the reagent comprising a thiocarbonyl functional group, thus liberating the reagent, and allowing the base metal cations to be extracted (e.g. from the pregnant leach solution) into the organic solvent. The free reagent comprising a thiocarbonyl functional group remains in the aqueous phase. In some embodiments, the retention of the free reagent comprising a thiocarbonyl functional group in the aqueous phase during solvent extraction to produce the raffinate comprising the free reagent is accomplished with a halide, e.g., chloride, bromide, or iodide, present (e.g., in the pregnant leach solution). Separation of the organic solvent from the aqueous phase results in a base metal cation-depleted raffinate comprising the free reagent comprising a thiocarbonyl functional group, and a base metal cation-enriched organic phase comprising the organic solvent and base metal cations. The wetting agent will also remain substantially in the aqueous phase. The base metal cation-enriched solution can then be processed (e.g. by a process comprising electrowinning) to recover the base metal. The raffinate can optionally be recirculated for use in the process. Accordingly, in some embodiments, the process optionally further comprises recycling the recovered reagent comprising a thiocarbonyl functional group for use in the contacting of a further portion of the material. In some embodiments, additional reagent comprising a thiocarbonyl functional group (or dimer thereof) is added to reach a desired concentration prior to the contacting with the material. In some embodiments, a reducing agent is added prior to the contacting with the material. In an embodiment, the reducing agent is $H_2S$, NaSH, or Zn. In an embodiment, the reducing agent is added in an amount that results in a ratio of reagent comprising a thiocarbonyl functional group (e.g. thiourea): corresponding dimer (e.g. FDS) in a range of about 0.5:1 to about 9:1.

The contacting of the material with the wetting agent and the reagent comprising a thiocarbonyl functional group is carried out under any suitable temperature and pressure conditions. For example, the contacting can be carried out at a temperature greater than 0° C. to about 80° C. However, the contacting in the processes of the present disclosure is advantageously carried out at ambient temperature (e.g., from about 5° C. to about 40° C. or about 15° C. to about 25° C.) and pressure (i.e., about 1 atm). Ambient pressure may be different at various altitudes. It will also be appreciated by a person skilled in the art that a suitable temperature may, for example, depend on the particular wetting agent or combination thereof and its corresponding upper and lower critical temperatures.

In an embodiment, the process is a batch process.

In an embodiment, the process is a continuous process.

In an embodiment, the material is at least partially disposed in a reactor. The reactor may comprise a bioreactor. The material may be agitated. The material may be agitated at about 50 rpm to about 500 rpm. The material may comprise a polished material. The material may be contacted for less than about 10 days. The material may be cut from a larger piece of material.

The present disclosure also includes a use of a wetting agent and a reagent comprising a thiocarbonyl functional group in a process for extracting a base metal from a material comprising the base metal. In an embodiment, the process is any process for extracting a base metal from a material comprising the base metal as described herein.

The present disclosure also includes a use of a wetting agent and a reagent comprising a thiocarbonyl functional group in a process for extracting (e.g. leaching) and optionally recovering a base metal from a material comprising the base metal. In an embodiment, the process comprises recovering the base metal. Accordingly, the present disclosure also includes a use of a wetting agent and a reagent comprising a thiocarbonyl functional group in a process for extracting (e.g. leaching) and recovering a base metal from a material comprising the base metal. In another embodiment, the use does not comprise recovering the base metal. Accordingly, the present disclosure also includes a use of a wetting agent and a reagent comprising a thiocarbonyl functional group in a process for extracting (e.g. leaching) a base metal from a material comprising the base metal. In an embodiment, the process is any process for extracting (e.g. leaching) and optionally recovering a base metal from a material comprising the base metal as described herein.

The present disclosure also includes a use of a wetting agent and a reagent comprising a thiocarbonyl functional group for extracting a base metal from a material comprising the base metal, wherein the material is contacted under acidic conditions with the wetting agent and the reagent comprising a thiocarbonyl functional group.

The present disclosure also includes a use of a wetting agent and a reagent comprising a thiocarbonyl functional group for extracting (e.g., leaching) and optionally recovering a base metal from a material comprising the base metal, wherein the material is contacted under acidic conditions with the wetting agent and the reagent comprising a thiocarbonyl functional group. In an embodiment, the use comprises recovering the base metal. Accordingly, the present disclosure also includes a use of a wetting agent and a reagent comprising a thiocarbonyl functional group for extracting (e.g. leaching) and recovering a base metal from a material comprising the base metal, wherein the material is contacted under acidic conditions with the wetting agent and the reagent comprising a thiocarbonyl functional group. In another embodiment, the use does not comprise recovering the base metal. Accordingly, the present disclosure also includes a use of a wetting agent and a reagent comprising a thiocarbonyl functional group for extracting (e.g. leaching) a base metal from a material comprising the base metal, wherein the material is contacted under acidic conditions with the wetting agent and the reagent comprising a thiocarbonyl functional group.

The material is contacted with the wetting agent and the reagent comprising the thiocarbonyl functional group by any suitable process.

In an embodiment, the material is contacted with the reagent comprising a thiocarbonyl functional group by a process comprising: contacting the material with an acidic mixture comprising the reagent comprising a thiocarbonyl functional group.

In an embodiment, the acidic mixture further comprises the wetting agent and the material is contacted with the wetting agent and the reagent comprising a thiocarbonyl functional group by a process comprising: contacting the material with the acidic mixture comprising the wetting agent and the reagent comprising a thiocarbonyl functional group. In another embodiment, the material is agglomerated prior to contact. In an alternative embodiment, the material is contacted with the wetting agent and the reagent comprising a thiocarbonyl functional group by a process comprising agglomerating the material in the presence of the wetting agent prior to contact with the acidic mixture. Processes for agglomerating are well known in the art and a suitable process for agglomeration can be selected by the skilled person.

In some embodiments, the acidic mixture further comprises an oxidizing agent. The oxidizing agent can be any suitable oxidizing agent or combination thereof, the selection of which can be made by a person skilled in the art. In an embodiment, the oxidizing agent comprises oxygen, a source of $Fe^{3+}$ ions or combinations thereof. In another embodiment, the oxidizing agent comprises a source of $Fe^{3+}$ (ferric) ions. For example, the oxidizing agent can comprise a salt such as ferric sulfate (also known as iron (III) sulfate or $Fe_2(SO_4)_3$) that can act as a direct source of $Fe^{3+}$ ions and/or a salt such as ferrous sulfate (also known as iron (II) sulfate or $FeSO_4$) that acts as a direct source of $Fe^{2+}$ ions that can, for example, be oxidized into $Fe^{3+}$ ions e.g. by iron-oxidizing bacteria. The salt may be water-soluble. In another embodiment, the oxidizing agent comprises ferric sulfate. In another embodiment, the source of ferric ions comprises ferric ions generated at least in part by iron-oxidizing bacteria. In an embodiment, the acidic mixture comprises a ferric solution. In another embodiment, the acidic mixture comprises a ferric sulfate solution. In a further embodiment, the acidic mixture comprises a ferric media. In another embodiment, the acidic mixture comprises a ferrous sulfate solution. In another embodiment, the ferrous sulfate solution provides a source of $Fe^{2+}$ ions that are oxidized to $Fe^{3+}$ ions by iron-oxidizing bacteria. The concentration of the oxidizing agent such as ferric sulfate in the acidic mixture can be any suitable concentration. In an embodiment, prior to the material being contacted with the wetting agent and the reagent comprising a thiocarbonyl functional group, the oxidizing agent e.g., ferric sulfate is present in the acidic mixture at a concentration of less than 10 g/L of $Fe^{3+}$. In another embodiment, prior to the material being contacted with the wetting agent and the reagent comprising a thiocarbonyl functional group, the oxidizing agent e.g., ferric sulfate is present in the acidic mixture at a concentration of from about 0.5 g/L to about 40 g/L, about 1.5 g/L to about 3 g/L or about 2 g/L to about 2.5 g/L of $Fe^{3+}$.

In some embodiments, the material comprising the base metal (e.g., a base metal sulfide ore) further comprises iron-oxidizing bacteria. In some embodiments, the acidic mixture further comprises iron-oxidizing bacteria. The iron-oxidizing bacteria can be any suitable iron-oxidizing bacteria or combination (consortium) thereof, the selection of which can be made by a person skilled in the art. In an embodiment, the iron-oxidizing bacteria comprise *Acidothiobacilos ferrooxidans*.

The material comprising the base metal is any suitable material comprising a base metal or combination thereof extractable by the processes of the present disclosure. For example, in an embodiment, the material comprising the base metal is a material comprising a base metal sulfide, electronic waste comprising a base metal, or any other suitable material comprising a base metal or combinations thereof. The electronic waste may comprise printed circuit boards, batteries, or other metal containing waste, or a combination thereof. In an embodiment, the material comprising the base metal is a material comprising a base metal sulfide.

Suitable base metals may include but are not limited to copper, nickel, iron, aluminium, lead, zinc, tin, tungsten (also sometimes referred to as wolfram), molybdenum, tantalum, magnesium, cobalt, bismuth, cadmium, titanium, zirconium, antimony, manganese, beryllium, chromium, germanium, vanadium, gallium, hafnium, indium, niobium (also sometimes referred to as columbium), rhenium, thallium and combinations thereof. In an embodiment, the base metal comprises copper, nickel, zinc or combinations thereof. In another embodiment, the base metal comprises, copper. In another embodiment, the base metal is copper. In an embodiment, the material comprises an ore. In an embodiment, the material comprises a copper sulfide ore. In another embodiment, the copper sulfide ore comprises a primary copper sulfide (e.g., chalcopyrite, bornite, enargite or combinations thereof), a secondary copper sulfide (e.g., covellite, chalcocite or combinations thereof) or combinations thereof. In an embodiment, the copper sulfide ore comprises a primary copper sulfide. In another embodiment, the copper sulfide ore comprises a secondary copper sulfide. In a further embodiment, the copper sulfide ore comprises a combination of a primary copper sulfide and a secondary copper sulfide. In another embodiment, the copper sulfide ore comprises chalcopyrite, bornite, enargite, covellite, chalcocite, a copper sulfide of the formula $Cu_xS_y$ wherein the x:y ratio is between 1 and 2 or combinations thereof. In an embodiment, the copper sulfide of the formula $Cu_xS_y$ wherein the x:y ratio is between 1 and 2 is chalcocite, djurleite, digenite or combinations thereof. In another embodiment, the copper sulfide ore comprises chalcopyrite. Base metal sulfide ores other than copper sulfide ores are well known to the person skilled in the art. In an embodiment, the material comprises of a nickel sulfide ore. In another embodiment, the nickel sulfide ore comprises pentlandite, violarite or combinations thereof. In an embodiment, the ore may be a sulfide ore. The sulfide ore may comprise a primary sulfide, a secondary sulfide, or a combination thereof.

The acidic conditions are any suitable acidic conditions, the selection of which can be made by a person skilled in the art. In some embodiments, sulfuric acid is added to obtain the acidic conditions. In an embodiment, prior to the contact, the pH of the acidic mixture is in a range of from about 0.5 to about 4, about 1 to about 3, or about 1.5 to about 2.5. In another embodiment, the pH of the acidic mixture is about 2.

The reagent comprising a thiocarbonyl functional group can be any suitable reagent comprising a thiocarbonyl functional group. For example, suitable reagents comprising a thiocarbonyl functional group may feature a C=S functional group comprising a sulfur bearing a partial negative charge, bearing a negative electrostatic potential surface and comprising an empty $\pi^*$-antibonding orbital as its lowest unoccupied molecular orbital (LUMO), provided that the reagent comprising a thiocarbonyl functional group is at least partially soluble in water and preferably does not significantly complex with the base metal and/or (if present) the oxidizing agent to form insoluble precipitates. Certain reagents comprising a thiocarbonyl functional group are capable of oxidizing to form the corresponding dimer. For example, thiourea, in the presence of a suitable oxidant such as ferric sulfate is capable of oxidizing to form the dimer formamidine disulfide (FDS). An equilibrium exists between FDS and thiourea in a ferric sulfate solution such that, for example, an acidic mixture prepared with a dimer of a reagent comprising a thiocarbonyl functional group (e.g. FDS) will provide the reagent comprising a thiocarbonyl functional group (e.g. thiourea) for contacting the material. Accordingly, in an embodiment, the reagent comprising a thiocarbonyl functional group is added in the form of the corresponding dimer. In an alternative embodiment of the present disclosure, the reagent comprising a thiocarbonyl functional group is added in monomeric form (i.e. in the form of the reagent comprising a thiocarbonyl functional group).

In an embodiment, the reagent comprising a thiocarbonyl functional group comprises N—N' substituted thioureas; 2,5-dithiobiurea; dithiobiuret; thiosemicarbazide purum; thiosemicarbazide; thioacetamide; 2-methyl-3-thiosemicarbazide; 4-methyl-3-thiosemicarbazide; vinylene trithiocarbonate purum; vinylene trithiocarbonate; 2-cyanothioacetamide; ethylene trithiocarbonate; potassium ethyl xanthogenate; dimethylthiocarbamoyl chloride; dimethyldithiocarbamate; dimethyl trithiocarbonate; N,N-dimethylthioformamide; 4,4-dimethyl-3-thiosemicarbazide; 4-ethyl-3-thiosemicarbazide; O-isopropylxanthic acid; ethyl thiooxamate; ethyl dithioacetate; pyrazine-2-thiocarboxamide; diethylthiocarbamoyl chloride; diethyldithiocarbamate; tetramethylthiuram monosulfide; tetramethylthiuram disulfide; pentafluorophenyl chlorothionoformate; 4-fluorophenyl chlorothionoformate; O-phenyl chlorothionoformate; phenyl chlorodithioformate; 3,4-difluorothiobenzamide; 2-bromothiobenzamide; 3-bromothiobenzamide; 4-bromothiobenzamide; 4-chlorothiobenzamide; 4-fluorothiobenzamide; thiobenzoic acid; thiobenzamide; 4-phenylthiosemicarbazide; O-(p-tolyl) chlorothionoformate; 4-bromo-2-methylthiobenzamide; 3-methoxythiobenzamide; 4-methoxythiobenzamide; 4-methylbenzenethioamide; thioacetanilide; salicylaldehyde thiosemicarbazone; indole-3-thiocarboxamide; S-(thiobenzoyl)thioglycolic acid; 3-(acetoxy)thiobenzamide; 4-(acetoxy)thiobenzamide; methyl N'-[(e)-(4-chlorophenyl)methylidene]hydrazonothiocarbamate; 3-ethoxythiobenzamide; 4-ethylbenzene-1-thiocarboxamide; tert-butyl 3-[(methylsulfonyl)oxy]-1-azetanecarboxylate; diethyldithiocarbamic acid; 2-(phenylcarbonothioylthio)-propanoic acid; 2-hydroxybenzaldehyde N-ethylthiosemicarbazone; (1R,4R)-1,7,7-trimethylbicyclo[2.2.1]heptane-2-thione; tetraethylthiuram disulfide; 4'-hydroxybiphenyl-4-thiocarboxamide; 4-biphenylthioamide; dithizone; 4'-methylbiphenyl-4-thiocarboxamide; tetraisopropylthiuram disulfide; anthracene-9-thiocarboxamide; phenanthrene-9-thiocarboxamide; sodium dibenzyldithiocarbamate; 4,4'-bis(dimethylamino)thiobenzophenone; or combinations thereof. In an embodiment, the reagent comprising a thiocarbonyl functional group comprises thiourea, ethylene thiourea, thioacetamide, sodium dimethyldithiocarbamate, trithiocarbonate, thiosemicarbazide or combinations thereof. In another embodiment, the reagent comprising a thiocarbonyl functional group comprises thiourea. In another embodiment, the reagent comprising a thiocarbonyl functional group does not comprise thiourea.

The concentration of the reagent comprising a thiocarbonyl functional group in the acidic mixture can be any suitable concentration. In embodiments wherein the reagent comprising a thiocarbonyl functional group is added in the form of the corresponding dimer, the concentrations specified herein for the reagent comprising a thiocarbonyl functional group refers to a concentration calculated as if all of the dimer was dissociated into the reagent comprising a thiocarbonyl functional group. In an embodiment, prior to the material being contacted with the wetting agent and the reagent comprising a thiocarbonyl functional group, the reagent comprising a thiocarbonyl functional group is comprised in the acidic mixture at a concentration of about 0.002 mM or greater, about 0.02 mM or greater, about 0.1 mM or greater, about 0.2 mM or greater, about 0.25 mM or greater, about 0.3 mM or greater, about 0.4 mM or greater, about 0.5 mM or greater, about 0.6 mM or greater, about 0.7 mM or greater, about 0.8 mM or greater, about 0.9 mM or greater, about 1.0 mM or greater, about 1.5 mM or greater, about 2 mM or greater, about 2.5 mM or greater, about 3 mM or greater, about 4 mM or greater, about 5 mM or greater, about 10 mM or greater, about 20 mM or greater, about 30 mM or greater, or about 60 mM or greater. In an embodiment, prior to the material being contacted with the wetting agent and the reagent comprising a thiocarbonyl functional group, the reagent comprising a thiocarbonyl functional group is comprised in the acidic mixture at a concentration of about 100 mM or lower, about 60 mM or lower or about 30 mM or lower. In another embodiment, prior to the material being contacted with the wetting agent and the reagent comprising a thiocarbonyl functional group, the reagent comprising a thiocarbonyl functional group is comprised in the acidic mixture at a concentration of about 20 mM or lower. In some embodiments, a lower concentration of the reagent comprising a thiocarbonyl functional group is used. Accordingly, in another embodiment of the present disclosure, prior to the material being contacted with the wetting agent and the reagent comprising a thiocarbonyl functional group, the reagent comprising a thiocarbonyl functional group is comprised in the acidic mixture at a concentration of about 10 mM or lower, about 5 mM or lower, about 4 mM or lower, about 3 mM or lower, about 2.5 mM or lower, about 2 mM or lower, about 1.5 mM or lower, about 1.0 mM or lower, about 0.9 mM or lower, about 0.8 mM or lower, about 0.75 mM or lower, about 0.7 mM or lower, about 0.6 mM or lower, about 0.5 mM or lower, about 0.4 mM or lower, about 0.3 mM or lower, about 0.2 mM or lower, about 0.02 mM or lower, or about 0.002 mM or lower. It will be appreciated by a person skilled in the art that such embodiments can be interchanged in any suitable manner. For example, in another embodiment, prior to the material being contacted with the wetting agent and the reagent comprising a thiocarbonyl functional group, the reagent comprising a thiocarbonyl functional group is comprised in the acidic mixture at a concentration in the range of about 0.002 mM to about 100 mM, about 0.002 mM to about 60 mM, about 0.002 mM to about 50 mM, about 0.002 mM to about 30 mM, about 0.002 mM to about 20 mM, about 0.002 mM to about 10 mM, about 0.002 mM to about 5 mM, about 0.002 mM to about 2 mM, about 0.002 mM to about 1 mM, about 0.002 mM to about 0.5 mM, about 0.002 mM to about 0.2 mM, about 0.002 mM to about 0.02 mM, about 0.02 mM to about 100 mM, about 0.02 mM to about 60 mM, about 0.02 mM to about 50 mM, about 0.02 mM to about 30 mM, about 0.02 mM to about 20 mM, about 0.02 mM to about 10 mM, about 0.02 mM to about 5 mM, about 0.02 mM to about 2 mM, about 0.02 mM to about 1 mM, about 0.02 mM to about 0.5 mM, about 0.02 mM to about 0.2 mM, about 0.2 mM to about 100 mM, about 0.2 mM to about 60 mM, about 0.2 mM to about 50 mM, about 0.2 mM to about 30 mM, about 0.2 mM to about 20 mM, about 0.2 mM to about 10 mM, about 0.2 mM to about 5 mM, about 0.2 mM to about 2 mM, about 0.2 mM to about 1 mM, about 0.2 mM to about 0.5 mM, about 2 mM to about 100 mM, about 2 mM to about 60 mM, about 2 mM to about 50 mM, about 2 mM to about 30 mM, about 2 mM to about 20 mM, about 2 mM to about 10 mM, about 2 mM to about 5 mM, about 10 mM to about 100 mM, about 10 mM to about 60 mM, about 10 mM to about 50 mM, about 10 mM to about 30 mM, about 10 mM to about 20 mM, about 30 mM to about 100 mM, about 30 mM to about 60 mM, about 30 mM to about 50 mM, about 50 mM to about 100 mM, about 60 mM to about 100 mM, about 0.2 mM to about 4 mM, about 0.2 mM to about 3 mM about 0.25 mM to about 2.5 mM, about 0.2 mM to about 1.5 mM, about 0.25 mM to about 0.75 mM, about 1.5 mM to about 2.5 mM, or about 0.5 mM to about 2 mM.

Alternatively, in embodiments where the reagent comprising a thiocarbonyl functional group is added in the form of the corresponding dimer (e.g. FDS), prior to the material being contacted with the wetting agent and the reagent, the reagent may be added at any suitable concentration of the reagent. The concentrations specified hereinbelow for FDS refer to a concentration calculated as if no FDS was dissociated into thiourea. In an embodiment, the FDS is comprised in the acidic conditions at a concentration of about 0.001 mM or greater, about 0.01 mM or greater, about 0.05 mM or greater, about 0.1 mM or greater, about 0.125 mM or greater, about 0.15 mM or greater, about 0.2 mM or greater, about 0.25 mM or greater, about 0.3 mM or greater, about 0.35 mM or greater, about 0.4 mM or greater, about 0.45 mM or greater, about 0.5 mM or greater, about 0.75 mM or greater, about 1 mM or greater, about 1.25 mM or greater, about 1.5 mM or greater, about 2 mM or greater, about 2.5 mM or greater, about 5 mM or greater, about 10 mM or greater, about 15 mM or greater, or about 30 mM or greater. In an embodiment, the FDS is comprised in the acidic conditions at a concentration of about 50 mM or lower, about 30 mM or lower, or about 15 mM or lower. In another embodiment, the FDS is comprised in the acidic conditions at a concentration of about 10 mM or lower. In some embodiments, a lower concentration of the FDS is used. Accordingly, in another embodiment of the present disclosure, the FDS is comprised in the acidic conditions at a concentration of about 5 mM or lower, about 2.5 mM or lower, about 2 mM or lower, about 1.5 mM or lower, about 1.25 mM or lower, about 1 mM or lower, about 0.75 mM or lower, about 0.5 mM or lower, about 0.45 mM or lower, about 0.4 mM or lower, about 0.375 mM or lower, about 0.35 mM or lower, about 0.3 mM or lower, about 0.25 mM or lower, about 0.2 mM or lower, about 0.15 mM or lower, about 0.1 mM or lower, about 0.01 mM or lower, or about 0.001 mM or lower. It will be appreciated by a person skilled in the art that such embodiments can be interchanged in any suitable manner. For example, in another embodiment, the FDS is comprised in the acidic conditions at a concentration in a range of about 0.001 mM to about 50 mM, about 0.001 mM to about 30 mM, about 0.001 mM to about 25 mM about 0.001 mM to about 15 mM, about 0.001 mM to about 10 mM, about 0.001 mM to about 5 mM, about 0.001 mM to about 2.5 mM, about 0.001 mM to about 1 mM, about 0.001 mM to about 0.5 mM, about 0.001 mM to about 0.25 mM, about 0.001 mM to about 0.1 mM, about 0.001 mM to about 0.01 mM, about 0.01 mM to about 50 mM, about 0.01 mM to about 30 mM about 0.01 mM to about 25 mM, about 0.01 mM to about 15 mM, about 0.01 mM to about 10 mM, about 0.01 mM to about 5 mM, about 0.01 mM to about 2.5 mM, about 0.01 mM to about 1 mM, about 0.01 mM to about 0.5 mM, about 0.01 mM to about 0.25 mM, about 0.01 mM to about 0.1 mM, about 0.1 mM to about 50 mM, about 0.1 mM to about 30 mM, about 0.1 mM to about 25 mM, about 0.1 mM to about 15 mM, about 0.1 mM to about 10 mM, about 0.1 mM to about 5 mM, about 0.1 mM to about 2.5 mM, about 0.1 mM to about 1 mM, about 0.1 mM to about 0.5 mM, about 0.1 mM to about 0.25 mM, about 1 mM to about 50 mM, about 1 mM to about 30 mM, about 1 mM to about 25 mM, about 1 mM to about 15 mM, about 1 mM to about 10 mM, about 1 mM to about 5 mM, about 5 mM to about 50 mM, about 5 mM to about 30 mM about 5 mM to about 25 mM, about 5 mM to about 15 mM, about 5 mM to about 10 mM, about 15 mM to about 50 mM, about 15 mM to about 30 mM, about 15 mM to about 25 mM, about 25 mM to about 50 mM, or about 30 mM to about 50 mM.

The wetting agent can be any suitable wetting agent or combination thereof. In an embodiment, the wetting agent may comprise a non-ionic wetting agent. The non-ionic wetting agent can be any suitable non-ionic wetting agent or combination thereof. The amount of the wetting agent used in the processes of the present disclosure is any suitable amount. For example, it will be appreciated by a person skilled in the art that in embodiments wherein iron-oxidizing bacteria are present, the amount is compatible with the presence of such bacteria and is desirably selected such that no significant difference is observed in the growth and/or iron oxidation ability of the bacteria. In an embodiment, the acidic mixture comprises the wetting agent and prior to the material being contacted with the non-ionic wetting agent and the reagent comprising a thiocarbonyl functional group, the wetting agent is comprised in the acidic mixture at a concentration of from about 0.001 g/L to about 1 g/L, about 0.005 g/L to about 0.5 g/L or about 0.01 g/L to about 0.1 g/L. It will also be appreciated by a person skilled in the art that in embodiments wherein the material is agglomerated in the presence of the wetting agent, such agglomeration may lead to surfactant loss such that additional wetting agent may need to be added prior to and/or during the process to account for such loss.

In an embodiment, the non-ionic wetting agent may comprise a non-ionic ethoxylate surfactant, a polyethylene glycol or combinations thereof. In an embodiment, the non-ionic wetting agent is a non-ionic ethoxylate surfactant. The non-ionic ethoxylate surfactant can be any suitable non-ionic ethoxylate surfactant or combination thereof. In another embodiment, the non-ionic wetting agent is a polyethylene glycol. The polyethylene glycol can be any suitable polyethylene glycol or combination thereof. For example, the skilled person will appreciate that polyethylene glycols of low molecular weight (e.g., less than about 2,000 g/mol) may be suitable wetting agents. The polyethylene glycol may comprise a molecular weight of less than 2,000 g/mol. The polyethylene glycol may comprise a molecular weight of less than 20,000 g/mol. The polyethylene glycol may comprise a molecular weight of about 200 g/mol to about 2,000 g/mol, about 2,000 g/mol to about 20,000 g/mol, or about 20,000 g/mol. In an embodiment, the polyethylene glycol comprises an average molecular weight of from about 100 g/mol to about 600 g/mol or about 100 g/mol to about 300 g/mol. In another embodiment, the polyethylene glycol is polyethylene glycol 200. In a further embodiment, the non-ionic wetting agent may comprise a combination of a non-ionic ethoxylate surfactant and a polyethylene glycol.

In an embodiment, the non-ionic ethoxylate surfactant is selected from a polysorbate, an alkylphenyl ether of polyethylene glycol or a reduced form thereof, an alkylether of polyethylene glycol and combinations thereof. In another embodiment, the non-ionic ethoxylate surfactant may comprise a combination of a polysorbate, an alkylphenyl ether of polyethylene glycol or a reduced form thereof and/or an alkylether of polyethylene glycol.

In an embodiment, the non-ionic wetting agent may comprise a polysorbate. The polysorbate can be any suitable polysorbate or combination thereof.

In an embodiment, the polysorbate may comprise one or more compounds of formula (I):

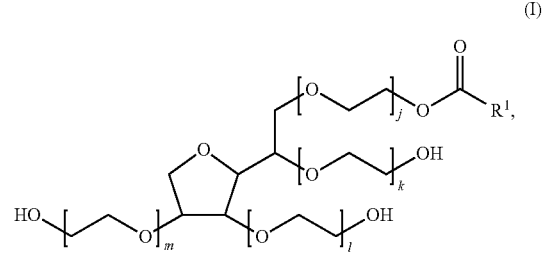

wherein $R^1$ is $C_{4-30}$alkyl, $C_{4-30}$alkenyl or $C_{4-30}$alkynyl; and $j+k+l+m=20$. In an embodiment, $R^1$ is $C_{4-30}$alkyl or $C_{4-30}$alkenyl. In another embodiment, $R^1$ is $C_{10-20}$alkyl or $C_{10-20}$alkenyl.

In an embodiment, the polysorbate is polysorbate 20, polysorbate 40, polysorbate 60, polysorbate 80 or combinations thereof. It will be appreciated by a person skilled in the art that commercial sources of such polysorbates may be in the form of combinations of compounds of Formula (I) comprising different $R^1$ groups. For example, a commercial source of polysorbate 20 may comprise Tween™ 20 (polyethylene glycol sorbitan monolaurate) which may comprise a compound of Formula (I) wherein $R^1$ is —$(CH_2)_{10}CH_3$ (i.e. a lauric acid ester of ethoxylated sorbitan) in an amount greater than or equal to about 40%, with the balance primarily comprising compounds of Formula (I) wherein $R^1$ is —$(CH_2)_{12}CH_3$, —$(CH_2)_{14}CH_3$, and —$(CH_2)_{16}CH_3$ (i.e., a myristic acid ester, a palmitic acid ester and a stearic acid ester of ethoxylated sorbitan, respectively). A commercial source of polysorbate 40 may comprise Tween™ 40 (polyethylene glycol sorbitan monopalmitate) which may comprise a compound of Formula (I) wherein $R^1$ is —$(CH_2)_{14}CH_3$ (i.e., a palmitic acid ester of ethoxylated sorbitan) in an amount of about 90%, with the balance primarily a compound of Formula (I) wherein $R^1$ is —$(CH_2)_{16}CH_3$ (i.e., a stearic acid ester of ethoxylated sorbitan). A commercial source of polysorbate 60 may comprise Tween™ 60 (polyethylene glycol sorbitan monostearate) which may comprise a compound of Formula (I) wherein $R^1$ is —$(CH_2)_{16}CH_3$ (i.e., a stearic acid ester of ethoxylated sorbitan) in an amount of about 40% to about 60%, with a total amount of compounds of Formula (I)

wherein $R^1$ is —$(CH_2)_{14}CH_3$ and —$(CH_2)_{16}CH_3$ (i.e., a palmitic acid ester and a stearic acid ester of ethoxylated sorbitan, respectively) in an amount of greater than or equal to about 90%. A commercial source of polysorbate 80 may comprise Tween™ 80 (polyethylene glycol sorbitan monooleate) which may comprise a compound of Formula (I) wherein $R^1$ is —$(CH_2)_7CH=CH-(CH_2)_7CH_3$ (wherein the double bond is in the cis configuration; i.e. an oleic acid ester of ethoxylated sorbitan) in an amount of greater than or equal to about 58%, with the balance primarily comprising compounds of Formula (I) wherein $R^1$ is —$(CH_2)_7CH=CH-CH_2-CH=CH-(CH_2)_4CH_3$ (wherein each double bond is in the cis configuration), —$(CH_2)_{14}CH_3$ and —$(CH_2)_{16}CH_3$ (i.e. a linoleic acid ester, a palmitic acid ester and a stearic acid ester of ethoxylated sorbitan, respectively). In an embodiment, the polysorbate may comprise a Tween™ series surfactant. In an embodiment, the polysorbate may comprise polysorbate 20 (e.g., Tween™ 20). In another embodiment, the polysorbate may comprise polysorbate 40 (e.g., Tween™ 40). In another embodiment, the polysorbate may comprise polysorbate 60 (e.g., Tween™ 60). In another embodiment, the polysorbate may comprise polysorbate 80 (e.g., Tween™ 80). In another embodiment, the polysorbate may comprise a combination of polysorbate 20, polysorbate 40, polysorbate 60 and/or polysorbate 80 (e.g., a combination of Tween™ 20, Tween™ 40, Tween™ 60 and/or Tween™ 80).

In an embodiment, the non-ionic wetting agent may comprise an alkylphenyl ether of polyethylene glycol. The alkylphenyl ether of polyethylene glycol can be any suitable alkylphenyl ether of polyethylene glycol or combination thereof.

In an embodiment, the alkylphenyl ether of polyethylene glycol is one or more compounds of the Formula (II):

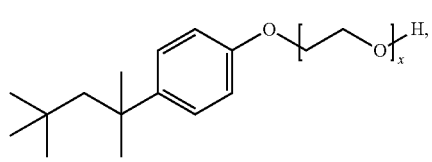

(II)

wherein x is 5-20.

In an embodiment, x is 5-15. In another embodiment, x is 7-10. In a further embodiment, x is 9-10. It will be appreciated by a person skilled in the art that commercial sources of such alkylphenyl ethers of polyethylene glycols may comprise combinations of compounds of Formula (II) comprising different values for x. For example, Triton™ X-100 is a combination of compounds of Formula (II) wherein x is 9-10. Accordingly, in an embodiment, the alkylphenyl ether of polyethylene glycol is a combination of compounds of the Formula (II):

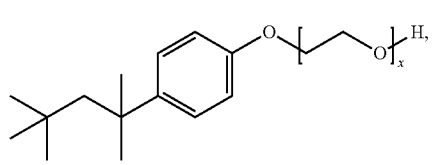

(II)

wherein x is 9-10.

In an embodiment, the non-ionic wetting agent may comprise an alkylphenyl ether of polyethylene glycol in reduced form. The alkylphenyl ether of polyethylene glycol in reduced form can be any suitable alkylphenyl ether of polyethylene glycol in reduced form or combination thereof. In an embodiment, the alkylphenyl ether of polyethylene glycol in reduced form may comprise one or more compounds of the Formula (III):

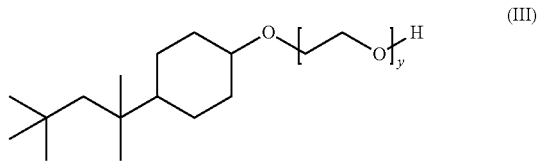

(III)

wherein y is 5-20.

In an embodiment, y is 5-15. In another embodiment, y is 7-10. In a further embodiment, y is 9-10. In another embodiment, the alkylphenyl ether of polyethylene glycol in reduced form may comprise a combination of compounds of the Formula (III):

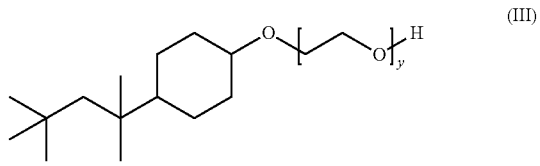

(III)

wherein y is 9-10.

In an embodiment, the non-ionic wetting agent may comprise an alkylether of polyethylene glycol. The alkylether of polyethylene glycol can be any suitable alkylether of polyethylene glycol or combination thereof. In another embodiment of the present disclosure, the alkylether of polyethylene glycol may comprise one or more compounds of the Formula (IV):

(IV)

wherein $R^2$ is $C_{10-14}$alkyl and z is 3-20.

In an embodiment, $R^2$ is $C_{10-14}$alkyl. In another embodiment, $R^2$ is —$(CH_2)_{11}CH_3$. In an embodiment, z is 4-9. In another embodiment, z is 5. In a further embodiment, z is 8.

The contacting of the material with the wetting agent and the reagent comprising a thiocarbonyl functional group is carried out under any suitable temperature and pressure conditions. For example, the contacting can be carried out at a temperature greater than 0° C. to about 80° C. However, the contacting in the uses of the present disclosure is advantageously carried out at ambient temperature (e.g. from about 5° C. to about 40° C. or about 15° C. to about 25° C.) and pressure (i.e. about 1 atm). Ambient pressure may be different at various altitudes. It will also be appreciated by a person skilled in the art that a suitable temperature may, for example, depend on the particular wetting agent or combination thereof and its corresponding upper and lower critical temperatures.

The following non-limiting examples are illustrative of the present disclosure:

EXAMPLES

The general reactor leaching conditions used in the examples were 2.2 g/L $Fe^{3+}$ obtained from ferric sulphate (Fe$_2$(SO$_4$)$_3$) adjusted by sulfuric acid to a pH of about 2 for all experiments. The specified amounts of pulverized chalcopyrite (CuFeS$_2$), chalcocite (Cu$_2$S), or Enargite (Cu$_3$AsS$_4$) wetting agent and a reagent comprising a thiocarbonyl functional group (or equivalent such as formamidine disulfide) were then added to the leaching mixture. All chalcopyrite samples used in the examples came from natural minerals containing 33.4% of copper according to inductively coupled plasma-atomic emission spectroscopy (ICP-AES) analysis. Chalcocite used in the experiments is reagent grade from Sigma Aldrich. Enargite sample used in the experiment came from natural mineral containing 69.9% of enargite as the only source of copper. For natural minerals, no pretreatment was performed other than pulverization. *Acidothiobacilos ferrooxidans*, an iron-oxidizing bacteria commonly used in acidic heap leaching were incorporated to the leaching environment. Bacteria were cultured from Modified Kelly Medium (MKM; containing 0.4 g/L ammonium sulfate, 0.4 g/L magnesium sulfate and 0.04 g/L potassium dihydrogen phosphate). The same bacterial culture was used in all bioleaching tests. 1 ml/L of the culture was added to each bioreactor before the test and no further maintenance was performed. The minerals were agitated in bioreactors at about 500 rpm at ambient temperature and atmosphere. Column bioleaching were also conducted using the same lixiviant containing 2.2 g/L Fe$^{3+}$ obtained from ferric sulphate (Fe$_2$(SO$_4$)$_3$) adjusted by sulfuric acid to a pH of about 2 for all experiments. The lixiviant was also inoculated with the same *Acidothiobacilos ferrooxidans* as the reactors. 1.6 kg of low-grade chalcopyrite minerals containing 0.52% copper were used for each column with the 10 cm in diameter by 20 cm in height. The lixiviant was irrigated from the top of the column at a speed of 1 L per day. The synergy of the process is quantified by using comparative leaching rate. For nonlinear leaching behavior, instantaneous leaching rate at time t; is calculated by weighted central differences on the form:

$$\frac{dy}{dt}\bigg|_i \approx \left(\frac{t_{i+1} - t_i}{t_{i+1} - t_{i-1}}\right)\left(\frac{y_i - y_{i-1}}{t_i - t_{i-1}}\right) + \left(\frac{t_i - t_{i-1}}{t_{i+1} - t_{i-1}}\right)\left(\frac{y_{i+1} - y_i}{t_{i+1} - t_i}\right)$$

And the comparative leaching rate (no synergy) is expressed as:

$$R_{calculated} = R_{control}\left(\frac{R_{surfactant}}{R_{control}}\right)\left(\frac{R_{catalyst}}{R_{control}}\right)$$

Therefore, the synergy index is defined as $$\left(\frac{R_{experimental}}{R_{calculated}}\right)$$

For this this index number:
>1 means the two effects have positive synergy;
=1 means the two effects are independent and there is no synergy;
<1 means the two effects have negative synergy.

Example 1

Thiourea and Tween™ 20, a polyethylene glycol sorbitan monolaurate nonionic surfactant were used in this example. In each test, 5 grams of pulverized chalcopyrite (CuFeS$_2$) mineral and 1 L of lixiviant was used. The control test ("Control") was carried out using the general leaching conditions described above. A thiourea control test ("TU") was run under the same conditions as the control test, except for the addition of 0.5 mM thiourea at the beginning of the test. A Tween 20 control test ("Tween20") was run under the same conditions as the control test, except for the addition of 30 ppm of Tween 20 at the beginning of the test. The thiourea and Tween 20 test ("TU+Tween20") was run under the same conditions as the control test except for the addition of 0.5 mM of thiourea and 30 ppm of Tween 20.

It was observed that the use of thiourea alone or Tween 20 alone enhanced the extraction of copper (see FIG. 1; percent copper extraction for test "TU" and "Tween20" in comparison to test ("Control"). However, by combining thiourea and Tween 20 together, the two compounds ("TU+Tween20") created a significant synergistic effect. By comparing the results obtained at hour 600, it is seen that adding Tween 20 alone to the control condition improved the extraction by 14.76% (from 8.21 to 21.03%) and adding thiourea alone improved the extraction by 19.97% (from 8.21 to 21.03%). In comparison, when both reagents were present, the copper extraction was increased by 61.07% (from 8.21 to 69.28%). Based on the leaching rates, the calculated synergy index=3.9975. The results suggest that Tween 20 created a strong synergistic effect with thiourea in catalyzed chalcopyrite leaching.

Example 2

Figure 2:
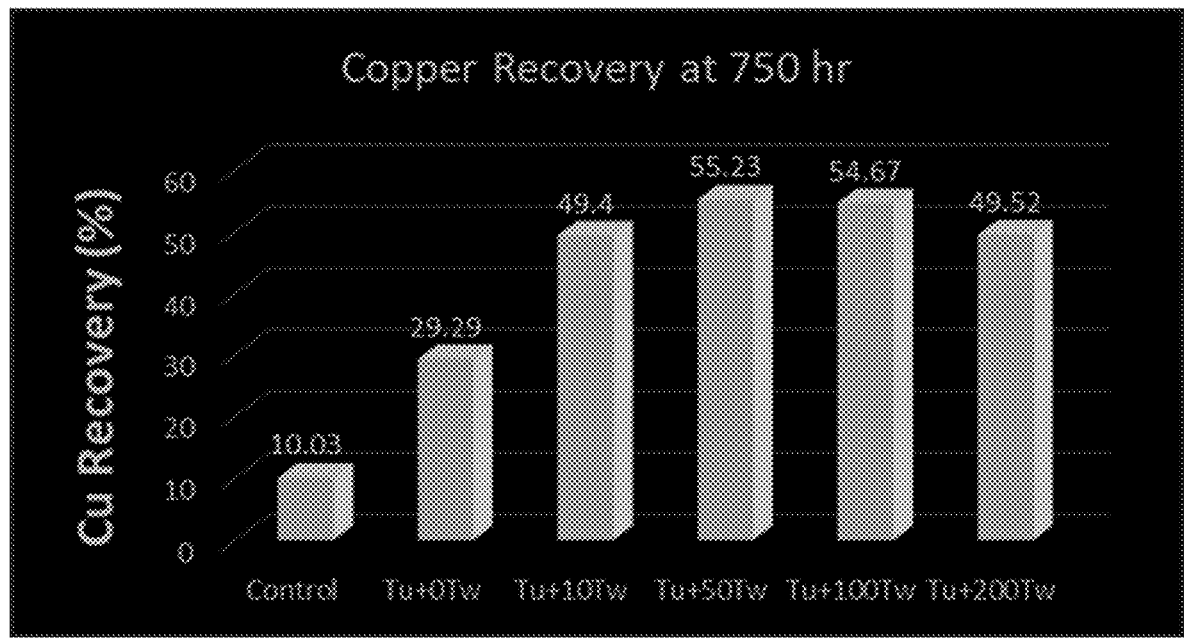
FIG. 2 is a graph showing the synergistic effect of adding thiourea (0.5 mM) and different dosages of Tween 20 (10, 50, 100, or 200 ppm) in a method for copper extraction from natural chalcopyrite ore according to embodiments of the present disclosure in comparison to a control method without either thiourea or Tween 20 (Control) and a control method with thiourea (Tu+0Tw) according to comparative examples of the present disclosure.

The tests in this example were carried out in a similar fashion as Example 1 except for certain concentrations as described herein. In all tests carried out for Example 2, 5 g/L of pulverized chalcopyrite mineral and 0.5 mM of thiourea were used. Various amounts of Tween 20 from 0 to 200 ppm were added to each bioreactor to investigate the effect of concentration of Tween 20 when combined with thiourea. FIG. 2 shows the results of the copper recovery for each test at 750 hr. "Tu+0Tw, Tu+10Tw, Tu+50Tw, Tu+100Tw, Tu+200Tw" represent the combination of 0.5 mM thiourea with 0, 10, 50, 100 and 200 ppm of Tween 20 respectively.

Example 3

Thiourea and Triton™ X-100 (Tx100) a nonionic surfactant containing a polyethylene oxide chain were used in this example. In each test, 5 g of pulverized chalcopyrite mineral was used. The control test ("Control") was carried out using the general leaching conditions described above. A thiourea control test ("TU") was run under the same conditions as the control test, except for the addition of 0.5 mM thiourea at the beginning of the test. A Tx100 control test ("Tx100") was run under the same conditions as the control test, except for the addition of 30 ppm of Tx100 at the beginning of the test. The thiourea and Tx100 test ("TU+Tx100") was run under the same conditions as the control test except for the addition of 0.5 mM of thiourea and 30 ppm of Tx100.

Figure 3:
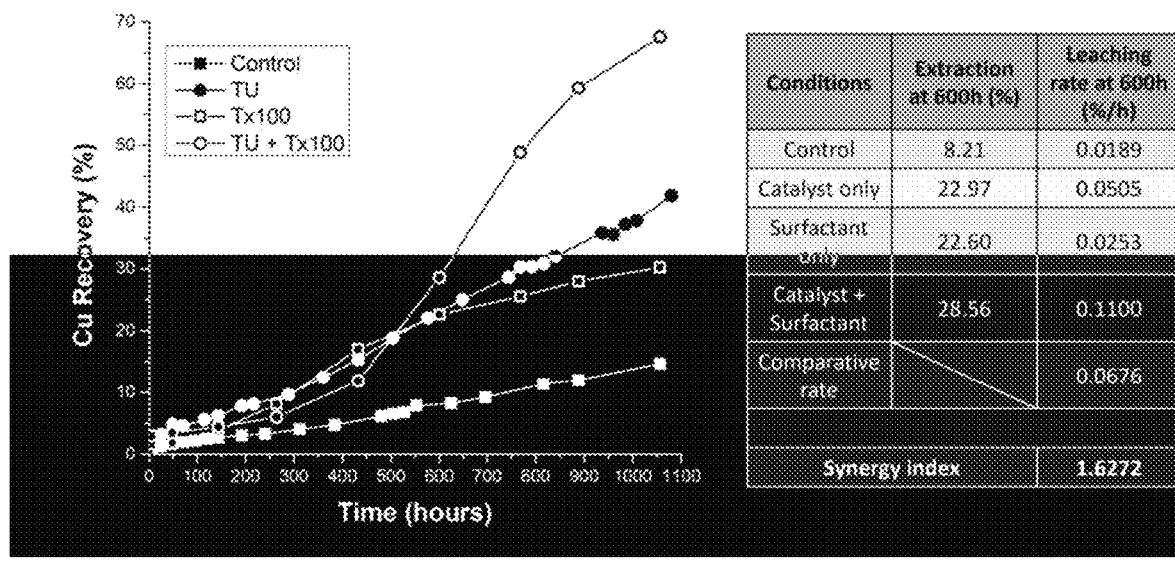
FIG. 3 is a graph showing the synergistic effect of adding thiourea (0.5 mM) and Triton™ X-100 (30 ppm) in a method for copper extraction from natural chalcopyrite ore according to an embodiment of the present disclosure (TU+Tx100) in comparison to a control method without either thiourea or Triton X-100 (Control), a control method with Triton X-100 (Tx100) and a control method with thiourea (TU) according to comparative examples of the present disclosure.

It was observed that the use of thiourea alone or Tx100 alone enhanced the extraction of copper (see FIG. 3; percent copper recovery for test "TU" and "Tx100" in comparison to test "Control"). However, by combining TU and Tx100 together in the "TU+Tx100" test, the two compounds created a significant synergistic effect in FIG. 3 for times at about 600 hours. For example, by comparing the results obtained at hour 600, it is seen that adding Tx100 alone to the control condition improved the extraction by 14.39% (from 8.21 to 22.60%) and adding thiourea alone improved the extraction by 14.76% (from 8.21 to 22.97%). In comparison, when both reagents were present, the copper extraction was increased by 20.35% (from 8.21 to 28.56%). Based on the leaching rates, the calculated synergy index=1.6272. The results suggest that Tx100 can create a strong synergistic effect with thiourea in catalyzed chalcopyrite leaching.

Example 4

Thiourea and polyethylene glycol 200 (PEG200) were used in this example. In each test, 5 g/L of pulverized chalcopyrite mineral was used. The control test ("Control") was carried out using the general leaching conditions described above. A thiourea control test ("Tu") was run under the same conditions as the control test, except for the addition of 2 mM thiourea at the beginning of the test. A PEG200 control test ("PEG200") was run under the same conditions as the control test, except for the addition of 30 ppm of PEG200 at the beginning of the test. A thiourea and PEG200 test ("Tu+PEG200") was run under the same conditions as the control test except for the addition of 2 mM of thiourea and 30 ppm of PEG200.

Figure 4:
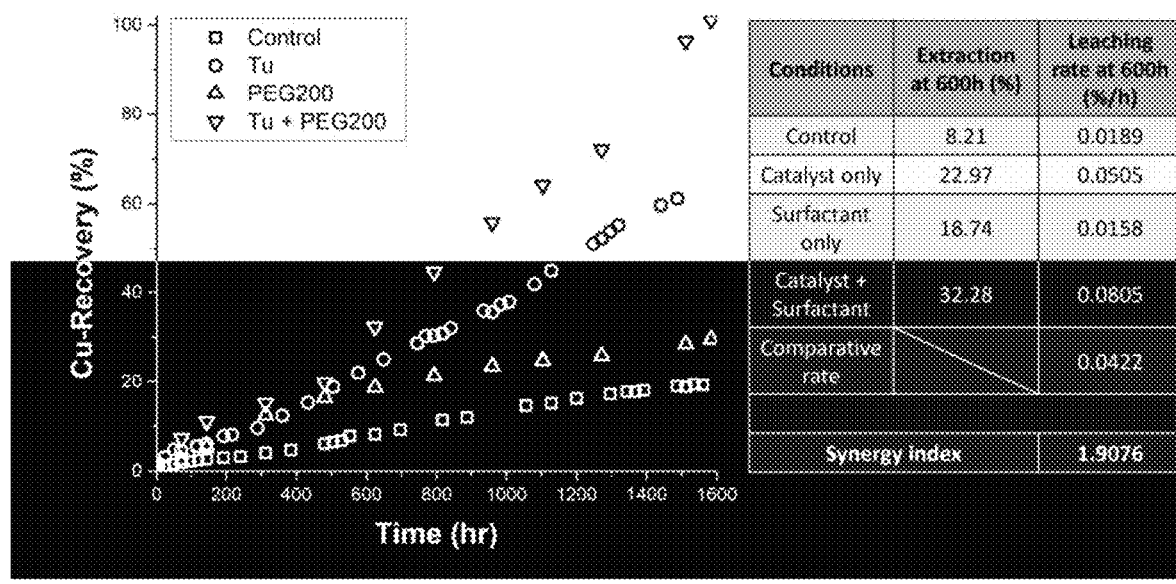
FIG. 4 is a graph showing the synergistic effect of adding thiourea (2 mM) and polyethylene glycol 200 (30 ppm) in a method for copper extraction from natural chalcopyrite ore according to an embodiment of the present disclosure (Tu+PEG) in comparison to a control method without either thiourea or polyethylene glycol 200 (Control), a control method with polyethylene glycol 200 (PEG) and a control method with thiourea (Tu) according to comparative examples of the present disclosure.

It was observed that the use of thiourea alone or PEG200 alone enhanced the extraction of copper (see FIG. 4; percent copper recovery for test "Tu" and "PEG" in comparison to test "Control"). However, by combining thiourea and PEG200 together in the "Tu+PEG" test, the two compounds created a significant synergistic effect in FIG. 4. For example, by comparing the results obtained at hour 600, it is seen that adding PEG200 alone to the control condition improved the extraction by 10.53% (from 8.21 to 18.74%) and adding thiourea alone improved the extraction by 14.76% (from 8.21 to 22.97%). In comparison, when both reagents were present, the copper extraction was increased by 24.07% (from 8.21 to 32.28%). Based on the leaching rates, the calculated synergy index=1.9076. The results suggest that PEG200 can create a strong synergistic effect with thiourea in catalyzed chalcopyrite leaching.

Example 5

Thiourea and Tergitol 15-S-20 (Tergitol) were used in this example. In each test, 5 g/L of pulverized chalcopyrite mineral was used. The control test ("Control") was carried out using the general leaching conditions described above. A thiourea control test ("Tu") was run under the same conditions as the control test, except for the addition of 0.5 mM thiourea at the beginning of the test. A Tergitol control test ("Tergitol") was run under the same conditions as the control test, except for the addition of 30 ppm of Tergitol at the beginning of the test. A thiourea and Tergitol test ("Tu+Tergitol") was run under the same conditions as the control test except for the addition of 0.5 mM of thiourea and 30 ppm of Tergitol.

Figure 5:
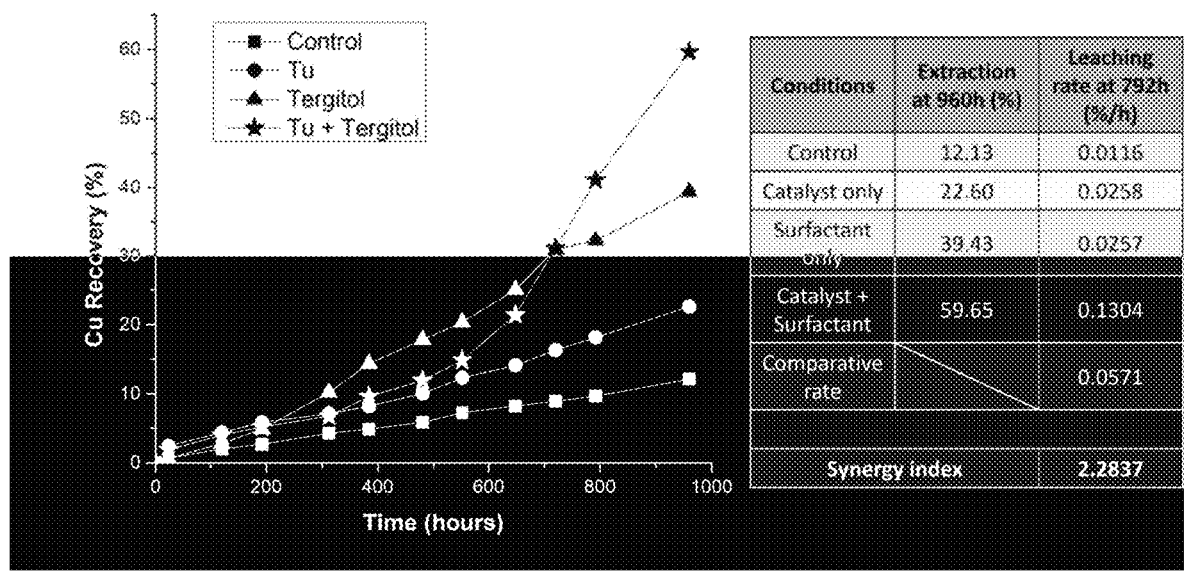
FIG. 5 is a graph showing the synergistic effect of adding thiourea (0.5 mM) and Tergitol 15-S-20 (30 ppm) in a method for copper extraction from natural chalcopyrite ore according to an embodiment of the present disclosure (Tu+Tergitol) in comparison to a control method without either thiourea or polyethylene glycol 200 (Control), a control method with Tergitol 15-S-20 (Tergitol) and a control method with thiourea (Tu) according to comparative examples of the present disclosure.

It was observed that the use of thiourea alone or Tergitol alone enhanced the extraction of copper (see FIG. 5; percent copper recovery for test "Tu" and "Tergitol" in comparison to test "Control"). However, by combining thiourea and Tergitol together in the "Tu+Tergitol" test, the two compounds created a significant synergistic effect in FIG. 5. For example, by comparing the results obtained at hour 960, it is seen that adding Tergitol alone to the control condition improved the extraction by 10.47% (from 12.13 to 22.60%) and adding thiourea alone improved the extraction by 27.3% (from 12.13 to 39.43%). In comparison, when both reagents were present, the copper extraction was increased by 47.52% (from 12.13 to 59.65%). Based on the leaching rates, the calculated synergy index at 792 hours=2.2837. The results suggest that Tergitol can create a strong synergistic effect with thiourea in catalyzed chalcopyrite leaching.

Example 6

Thiourea and PEG600 (PEG600) were used in this example. In each test, 5 g/L of pulverized chalcopyrite mineral was used. The control test ("Control") was carried out using the general leaching conditions described above. A thiourea control test ("Tu") was run under the same conditions as the control test, except for the addition of 0.5 mM thiourea at the beginning of the test. A PEG600 control test ("PEG600") was run under the same conditions as the control test, except for the addition of 30 ppm of PEG600 at the beginning of the test. A thiourea and PEG600 test ("Tu+PEG600") was run under the same conditions as the control test except for the addition of 0.5 mM of thiourea and 30 ppm of PEG600.

Figure 6:
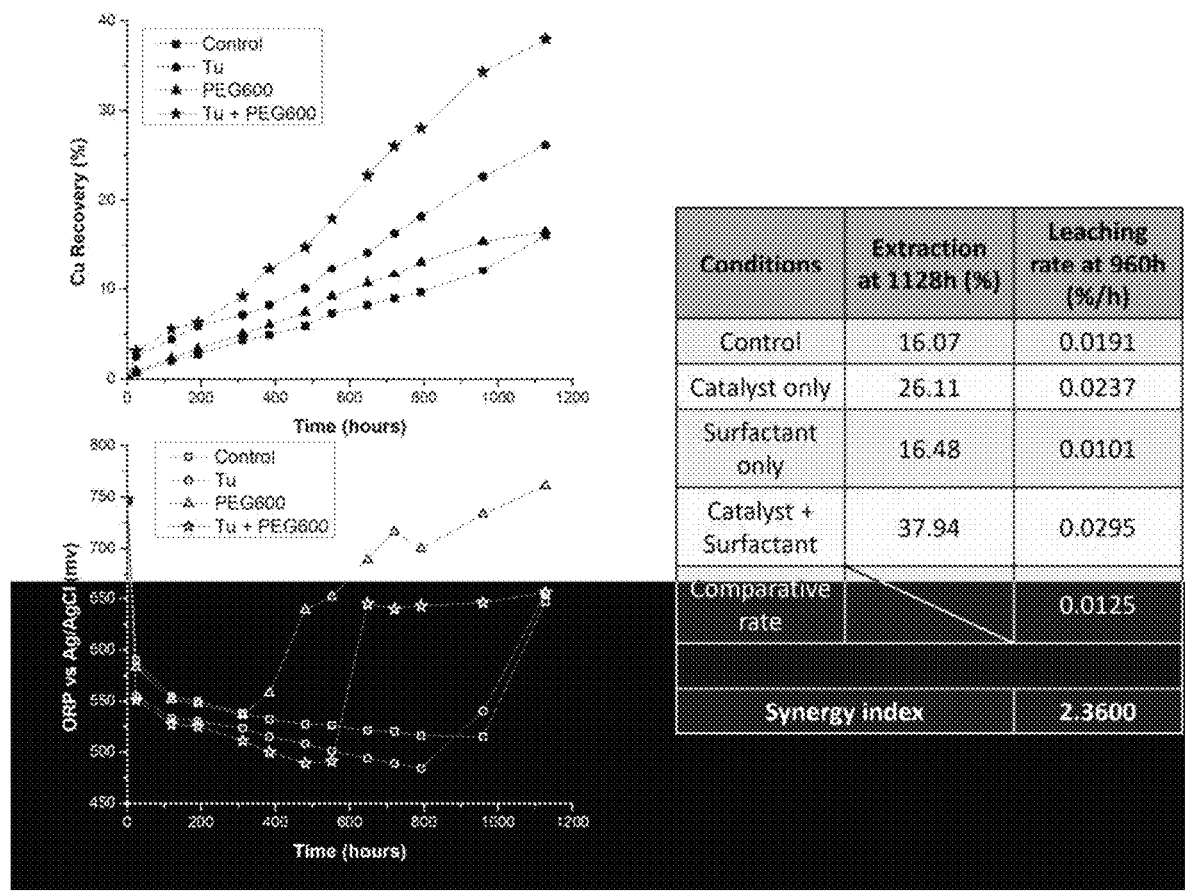
FIG. 6 is a graph showing the synergistic effect of adding thiourea (0.5 mM) and PEG 600 (30 ppm) in a method for copper extraction from natural chalcopyrite ore according to an embodiment of the present disclosure (Tu+PEG600) in comparison to a control method without either thiourea or polyethylene glycol 200 (Control), a control method with PEG600 (PEG600) and a control method with thiourea (Tu) according to comparative examples of the present disclosure.

It was observed that the use of thiourea alone or PEG600 alone enhanced the extraction of copper (see FIG. 6; percent copper recovery for test "Tu" and "PEG600" in comparison to test "Control"). However, by combining thiourea and PEG600 together in the "Tu+PEG600" test, the two compounds created a significant synergistic effect in FIG. 6. For example, by comparing the results obtained at hour 1128, it is seen that adding PEG600 alone to the control condition improved the extraction by 0.41% (from 16.07 to 16.48%) and adding thiourea alone improved the extraction by 10.04% (from 16.07 to 26.11%). In comparison, when both reagents were present, the copper extraction was increased by 21.87% (from 16.07 to 37.94%). Based on the leaching rates, the calculated synergy index at 960 hours=2.36. The results suggest that PEG600 can create a strong synergistic effect with thiourea in catalyzed chalcopyrite leaching. In addition, PEG600 also demonstrated that its effect in enhancing the bacterial activities. From FIG. 6 (bottom), ORP is used as indicator for the activity of iron-oxidizing bacteria. It can be observed that with the addition of PEG600 alone, the time for bacteria to increase the solution ORP is shortened from 960 hours to 384 hours. Similar effect was observed when Tu is present as it shortened the time from 800 hours to 552 hours. The beneficial effect of PEG600 on bacterial activities provide additional advantage for its use in bioleaching.

Example 7

Thiourea and Tween™ 40 (Tween40) were used in this example. In each test, 5 g/L of pulverized chalcopyrite mineral was used. The control test ("Control") was carried out using the general leaching conditions described above. A thiourea control test ("Tu") was run under the same conditions as the control test, except for the addition of 0.5 mM thiourea at the beginning of the test. A Tween40 control test ("Tween40") was run under the same conditions as the control test, except for the addition of 30 ppm of Tween40 at the beginning of the test. A thiourea and Tween40 test ("Tu+Tween40") was run under the same conditions as the control test except for the addition of 0.5 mM of thiourea and 30 ppm of Tween40.

Figure 7:
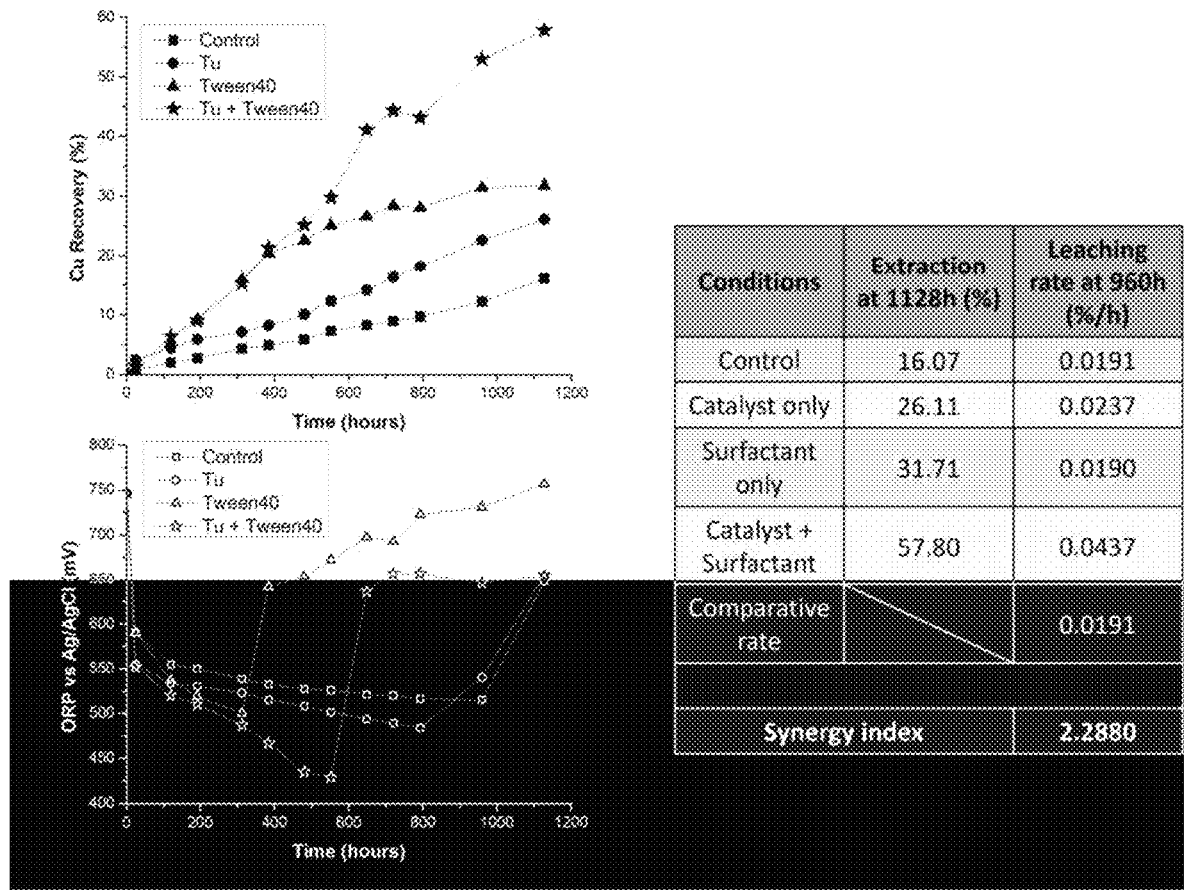
FIG. 7 is a graph showing the synergistic effect of adding thiourea (0.5 mM) and Tween™ 40 (30 ppm) in a method for copper extraction from natural chalcopyrite ore according to an embodiment of the present disclosure (Tu+Tween40) in comparison to a control method without either thiourea or polyethylene glycol 200 (Control), a control method with Tween™ 40 (Tween40) and a control method with thiourea (Tu) according to comparative examples of the present disclosure.

It was observed that the use of thiourea alone or Tween40 alone enhanced the extraction of copper (see FIG. 7; percent copper recovery for test "Tu" and "Tween40" in comparison to test "Control"). However, by combining thiourea and Tween40 together in the "Tu+Tween40" test, the two compounds created a significant synergistic effect in FIG. 7. For example, by comparing the results obtained at hour 1128, it is seen that adding Tween40 alone to the control condition improved the extraction by 15.64% (from 16.07 to 31.71%) and adding thiourea alone improved the extraction by 10.04% (from 16.07 to 26.11%). In comparison, when both reagents were present, the copper extraction was increased by 41.73% (from 16.07 to 57.80%). Based on the leaching rates, the calculated synergy index at 960 hours=2.288. The results suggest that Tween40 can create a strong synergistic effect with thiourea in catalyzed chalcopyrite leaching. In addition, Tween40 also demonstrated that its effect in enhancing the bacterial activities. From FIG. 7 (bottom), ORP is used as indicator for the activity of iron-oxidizing bacteria. It can be observed that with the addition of Tween40 alone, the time for bacteria to increase the solution ORP is shortened from 960 hours to 312 hours. Similar effect was observed when Tu is present as it shortened the time from 800 hours to 552 hours. The beneficial effect of Tween40 on bacterial activities provide additional advantage for its use in bioleaching.

Example 8

Figure 8:
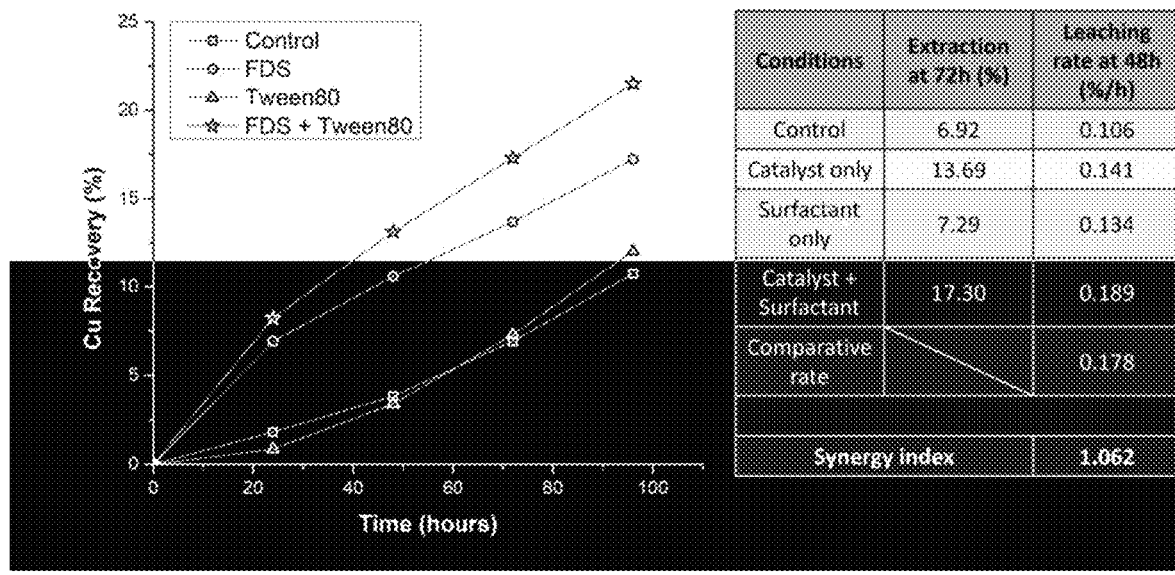
FIG. 8 is a graph showing the synergistic effect of adding formamidine disulfide (FDS) (0.025 mM) and Tween™ 80 (30 ppm) in a method for copper extraction from pure $Cu_2S$ according to an embodiment of the present disclosure (FDS+Tween80) in comparison to a control method without either thiourea or polyethylene glycol 200 (Control), a control method with Tween™ 80 (Tween80) and a control method with FDS (FDS) according to comparative examples of the present disclosure.

Formamidine disulfide (FDS) and Tween™ 80 (Tween80) were used in this example. In each test, 1 g/L of reagent grade chalcocite $Cu_2S$ was used. Since $Cu_2S$ leaches rapidly in phase 1 and much more slowly in phase 2, all reactors were conducted under control condition for 48 hours for phase 1 leaching to complete. After 48 hours, the control test ("Control") was continued using the general leaching conditions described above. A FDS control test ("FDS") was run under the same conditions as the control test, except for the addition of 0.025 mM FDS at 48 hours. A Tween80 control test ("Tween80") was run under the same conditions as the control test, except for the addition of 30 ppm of Tween80 at 48 hours. A FDS and Tween80 test ("FDS+Tween80") was run under the same conditions as the control test except for the addition of 0.025 mM of FDS and 30 ppm of Tween80 at 48 hours. FIG. 8 only presents the leaching results after 48 hours when the catalyst/surfactant were added.

It was observed that the use of FDS alone or Tween80 alone enhanced the extraction of copper (see FIG. 8; percent copper recovery for test "FDS" and "Tween80" in comparison to test "Control"). However, by combining FDS and Tween80 together in the "FDS+Tween80" test, the two compounds created a significant synergistic effect in FIG. 8. For example, by comparing the results obtained at hour 72, it is seen that adding Tween80 alone to the control condition improved the extraction by 0.37% (from 6.92 to 7.29%) and adding FDS alone improved the extraction by 6.77% (from 6.92 to 13.69%). In comparison, when both reagents were present, the copper extraction was increased by 10.38% (from 6.92 to 17.30%). Based on the leaching rates, the calculated synergy index at 48 hours=1.062. The results suggest that Tween80 can create synergistic effect with FDS in catalyzed chalcocite phase 2 leaching.

Example 9

Ethylene thiourea (ETU) and polyethylene glycol 200 (PEG200) were used in this example. In each test, 1 g/L of pulverized chalcopyrite mineral was used. The control test ("Control") was carried out using the general leaching conditions described above. An ethylene thiourea control test ("ETU") was run under the same conditions as the control test, except for the addition of 1 mM ethylene thiourea at the beginning of the test. A PEG200 control test ("PEG200") was run under the same conditions as the control test, except for the addition of 200 ppm of PEG200 at the beginning of the test. An ethylene thiourea and PEG200 test ("ETU+PEG200") was run under the same conditions as the control test except for the addition of 1 mM of ethylene thiourea and 200 ppm of PEG200.

Figure 9:
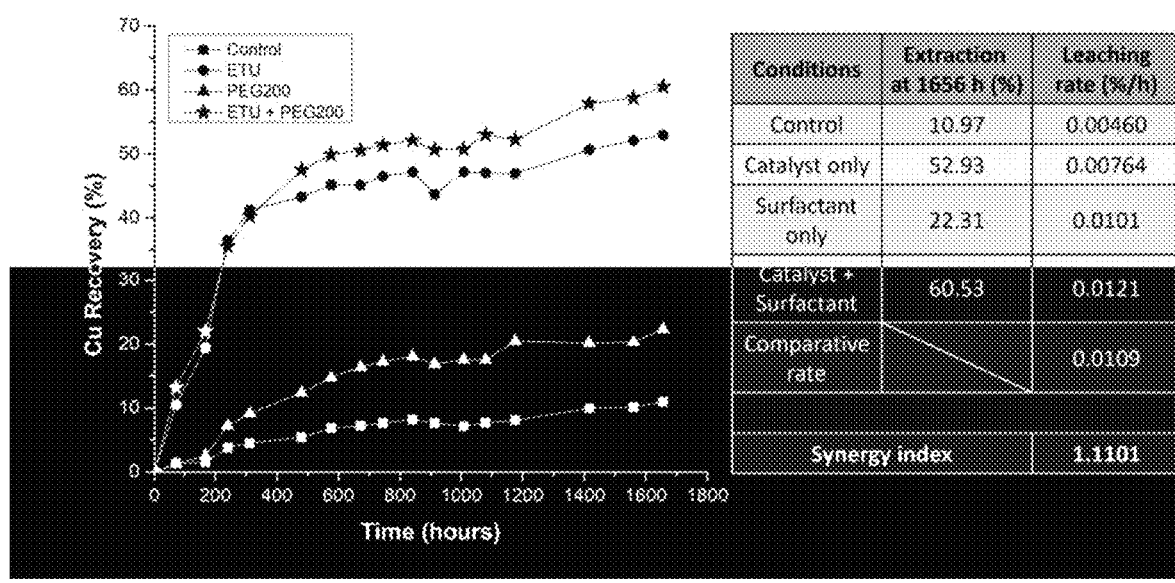
FIG. 9 is a graph showing the synergistic effect of adding ethylene thiourea (1 mM) and polyethylene glycol 200 (200 ppm) in a method for copper extraction from natural chalcopyrite ore according to an embodiment of the present disclosure (ETU+PEG200) in comparison to a control method without either thiourea or polyethylene glycol 200 (Control), a control method with polyethylene glycol 200 (PEG200) and a control method with ethylene thiourea (ETU) according to comparative examples of the present disclosure.

It was observed that the use of ethylene thiourea alone or PEG200 alone enhanced the extraction of copper (see FIG. 9; percent copper recovery for test "ETU" and "PEG200" in comparison to test "Control"). However, by combining ethylene thiourea and PEG200 together in the "ETU+PEG200" test, the two compounds created a significant synergistic effect in FIG. 9. Due to drastic rate change during the leaching process, the leaching rate is calculated as an average leaching rate using the data after 1000 hours. For example, by comparing the results obtained at hour 1656, it is seen that adding PEG200 alone to the control condition improved the extraction by 11.34% (from 10.97 to 22.31%) and adding ethylene thiourea alone improved the extraction by 41.96% (from 10.97 to 52.93%). In comparison, when both reagents were present, the copper extraction was increased by 49.56% (from 10.97 to 60.53%). Based on the average leaching rates after 1000 hours, the calculated synergy index=1.1101. The results suggest that PEG200 can create a strong synergistic effect with ethylene thiourea in catalyzed chalcopyrite leaching.

Example 10

Thiourea and a combination of surfactants (Tween20 and PEG200) were used in this example. In each test, 5 g/L of pulverized chalcopyrite mineral was used. The test was separated into two phases. In phase 1, the control test ("Control") was carried out using the general leaching conditions described above. A surfactant combo test ("surfactant combo") was run under the same conditions as the control test, except for the addition of 30 ppm of Tween20 and 30 ppm of PEG200 at the beginning of the test. Phase 1 leaching was conducted for 600 hours to examine the effect of combining a common surfactant (Tween20) and a common wetting agent (PEG200) together in the bioleaching condition. At 600 hours, the Control test continued to run under the same conditions except for the addition of 2 mM of thiourea. The data after 600 hours were labeled accordingly ("Adding TU to Control") in FIG. 10. At 600 hours, the Surfactant combo test continued to run under the same conditions except for the addition of 2 mM of thiourea. The data after 600 hours were labeled accordingly ("Adding TU to Surfactant Combo") in FIG. 10.

Figure 10:
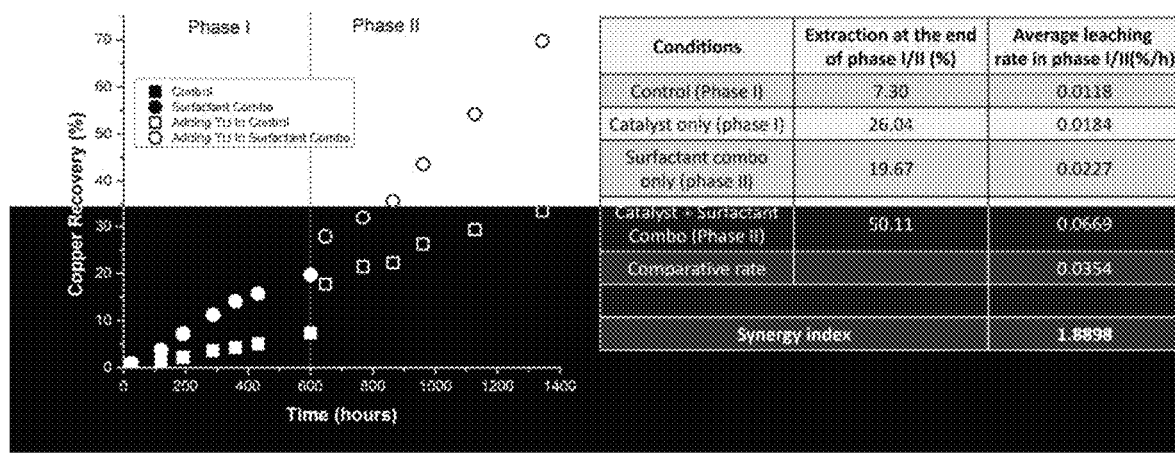
FIG. 10 is a graph showing the synergistic effect of adding thiourea (2 mM) and a surfactant combo Tween™ 20 (30 ppm)+PEG200 (30 ppm) in a method for 2 phased copper extraction from natural chalcopyrite ore according to an embodiment of the present disclosure ("Adding TU to Surfactant Combo") in phase 2 in comparison to a control method without either thiourea or surfactant combo ("Control" in phase 1), a control method with surfactant combo ("Surfactant Combo" in phase 1) and a control method with thiourea only ("Adding TU to Control" in phase 2) according to comparative examples of the present disclosure.

It was observed that the use of surfactant combo alone in phase 1 enhanced the extraction of copper (see FIG. 10; percent copper recovery for test "Surfactant Combo" in comparison to test "Control"). In Phase 2, addition of thiourea to "Control" and "Surfactant Combo" tests shows increased leaching rate in both tests, indicating that TU can depassivate the leached chalcopyrite. However, adding TU to surfactant combo created a significant synergistic effect in phase 2 (FIG. 10). For example, in phase 1, the average leaching rate is 0.0118%/h in "Control" test and 0.0227%/h in "Surfactant Combo" test. In phase 2, addition of thiourea to "Control" and "Surfactant Combo" tests increased their leaching rates to 0.0184%/h and 0.0669%/h, respectively. Based on the leaching rates, the calculated synergy index=1.8898. The results suggest that TU can depassivate leached chalcopyrite with and without the presence of surfactants. In addition, the surfactant combo of Tween20 and PEG200 can create a strong synergistic effect with thiourea in catalyzed chalcopyrite leaching.

Example 11

Thiourea and Pluronic® F-108 (F108) were used in this example. In each test, 5 g/L of pulverized chalcopyrite mineral was used. The control test ("Control") was carried out using the general leaching conditions described above. A thiourea control test ("Tu") was run under the same conditions as the control test, except for the addition of 2 mM thiourea at the beginning of the test. A F108 control test ("F108") was run under the same conditions as the control test, except for the addition of 200 ppm of F108 at the beginning of the test. A thiourea and F108 test ("Tu+F108") was run under the same conditions as the control test except for the addition of 2 mM of thiourea and 200 ppm of F108.

Figure 11:
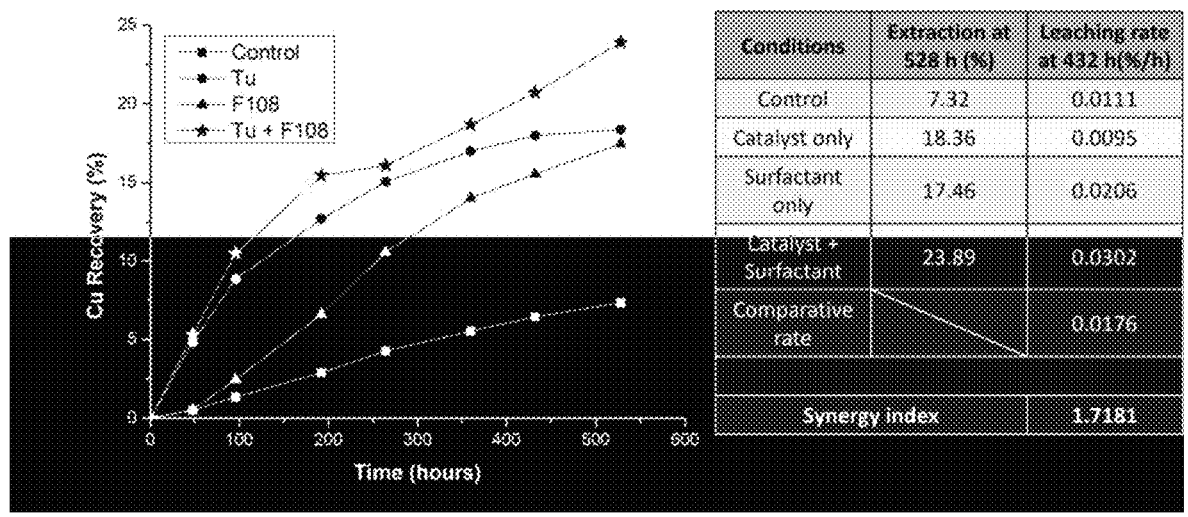
FIG. 11 is a graph showing the synergistic effect of adding thiourea (2 mM) and Pluronic® F-108 (200 ppm) in a method for copper extraction from natural chalcopyrite ore according to an embodiment of the present disclosure (Tu+F108) in comparison to a control method without either thiourea or Pluronic® F-108 (Control), a control method with Pluronic® F-108 (F108) and a control method with thiourea (Tu) according to comparative examples of the present disclosure.

It was observed that the use of thiourea alone or F108 alone enhanced the extraction of copper (see FIG. 11; percent copper recovery for test "Tu" and "F108" in comparison to test "Control"). However, by combining thiourea and F108 together in the "Tu+F108" test, the two compounds created a significant synergistic effect in FIG. 6. For example, by comparing the results obtained at hour 528, it is seen that adding F108 alone to the control condition improved the extraction by 10.14% (from 7.32 to 17.46%) and adding thiourea alone improved the extraction by 11.04% (from 7.32 to 18.36%). In comparison, when both reagents were present, the copper extraction was increased by 16.57% (from 7.32 to 23.89%). Based on the leaching rates, the calculated synergy index at 432 hours=1.7181. The results suggest that F108 can create a strong synergistic effect with thiourea in catalyzed chalcopyrite leaching.

Example 12

Thiourea and polyethylene glycol 200 (PEG200) were used in this example to demonstrate the similar synergy on enargite leaching as in chalcopyrite leaching. In each test, 5 g/L of pulverized enargite mineral was used. The control test ("Control") was carried out using the general leaching conditions described above. A thiourea control test ("Tu") was run under the same conditions as the control test, except for the addition of 2 mM thiourea at the beginning of the test. A PEG200 control test ("PEG") was run under the same conditions as the control test, except for the addition of 30 ppm of PEG200 at the beginning of the test. A thiourea and PEG200 test ("Tu+PEG") was run under the same conditions as the control test except for the addition of 2 mM of thiourea and 30 ppm of PEG200.

Figure 12:
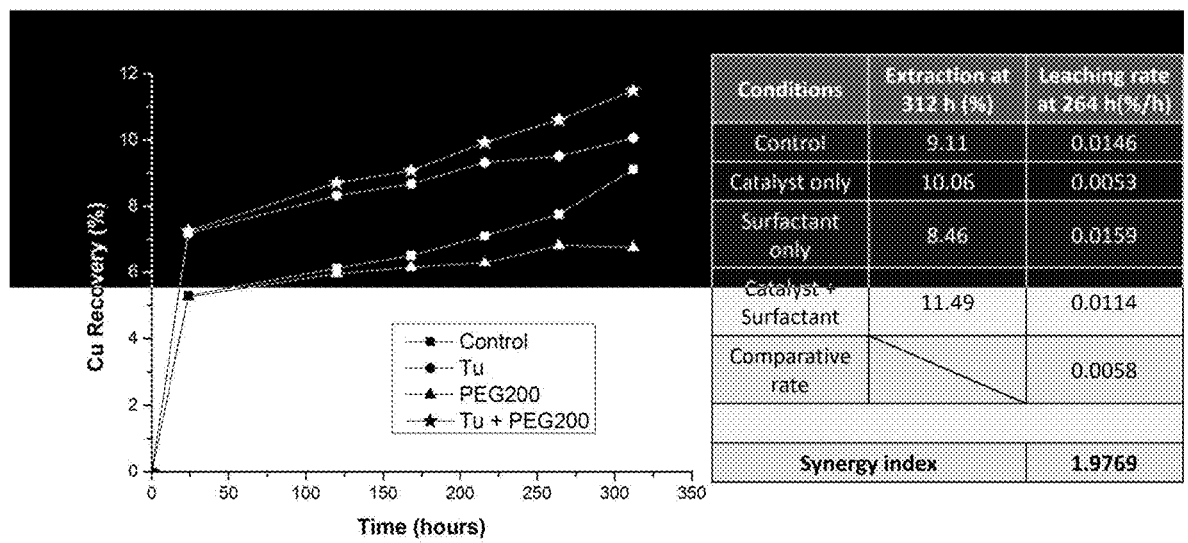
FIG. 12 is a graph showing the synergistic effect of adding thiourea (2 mM) and polyethylene glycol 200 (30 ppm) in a method for copper extraction from natural enargite ore according to an embodiment of the present disclosure (Tu+PEG200) in comparison to a control method without either thiourea or polyethylene glycol 200 (Control), a control method with polyethylene glycol 200 (PEG200) and a control method with thiourea (Tu) according to comparative examples of the present disclosure.

It was observed that the use of thiourea alone enhanced the extraction of copper but the use of PEG200 alone decreases the extraction of copper (see FIG. 12; percent copper recovery for test "Tu" and "PEG" in comparison to test "Control"). However, by combining thiourea and PEG200 together in the "Tu+PEG" test, the two compounds created a positive synergistic effect in FIG. 12. For example, by comparing the results obtained at hour 312, it is seen that adding PEG200 alone to the control condition decreased the extraction by 0.65% (from 9.11 to 8.46%) and adding thiourea alone improved the extraction by 0.95% (from 9.11 to 10.06%). In comparison, when both reagents were present, the copper extraction was increased by 2.38% (from 9.11 to 11.49%). Based on the leaching rates, the calculated synergy index at 264 hours=1.9769. The results suggest that PEG200 can create a strong synergistic effect with thiourea in catalyzed enargite leaching.

Example 13

Thiourea and Tween™ 20, a polyethylene glycol sorbitan monolaurate nonionic surfactant were used in this example. 1.6 kg of low-grade chalcopyrite mineral was used for each column. The control test ("C") was carried out using the general leaching conditions described above. A thiourea control test ("TU") was run under the same conditions as the control test, except for the addition of 2 mM thiourea at the beginning of the test. A Tween 20 control test ("Tw") was run under the same conditions as the control test, except for the addition of 100 ppm of Tween 20 at the beginning of the test. The thiourea and Tween 20 test ("TU+Tw") was run under the same conditions as the control test except for the addition of 2 mM of thiourea and 100 ppm of Tween 20.

Figure 13:
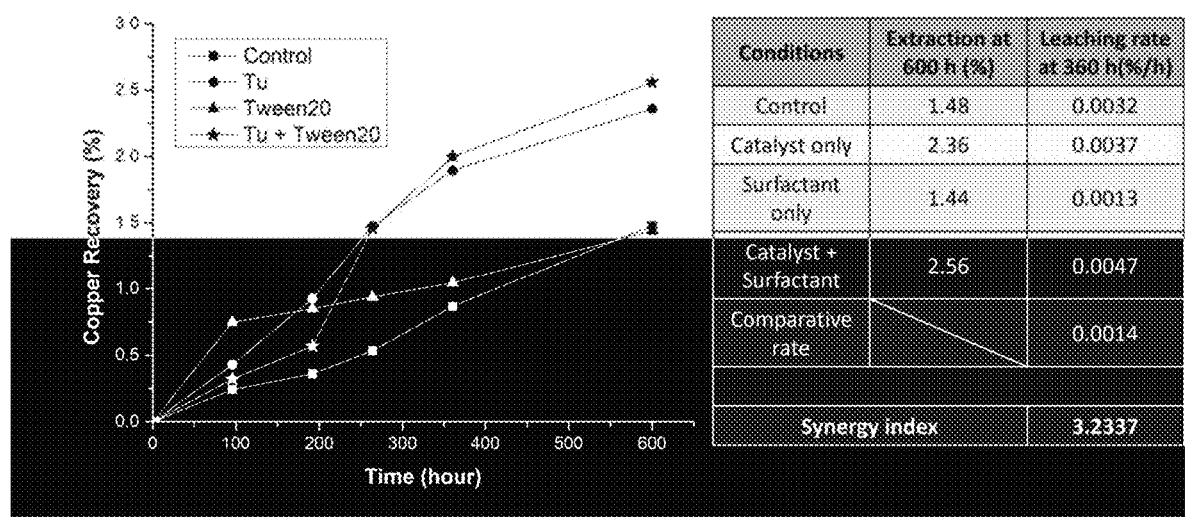
FIG. 13 is a graph showing the synergistic effect of adding thiourea (2 mM) and Tween™ 20 (100 ppm) in a method for copper extraction from natural low grade chalcopyrite ore in columns according to an embodiment of the present disclosure (Tu+Tween20) in comparison to a control method without either thiourea or Tween™ 20 (Control), a control method with Tween™ 20 (Tween20) and a control method with thiourea (Tu) according to comparative examples of the present disclosure.

It was observed that the use of thiourea alone or Tween 20 alone enhanced the extraction of copper (see FIG. 13; percent copper extraction for test "TU" and "Tw" in comparison to test "C"). However, by combining thiourea and Tween 20 together, the two compounds ("TU+Tw") created a significant synergistic effect. By comparing the results obtained at hour 600, it is seen that adding Tween 20 alone to the control condition improved the extraction in the beginning, but the beneficial effect rapidly waned within 600 hours. Adding thiourea alone improved the extraction by 0.88% (from 1.48 to 2.36%). In comparison, when both reagents were present, the copper extraction was increased by 1.08% (from 1.48 to 2.56%). Based on the leaching rates, the calculated synergy index=3.2337. The results suggest that Tween 20 created a strong synergistic effect with thiourea in catalyzed chalcopyrite leaching.

Example 14

Thiourea and Triton™-CG-110 (CG110) were used in this example. In each test, 5 g/L of pulverized chalcopyrite mineral was used. The control test ("Control") was carried out using the general leaching conditions described above. A thiourea control test ("Tu") was run under the same conditions as the control test, except for the addition of 0.5 mM thiourea at the beginning of the test. A CG110 control test ("CG110") was run under the same conditions as the control test, except for the addition of 30 ppm of CG 110 at the beginning of the test. A thiourea and CG110 test ("Tu+CG110") was run under the same conditions as the control test except for the addition of 0.5 mM of thiourea and 30 ppm of CG110.

Figure 14:
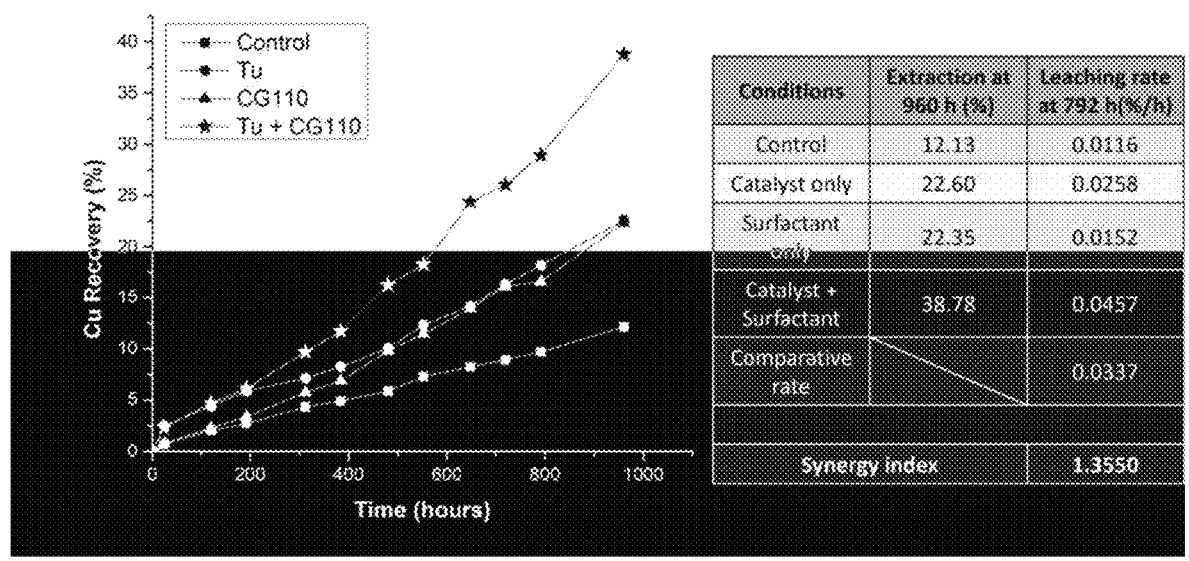
FIG. 14 is a graph showing the synergistic effect of adding thiourea (0.5 mM) and Triton™ CG-110 (30 ppm) in a method for copper extraction from natural chalcopyrite ore according to an embodiment of the present disclosure (Tu+CG110) in comparison to a control method without either thiourea or Triton™ CG-110 (Control), a control method with Triton™ CG-110 (CG110) and a control method with thiourea (Tu) according to comparative examples of the present disclosure.

It was observed that the use of thiourea alone or CG110 alone enhanced the extraction of copper (see FIG. 14; percent copper recovery for test "Tu" and "CG 110" in comparison to test "Control"). However, by combining thiourea and CG110 together in the "Tu+CG110" test, the two compounds created a significant synergistic effect in FIG. 14. For example, by comparing the results obtained at hour 960, it is seen that adding CG 110 alone to the control condition improved the extraction by 10.22% (from 12.13 to 22.35%) and adding thiourea alone improved the extraction by 10.47% (from 12.13 to 22.97%). In comparison, when both reagents were present, the copper extraction was increased by 26.65% (from 12.13 to 38.78%). Based on the leaching rates, the calculated synergy index=1.3550. The results suggest that CG110 can create a strong synergistic effect with thiourea in catalyzed chalcopyrite leaching.

While the disclosure has been described with reference to what are presently considered to be the preferred examples, it is to be understood that the disclosure is not limited to the disclosed examples. To the contrary, the present disclosure is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

What is claimed is:

1. A method for extracting a base metal from a material comprising a base metal sulfide, the method comprising contacting the base metal sulfide under acidic conditions with a non-ionic wetting agent and a reagent comprising a thiocarbonyl functional group.

2. The method of claim 1 wherein the material is agglomerated prior to contact.

3. The method of claim 1 wherein the material further comprises iron-oxidizing bacteria.

4. The method of claim 1 wherein the material is a material comprising a base metal sulfide.

5. The method of claim 1 wherein the material comprises an ore.

6. The method of claim 1 wherein the base metal comprises copper.

7. The method of claim 1 wherein the method comprises adding sulfuric acid to obtain the acidic conditions.

8. The method of claim 1 wherein the reagent comprising the thiocarbonyl functional group is added to the method in monomeric form.

9. The method of claim 1 wherein the reagent comprising the thiocarbonyl functional group is added to the method in the form of the corresponding dimer.

10. The method of claim 1 wherein the reagent comprising the thiocarbonyl functional group comprises thiourea.

11. The method of claim 1 wherein the non-ionic wetting agent comprises alkyl polyqlycoside.

12. The method of claim 1 wherein the material is contacted with the non-ionic wetting agent and the reagent comprising the thiocarbonyl functional group in a method comprising a percolation leach.

13. The method of claim 1 wherein the material is contacted with the non-ionic wetting agent and the reagent comprising the thiocarbonyl functional group in a method comprising a heap leach.

14. The method of claim 1 wherein the contacting of the material with the non-ionic wetting agent and the reagent comprising the thiocarbonyl functional group produces a pregnant leach solution comprising the base metal and the method further comprises recovering the base metal from the pregnant leach solution.

15. The method of claim 1 wherein the material is contacted with the non-ionic wetting agent and the reagent comprising the thiocarbonyl functional group at ambient temperature and pressure.

16. The method of claim 1 wherein the method is a batch method.

17. The method of claim 1 wherein the method is a continuous method.

18. The method of claim 1, wherein the material is contacted with the reagent comprising the thiocarbonyl functional group by a method comprising:
contacting the material with an acidic mixture comprising the reagent comprising the thiocarbonyl functional group.

19. The method of claim 18 wherein the acidic mixture further comprises iron-oxidizing bacteria.

20. The method of claim 18 wherein, prior to contact, the pH of the acidic mixture is in a range of from about 1.5 to about 2.5.

21. The method of claim 18 wherein the acidic mixture further comprises an oxidizing agent.

22. The method of claim 21 wherein the oxidizing agent comprises ferric sulfate.

23. The method of claim 1 wherein the material comprises a copper sulfide ore.

24. The method of claim 23 wherein the copper sulfide ore comprises chalcopyrite.

25. The method of claim 1 wherein the non-ionic wetting agent comprises a non-ionic ethoxylate surfactant.

26. The method of claim 25 wherein the non-ionic ethoxylate surfactant comprises a polysorbate.

27. The method of claim 26 wherein the polysorbate comprises one or more compounds of formula (I):

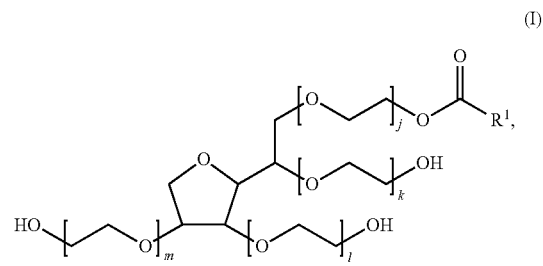

wherein $R^1$ is $C_{4-30}$alkyl, $C_{4-30}$alkenyl or $C_{4-30}$alkynyl; and $j+k+l+m=20$.

28. The method of claim 26 wherein the polysorbate comprises a surfactant comprising polysorbate 20.

29. The method of claim 28 wherein the polysorbate comprises polysorbate 40.

30. The method of claim 1 wherein the non-ionic wetting agent comprises an alkylphenyl ether of polyethylene glycol.

31. The method of claim 30 wherein the alkylphenyl ether of polyethylene glycol comprises one or more compounds of the Formula (II):

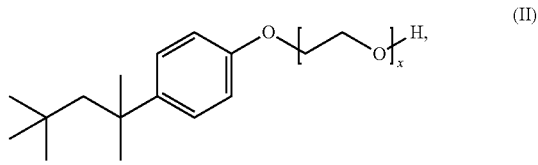

wherein x is 5-20.

32. The method of claim 1 wherein the non-ionic wetting agent comprises a polyethylene glycol.

33. The method of claim 32 wherein the polyethylene glycol comprises a number average molecular weight of from about 100 g/mol to about 300 g/mol.

34. The method of claim 32 wherein the polyethylene glycol comprises polyethylene glycol 200.

35. The method of claim 1 wherein the method further comprises recovering the base metal.

36. The method of claim 35 wherein the recovering comprises solvent extraction and electrowinning.

37. The method of claim 36 wherein prior to the solvent extraction, the method further comprises a solid-liquid separation.

38. The method of claim 1 wherein the method further comprises recovering the reagent comprising the thiocarbonyl functional group.

39. The method of claim 38 wherein the method further comprises recycling the recovered reagent comprising the thiocarbonyl functional group for use in the contacting of a further portion of the material.

\* \* \* \* \*